(12) United States Patent
Osawa

(10) Patent No.: US 6,782,764 B2
(45) Date of Patent: Aug. 31, 2004

(54) CORIOLIS MASS FLOWMETER

(75) Inventor: Norikazu Osawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 38 days.

(21) Appl. No.: 10/320,172

(22) Filed: Dec. 16, 2002

(65) Prior Publication Data
US 2003/0131669 A1 Jul. 17, 2003

(30) Foreign Application Priority Data

Dec. 17, 2001 (JP) ........................................ 2001-383340

(51) Int. Cl.[7] ................................................ G01F 1/78
(52) U.S. Cl. ................................................ 73/861.355
(58) Field of Search ..................... 73/861.355, 861.356, 73/861.357

(56) References Cited

U.S. PATENT DOCUMENTS 4,823,614 A * 4/1989 Dahlin .................. 73/861.357
4,972,724 A * 11/1990 Ricken ................... 73/861.357
5,347,874 A * 9/1994 Kalotay et al. ......... 73/861.357
5,398,554 A * 3/1995 Ogawa et al. .......... 73/861.357
6,041,665 A * 3/2000 Hussain .................. 73/861.357
6,450,042 B1 * 9/2002 Lanham et al. ......... 73/861.357
6,477,902 B1 * 11/2002 Oosawa et al. ......... 73/861.355

* cited by examiner

Primary Examiner—Edward Lefkowitz
Assistant Examiner—Jewel V. Thompson
(74) Attorney, Agent, or Firm—Moonray Kojima

(57) ABSTRACT

A Coriolis mass flowmeter has a vibration tube through which a fluid to be measured flows so that the flow of the fluid in cooperation with angular vibration of the vibration tube generates Coriolis force which causes vibratory deformation of the vibration tube. The vibration tube has a curved configuration which is point-symmetry with respect to the median point between an upstream fixed end and a downstream fixed end of the vibration tube and which has three inflection points, and performs, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube.

17 Claims, 32 Drawing Sheets

CORIOLIS MASS FLOWMETER

BACKGROUND OF THE INVENTION

1. Field of the Invention

The present invention relates to a Coriolis mass flowmeter having im disposed on a straight line which contains said median point and proved stability, measuring accuracy, and vibration-proof performance.

2. Description of the Related Art

In order to facilitate understanding of the present invention, a description will be given of problems encountered with known arts, with reference to FIGS. 74 to 78.

FIG. 74 shows the structure of a conventional apparatus disclosed, for example, in Japanese Unexamined Patent Application Publication No. 6-109512.

Referring to this Figure, a vibration tube 1 has both ends connected to flanges 2 which are used for connecting the vibration tube 1 between conduits. An ocillator 3 is fixed to a median point of the vibration tube 1.

Vibration sensors 4 and 5 are positioned near both ends of the vibration tube 1. The vibration tube 1 is fixed at its both ends to a housing 6.

With this arrangement, a fluid as a measuring object is caused to flow through the vibration tube 1 while the ocillator 3 is activated.

A Coriolis force expressed by the following equation is generated, where the angular velocity of the vibration caused by the ocillator 3 is expressed by $[\omega]$ and the flow velocity of the fluid is expressed by $[V]$, with each symbol in brackets indicating a vector quantity. The mass flow rate of the fluid can be determined by measuring the vibration which is proportional to the Coriolis force.

$$Fc = -2m[\omega] \times [V]$$

FIG. 75 shows the structure of another conventional apparatus disclosed, for example, in Japanese Unexamined Patent Application Publication No. 11-108723.

A vibration tube 11 performs a simple harmonic oscillation or a circular motion on a circle which is at a predetermined radial distance from each point on a reference axis 14 defined as a straight line interconnecting an upstream fixed end 12 and a downstream fixed end 13 of the vibration tube 11.

An ocillator 15 is provided on the median point of the vibration tube 11. Vibration sensors 16 and 17 are disposed near both ends of the vibration tube 11.

FIG. 76 is a cross-sectional view of the vibration tube 11 taken along the line b—b of FIG. 75. FIG. 77 is a cross-sectional view of the vibration tube 11 taken along the line a—a or c—c of FIG. 75. FIG. 78 is a perspective view illustrating the manner in which the vibration tube 11 vibrates.

Referring to FIGS. 76 and 77, the vibration tube 11 when not ocillated is held near a position indicated by "A".

When the vibration tube 11 is ocillated, the center of the vibration tube 11 moves on a circle of a radius R(x) from the reference axis 14.

At the position of the cross-section b—b, the center of the vibration tube 11 oscillates on an arc or a part of a circle having a radius R(b) from the reference axis 14. At the position of the cross-section a—a or c—c, the center of the vibration tube 11 oscillates on an arc or a part of a circle of a radius R(a) or R(c) from the reference axis 14, from a position A to a position B and from the position B to the position A, and from the position A to a position C and then again to the position A, and repeats this operation.

Symbols "A", "B" and "C" in FIG. 78 respectively correspond to the positions of the vibration tube 11 indicated by the same symbols in FIGS. 76 and 77. Numerals 12 and 13 denote fixed ends of the vibration tube 11, and 14 denotes the reference axis which is the straight line interconnecting these fixed ends.

Since each point on the vibration tube 11 oscillates only on an arc or a part of circle which is at a constant distance from the reference axis 14, the length of the vibration tube 11 is held constant regardless of the angular position of the vibration tube 11.

In the conventional apparatus of the type described, the vibration tube 1 is fixed at its both ends. However, when the size of the flowmeter is limited, it is extremely difficult to perfectly fix both ends of the vibration tube so as to completely isolate the tube from vibration.

Two major problems are encountered with the conventional apparatus.

One of these problems is that the flowmeter is susceptible to external conditions.

More specifically, the housing of the flowmeter by itself cannot fully accommodate the influence of any vibration or stress of external piping, so that such external vibration or stress is transmitted to the internal vibration tube 11 to cause a change in the mode of vibration of the tube 11, resulting in fluctuation of the output and errors such as shifting of zero point.

The other problem is that the vibration of the internal vibration tube is propagated externally of the flowmeter.

External propagation of the vibration and insufficient isolation from external vibration cause the following drawbacks.

(1) Internal vibration is rendered unstable due to low Q value, enhancing susceptibility to vibration noise other than intentionally ocillated vibration.

(2) Electrical power consumption is increased due to large energy used for ocillatation.

(3) External propagation of vibration is significantly affected by external factors such as the manner of installation, stress in the piping and change in ambient conditions such as temperature, with the result that the mode of vibration of the vibration tube 11 is varied to allow easy change of the zero point and the span.

In the arrangement shown in FIG. 75, each point on the vibration tube 11 performs simple harmonic oscillation along an arc or a part of a circle of a predetermined radial distance from the reference axis 14 which is defined as being the straight line interconnecting the upstream end 12 and the downstream end 13 of the vibration tube 11.

The force acting on each fixed end of the vibration tube under the described ocillated vibration is mainly composed of torque or rotational component acting about the reference axis. This offers more effective isolation from vibration than in the arrangement shown in FIG. 74. However, the position of the center of gravity of the whole vibration system is shifted due to the change in the position of the vibration tube caused by the ocillated vibration.

Shift of the gravity center allows easy external propagation of vibration from the flowmeter, so that the problem in regard to the isolation from vibration still remains unsolved.

FIG. 29 is a plan view of a critical portion of a known Coriolis mass flowmeter of the type disclosed in Japanese Unexamined Patent Application Publication No. 61-189417. FIG. 30 is a side elevational view of the structure shown in FIG. 29. FIGS. 31 and 32 are illustrations of the operation of the known flowmeter shown in FIG. 29.

Referring to these Figures, a vibration tube has a first branch tube 218 and a second branch tube 219 which are in parallel with each other and which are supported by support plates 241 and 242 at their both ends.

A pair of vibration sensors 223 and 224 and an ocillator 221 are connected between these two branch tubes 218 and 219, so that these branch tubes are ocillated to constantly vibrate at their resonance frequency.

In most cases, the branch tubes perform ocillated vibrations in a basic resonance mode as illustrated in FIG. 31. More specifically, the first branch tube 218 vibrates to change its position from A to B, from B to A, from A to C and back again to A and then again to B and so on. In the meantime, the second branch tube 219 vibrates to change its position from A' to B', from B' to A', from A' to C' and back again to A' and then again to B' and so on. These two branch tubes vibrate in opposite phases in symmetry with each other.

It is also possible to arrange such that the branch tubes 218 and 219 vibrate in a high-order resonance mode as illustrated in FIG. 32. In this case also, the first branch tube 218 vibrates to change its position from A to B, from B to A, from A to C and back again to A and then again to B and so on, while the second branch tube 219 vibrates to change its position from A' to B', from B' to A', from A' to C' and back again to A' and then again to B' and so on. These two branch tubes vibrate in opposite phases in symmetry with each other. This vibration mode has a node of vibration on each branch tube and requires, for example, a pair of ocillators unlike the arrangements of FIG. 29 which uses a single ocillator.

This known Coriolis mass flowmeter employs vibration tubes 218 and 219 which are straight and which are fixed at their both ends as seen in FIG. 29. Therefore, when the positions of these branch tubes 218 and 219 have shifted from their neutral or unocillated positions A, A' to positions B, B', the overall lengths of the branch tubes vary to produce large axial forces acting on the branch tubes 218, 219.

More specifically, as the branch tubes 218 and 219 are deformed due to the vibration in the manner shown in FIG. 31 or 32, axial forces are generated to pull the fixed ends of the branch tubes inward as indicated by arrows F1.

Such unnecessary forces acting on the fixed ends of the branch tubes causes the vibrations of the branch tubes 218 and 219 to be externally propagated, thus hampering isolation of vibration.

The inferior vibration isolation, i.e., a lower Q value, causes the following problems.

(1) Ocillatation requires large electric currents, leading to an increase in the electrical power consumption.
(2) External propagation of vibration largely varies depending on environmental conditions and external factors, with the result that the vibration is rendered unstable and unsteady, allowing output errors due to a shift of zero point, change in the span, and so forth.

The externally propagated vibration is reflected and introduced again into the internal vibration system. The reflected vibration has the same frequency as the internal vibration and, therefore, acts as a large noise even when the magnitude is small, and causes an error in the output.

The following problem is caused when the vibration tube is a single tube with no branching portion and having a curvilinear configuration devoid of any large curvature, as in FIG. 75.

The vibration tube is slightly expanded or contracted in the direction of the tube axis, i.e., in the direction of X-direction, when heat is applied in the course of welding or when there is a significant temperature difference between the vibration tube 11 and the housing 6. Such a slight axial deformation appears as a large deformation in the direction of curvature of the vibration tube, i.e., in the Z-direction, as shown in FIG. 46.

The amount of the deformation in the Z-direction depends on the configuration of the vibration tube 11 but is often several times greater than that of the amount of the axial deformation, well reaching several millimeters of greater, at the position where the ocillator is provided.

Such a large deformation tends to cause a magnet or a coil attached to the vibration tube to deviate away from the position of the associated coil or magnet which is fixed to a stationary part such as the housing 6.

This problem is serious particularly when the ocillator has a cylindrical coil and a magnet received in the coil, because the positional deviation may allow the coil and the magnet to mechanically interfere with each other, thus hampering stable vibratory operation and, in the worst case, causing breakage of the ocillator.

SUMMARY OF THE INVENTION

Accordingly, it is a primary object of the present invention is to provide a Coriolis mass flowmeter which is improved in stability, measuring accuracy and vibration proof performance, thereby overcoming the above-described problems.

Practically, the present invention provides a Coriolis mass flowmeter, wherein the vibration tube has a gently-curved curvilinear configuration approximating a straight configuration, thus implementing a compact structure which suffers reduced pressure loss and which is highly resistant to thermal stress caused by, for example, a change in the fluid temperature.

It is also an object of the present invention to provide a Coriolis mass flowmeter which excels in the isolation of the internal structure of the flowmeter from external vibration, thus suppressing influence of external vibration noise and reducing shifting of zero point, while achieving high measuring accuracy and stability.

It is also an object of the present invention to implement a Coriolis mass flowmeter which is improved to suppress both external propagation of vibration from the vibration tube and influence of external noise and stress, thus achieving high stability and measuring accuracy, as well as enhanced vibration-proof performance and reduced shift of zero point.

It is also an object of the present invention to provide a Coriolis mass flowmeter which has an ocillator capable of performing a stable ocillating operation without being influenced by thermal distortion of the vibration tube.

To these ends, according to one aspect of the present invention, there is provided a Coriolis mass flowmeter, comprising: a vibration tube through which a fluid to be measured flows so that the flow of the fluid in cooperation with angular vibration of the vibration tube generates Coriolis force which causes vibratory deformation of the vibration tube; wherein the vibration tube has a curved configuration which is point-symmetry with respect to the median point between an upstream fixed end and a downstream fixed end of the vibration tube and which has three inflection points, and performs, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube.

Preferably, the Coriolis mass flowmeter further comprises: an upstream ocillator and a downstream ocillator which are provided on the vibration tube; an upstream compensation vibrator extending along the, reference axis, the upstream compensation vibrator having one end fixed to the upstream ocillator so as to receive from the upstream ocillator a torsional force which acts around the reference axis in the phase inverse to that of the torsional force acting on the vibration tube, the other end of the upstream compensation vibrator being fixed to a portion of the vibration tube near the upstream fixed end so that the torsional force of the inverse phase and the torsional force on the vibration tube cancel each other at the fixed other end of the upstream compensation vibrator; and a downstream compensation vibrator extending along the reference axis, the upstream compensation vibrator having one end fixed to the downstream ocillator so as to receive from the downstream ocillator a torsional force which acts around the reference axis in the phase inverse to that of the torsional force acting on the vibration tube, the other end of the downstream compensation vibrator being fixed to a portion of the vibration tube near the downstream fixed end so that the torsional force of the inverse phase and the torsional force on the vibration tube cancel each other at the fixed other end of the downstream compensation vibrator.

In accordance with a second aspect of the present invention, there is provided a Coriolis mass flowmeter, comprising: a vibration tube through which a fluid to be measured flows; ocillators for ocillating the vibration tube to vibrate the vibration tube; and vibration sensors for sensing deformative vibration of the vibration tube caused by Coriolis force generated through cooperation between the flow of the fluid and angular vibration of the vibration tube; wherein the vibration tube has a curved configuration which is point-symmetry with respect to the median point between an upstream fixed end and a downstream fixed end of the vibration tube and which has three inflection points, and performs, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube; and wherein the ocillators and the vibration sensors are arranged on the vibration tube such that the locations and masses of the ocillators and the vibration sensors are point symmetry with respect to the median point, and such that the center of gravity is located on the median point.

The second aspect of the present invention also provides a Coriolis mass flowmeter, comprising: a vibration tube through which a fluid to be measured flows, the vibration tube having a curved configuration which is point-symmetry with respect to the median point between an upstream fixed end and a downstream fixed end of the vibration tube and which has three inflection points, the vibration tube performing, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube; ocillators for ocillating the vibration tube to vibrate the vibration tube, each of the ocillators having a magnet attached to the vibration tube and a coil disposed to face the magnet; vibration sensors for sensing deformative vibration of the vibration tube caused by Coriolis force generated through cooperation between the flow of the fluid and angular vibration of the vibration-tube, each of the vibration sensors having a magnet attached to the vibration tube and a coil disposed to face the magnet; and balancers attached to the vibration tube so as to cancel mass un balance caused by vibration of the magnets; wherein the magnets and the balancers are arranged on the vibration tube such that the locations and masses of the magnets and the balancers are point symmetry with respect to the median point, and such that the center of gravity is located on the median point.

Preferably, the vibration tube is gently curved with small curvatures so as to be small in size and so as to reduce pressure loss of the fluid flowing therethrough.

It is also preferred that the distance W of a point on the vibration tube where the curvature is greatest from the reference axis substantially falls within the range of:

$$\pm 0.01 \leq W/L \leq \pm 0.1$$

where L indicates the overall length of the vibration tube.

In accordance with a third aspect of the present invention, there is provided a Coriolis mass flowmeter, comprising: a vibration tube through which a fluid to be measured flows so that the flow of the fluid in cooperation with angular vibration of the vibration tube generates Coriolis force which causes vibratory deformation of the vibration tube wherein the vibration tube includes: a branching portion where the flow of the fluid branches into first and second channels; a merging portion where the first and second channels merge in each other; a first branch tube defining the first channel, the first branch tube having a curved configuration with three inflection points and point symmetry with respect to a first median point which is midst between a first upstream fixed end near the branching portion and leading to the first channel and a first downstream fixed end near the merging portion and leading from the first channel; a second branch tube defining the second channel having one end connected to the branching portion and the other end connected to the merging portion, and having the same configuration as the first branch tube, the second branch tube extending in parallel with the first branch tube; the Coriolis mass flowmeter further comprising: ocillators fixed to the first and second branch tubes for ocillating the first and second branch tubes in such a manner that each point on the first branch tube performs simple harmonic oscillation on an arc of a predetermined radius from a first reference axis which is the straight line which interconnects the first upstream fixed end and the first downstream fixed end, while each point on the second branch tube performs simple harmonic oscillation on an arc of a predetermined radius from a second reference axis which is the straight line which interconnects a second upstream fixed end and a second downstream fixed end, and that the first and second branch tubes are in plane-symmetry with respect to a reference plane which is at an equal distance from a first plane containing the first branch tube and a second plane which is parallel to the first plane and contains the second branch tube; and vibration sensors fixed to the first and second branch tubes, for sensing vibration of the first and second branch tubes.

Preferably, lead lines from the ocillators or from the vibration sensors are led externally of the mass flowmeter through the median points, through the upstream fixed ends, or through the downstream fixed ends.

It is also preferred that the Coriolis type mass further comprises: a first balancer attached to the first branch tube and a second balancer tube attached to the second branch tube; wherein the first balancer is provided such that the center of gravity of a system including the first branch tube, the ocillator or the vibration sensor attached to the first branch tube and the first balancer coincides with the median point of the first branch tube, and the second balancer is provided such that the center of gravity of a system including the second branch tube, the ocillator or the vibration sensor attached to the second branch tube and the second balancer coincides with the median point of the second branch tube.

The present invention in its fourth aspect provides a Coriolis mass flowmeter, comprising: a vibration tube through which a fluid to be measured flows so that the flow of the fluid in cooperation with angular vibration of the vibration tube generates Coriolis force which causes vibratory deformation of the vibration tube; wherein the vibration tube has a curved configuration which is point-symmetry with respect to the median point between an upstream fixed end and a downstream fixed end of the vibration tube and which has three inflection points, and performs, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube, the Coriolis mass flowmeter further comprising an ocillator provided on the median point and arranged to apply to the vibration tube a torque about the reference axis or the central axis of the vibration tube.

The fourth aspect of the present invention provides also a Coriolis mass flowmeter, comprising: a vibration tube through which a fluid to be measured flows so that the flow of the fluid in cooperation with angular vibration of the vibration tube generates Coriolis force which causes vibratory deformation of the vibration tube; comprising ocillators provided on portions of the vibration tube near an upstream fixed end and near a downstream fixed end of the vibration tube, so as to apply to the vibration force a torque about the central axis of the vibration tube or about a reference axis which is a straight line interconnecting the upstream fixed end and the downstream fixed end of the vibration tube.

Preferably, the ocillators comprise at least one pair of ocillators, two ocillators of the pair being arranged along the outer peripheral surface of the vibration tube in symmetry with each other with respect to a plane containing the central axis of the vibration tube, the ocillators being secured to the vibration tube obliquely to the central axis so as to perform expansion and contraction obliquely to the central axis in opposite phases to each other, thereby applying torsional force to the vibration tube.

In accordance with the fifth aspect of the present invention, there is provided a Coriolis mass flowmeter, comprising: a vibration tube through which a fluid to be measured flows so that the flow of the fluid in cooperation with angular vibration of the vibration tube generates Coriolis force which causes vibratory deformation of the vibration tube; wherein the vibration tube has a curved configuration which is point-symmetry with respect to the median point between an upstream fixed end and a downstream fixed end of the vibration tube and which has three inflection points, and performs, while maintaining the curved configuration, simple harmonic oscillation such that each point on the vibration tube oscillates on an arc of a predetermined radius from a reference axis which is a straight line interconnecting the upstream fixed end and the downstream fixed end of the vibration tube; the Coriolis mass flowmeter further comprising: vibration sensors arranged to oppose each other across or around at a plane which is equally spaced from the upstream fixed end and the downstream fixed end of the vibration tube.

Preferably, the vibration sensors includes: a first vibration sensor disposed on a straight line which contains the median point and which is perpendicular to a vibration tube plane containing the curve of the vibration tube, the first vibration sensor being sensitive only to the vibration component that is perpendicular to the vibration tube plane; and a second vibration sensor disposed on a straight line which contains the median point and which is sensitive only to the vibration component that is parallel to the vibration tube plane and perpendicular to the reference axis.

Alternatively, the vibration sensors are arranged on a straight line which contains the median point and which is perpendicular to a vibration tube plane containing the curve of the vibration tube, such that the vibration sensors are highly sensitive to the vibration component in the direction perpendicular to the vibration tube plane and has small sensitivity to the vibration component in the direction parallel to the vibration tube plane and perpendicular to the reference axis, thereby increasing the ratio of the amplitude of Coriolis vibration to the amplitude of the ocillated vibration.

The arrangement also may be such that the vibration sensors are arranged in point-symmetry with respect to the median point and have sensitivity only to vibration components in the direction perpendicular to the vibration tube plane which contains the curve of the vibration tube, thereby increasing the ratio of the amplitude of Coriolis vibration to the amplitude of the ocillated vibration.

In accordance with a sixth aspect of the present invention, there is provided a Coriolis mass flowmeter, comprising: a vibration tube through which a fluid to be measured flows so that the flow of the fluid in cooperation with angular vibration of the vibration tube generates Coriolis force which causes vibratory deformation of the vibration tube; wherein the vibration tube includes: a branching portion where the flow of the fluid branches into first and second channels; a merging portion where the first and second channels merge in each other; a first branch tube defining the first channel, the first branch tube having a curved configuration with three inflection points and point symmetry with respect to a first median point which is midst between a first upstream fixed end near the branching portion and leading to the first channel and a first downstream fixed end near the merging portion and leading from the first channel; a second branch tube defining the second channel having one end connected to the branching portion and the other end connected to the merging portion, and having the same configuration as the first branch tube and contained in the same plane as the first branch tube, the position of the second branch tube being determined by translationally moving the position of the first branch tube; the Coriolis mass flowmeter further comprising: ocillators for ocillating the first and second branch tubes; and vibration sensors for sensing the vibration of the first and second branch tubes.

The ocillators may be arranged for ocillating the first and second branch tubes while maintaining the point-symmetry configurations of the first and second branch tubes, in such a manner that each point on the first branch tube performs simple harmonic oscillation on an arc of a predetermined radius from a first reference axis which is the straight line which interconnects the first upstream fixed end and the first downstream fixed end, while each point on the second branch tube performs simple harmonic oscillation on an arc of a predetermined radius from a second reference axis which is the straight line which interconnects a second upstream fixed end and a second downstream fixed end, and that the first and second branch tubes vibrate in the same vibration mode and at the same frequency in opposite phases to each other.

The arrangement may be such that lead lines from the ocillators or from the vibration sensors are led externally of the mass flowmeter through the median points, through the upstream fixed ends, or through the downstream fixed ends.

The Coriolis mass flowmeter of the sixth aspect may further comprise: a first balancer attached to the first branch tube and a second branch tube attached to the second branch tube; wherein the first balancer is provided such that the center of gravity of a system including the first branch tube, the ocillator or the vibration sensor attached to the first branch tube and the first balancer coincides with the median point of the first branch tube, and the second balancer is provided such that the center of gravity of a system including the second branch tube, the ocillator or the vibration sensor attached to the second branch tube and the second balancer coincides with the median point of the second branch tube.

These and other objects, features and advantages of the present invention will become clear from the following description of preferred embodiments taken in conjunction with the accompanying drawings.

DESCRIPTION OF THE PREFERRED EMBODIMENTS

Figure 1:
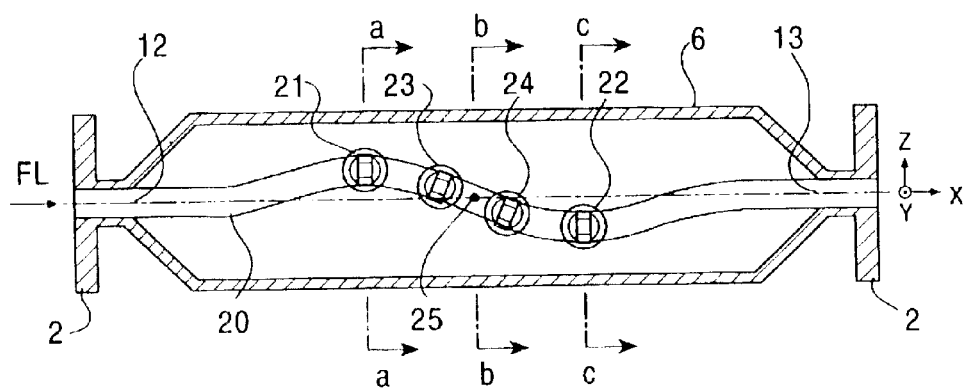
FIG. 1 is a schematic illustration of a critical portion of an embodiment of the present invention.

The present invention will be further described with reference to the drawings. FIG. 1 is an illustration of a critical portion of an embodiment of the present invention, while FIGS. 2, 3, 4 and 5 are illustrations explanatory of the operation of the embodiment shown in FIG. 1.

Figure 74:
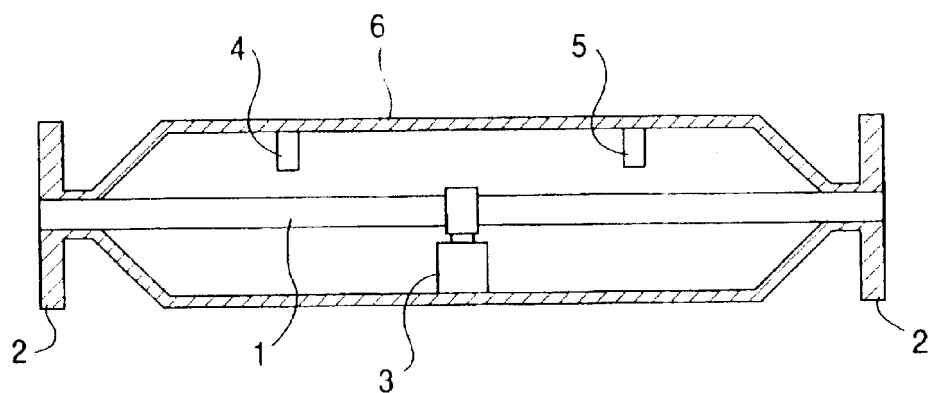
FIG. 74 is an illustration of a critical portion of a known structure.
Figure 75:
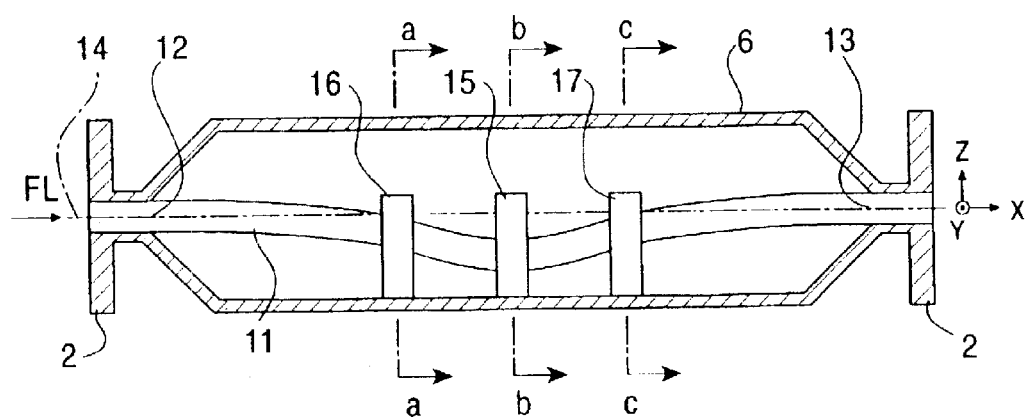
FIG. 75 is an illustration of a critical portion of another known structure.
Figure 76:
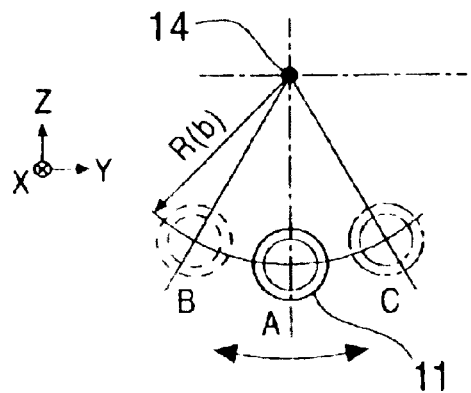
FIGS. 76 to 78 are illustrations of operation of the known structure shown in FIG. 74.
Figure 77:
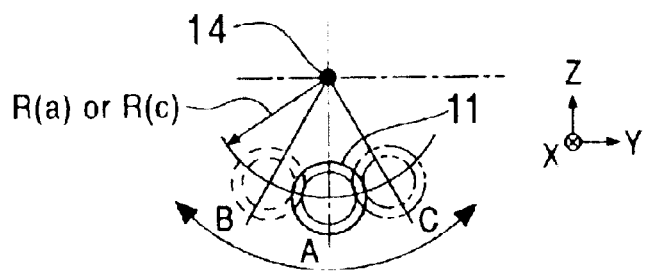
Figure 78:
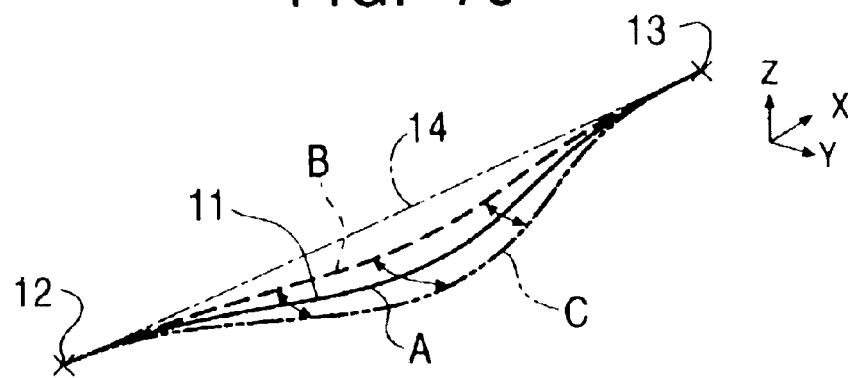

In these Figures, the same reference numerals as those used in FIG. 74 depict the components or parts having the same functions.

The following description therefore will be focused on the points that distinguish the embodiment from the known arrangement shown in FIG. 74.

Referring to these Figures, a fluid FL as the measuring object flows through a vibration tube 20 which is connected to external piping through flanges 2, 2. Numeral 6 denotes a housing of the flowmeter, 12, 13 denote upstream and downstream fixed ends of the vibration tube, and 14 denotes a reference axis which is a line interconnecting both fixed ends.

Ocillators 21 and 22 ocillate the vibration tube 20 to apply forces in the direction of the Y-direction to the vibration tube 20.

More specifically, the ocillators 21 and 22 apply forces of the same magnitude in opposite phases to each other.

Vibration sensors 23 and 24 measure the vibration velocity or amount of deformation in the direction of the Y-direction.

As will be seen from the Figures, the vibration tube 20 has a curved configuration like "S" which is point-symmetry with respect to the median point 25 between the upstream fixed end 12 and the downstream fixed end 13 and which has three inflection points. At a portion of the vibration tube 20 near each fixed end, the center of the vibration tube 20 lies on the reference axis 14.

Figure 2:
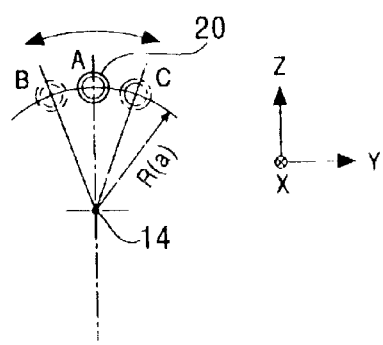
FIGS. 2 to 5 are illustrations of operation of the embodiment shown in FIG. 1.
Figure 3:
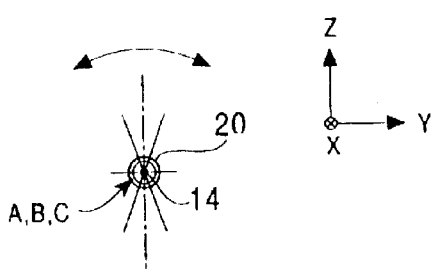
Figure 4:
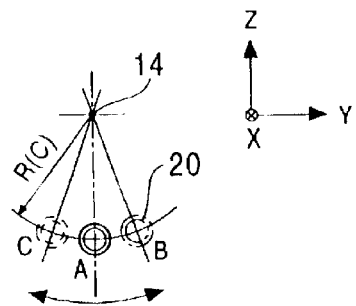

FIG. 2 is a cross-sectional view taken along the line a—a of FIG. 1. FIG. 3 is a cross-sectional view taken along the line b—b of FIG. 1. FIG. 4 is a cross-sectional view taken along the line c—c of FIG. 1.

For the clarification purpose, the housing 6 and the ocillators 21 and 22 are omitted from these Figures. Thus, only the vibration tube 20 is shown in these Figures. The ocillators 21 and 22 apply forces of opposite phases in the Y-direction, so that the vibration tube 20 continuously change its position, from a position A to a position B, from the position B back to the position A, from the position A to a position C and back again therefrom to the position A.

At the cross-section b—b which is midst between both fixed ends, the vibration tube only performs vibratory rotational motion about the reference axis 14, without changing its position.

Figure 5:
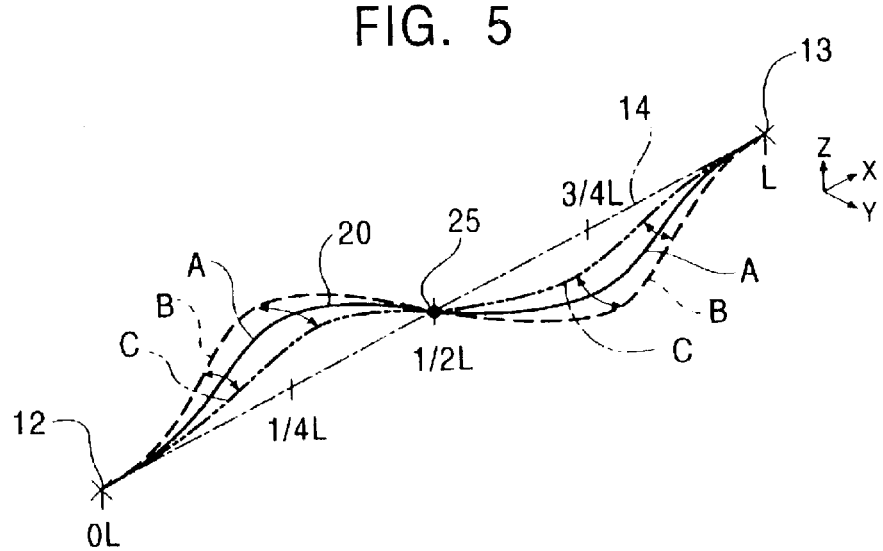

As will be seen from FIG. 5, each point on the vibration tube 20 is always on an arc of a predetermined radius from the reference axis 14.

More specifically, at the cross-section a—a, the vibration tube performs simple harmonic oscillation on an arc of a radius R(a) from the reference axis 14, whereas, at the cross-section c—c, it performs simple harmonic oscillation on an arc of a radius R(c) from the reference axis 14.

At the cross-section b—b which is midst between the fixed ends 12 and 13, the radius R(b) is zero, so that the vibration tube performs only vibratory rotary motion without changing its position.

In these Figures, the vibration is illustrated in an exaggerated manner with greater amplitudes. In actual Coriolis mass flowmeter, however, the vibration amplitude is extremely small. The circular vibratory motion can be approximated by the components in the Y-direction alone, when the vibration amplitude is very small.

From a strict point of view, the ocillators 21 and 22, as well as the vibration sensors 23 and 24, should deal with motion components in the direction of the Z-direction or the rotational component of the motion. Practically, however, it suffices only to use ocillators and sensors which are arranged only for the Y components of the motion, for the reason stated above.

FIG. 5 schematically shows the manner of the vibration. The vibration tube vibrates to continuously change its position, from the position A to the position B, from the position B back to the position A, from the position A to the position C and back again therefrom to the position A and so on.

The vibration amplitude is greatest at the points of about L/4 and 3L/4 of the tube. Motions at the positions near both fixed ends 12 and 13 and at the median point ½ of L have almost no components (UX, UY and UZ) in the direction of the reference axis and in the directions perpendicular thereto, although rotational vibration (RotX) occurs at each of such positions.

Thus, the vibration tube 20 performs, while maintaining its curved configuration, a simple harmonic oscillation on an arc of a predetermined radial distance from the reference axis 14 which is defined as the straight line interconnecting the upstream fixed end 12 and the downstream fixed end 13 of the vibration tube 20.

In consequence, the described embodiment offers the following advantages.

(1) By virtue of the simple harmonic vibration on a circle, the motion of the vibration tube 20 at its fixed ends 12 and 13 is composed mainly of rotational vibratory component occurring about the reference axis 14. Thus, forces acting in the direction of the reference axis, as well as forces acting in direction perpendicular to the reference axis 14, are greatly suppressed at these fixed ends 12 and 13, thus achieving high stability, measuring accuracy and vibration-proof performance of the Coriolis mass flowmeter.

(2) The point-symmetry configuration of the vibration tube 20 and the point-symmetry vibration mode of the same ensure that the center of gravity of the vibration tube 20 is always held at the median point 25 between the fixed ends 12 and 13 without shifting therefrom.

Elimination of shifting of the gravity center suppresses external propagation of vibration through the fixed ends 12 and 13, thus improving vibration isolating performance of the Coriolis mass flowmeter.

(3) The improvement in the vibration isolating performance also serves to suppress influence of vibration noise which may otherwise be introduced from external systems. It is therefore possible to reduce electrical power consumption and to suppress any fluctuation of the measuring output and the shift of zero point which are attributable to changes in ambient conditions and external factors, thus achieving high stability and measuring accuracy of the Coriolis mass flowmeter.

(4) The flow passage for the fluid is formed by a single vibration tube 20 which has a gently-curved curvilinear configuration approximating a straight tube, without any branch or discontinuity between the fluid inlet and outlet. This feature serves to provide a compact structure and reduced pressure loss of the Coriolis mass flowmeter, while enhancing resistance to thermal stress caused by a change in the temperature of, for example, the flowing fluid.

Figure 6:
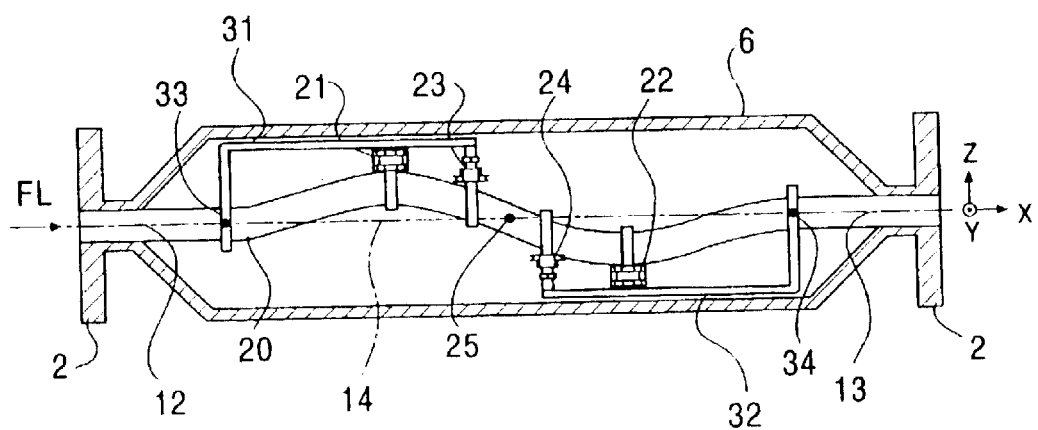
FIG. 6 is an illustration of a critical portion of another embodiment of the present invention.
Figure 7:
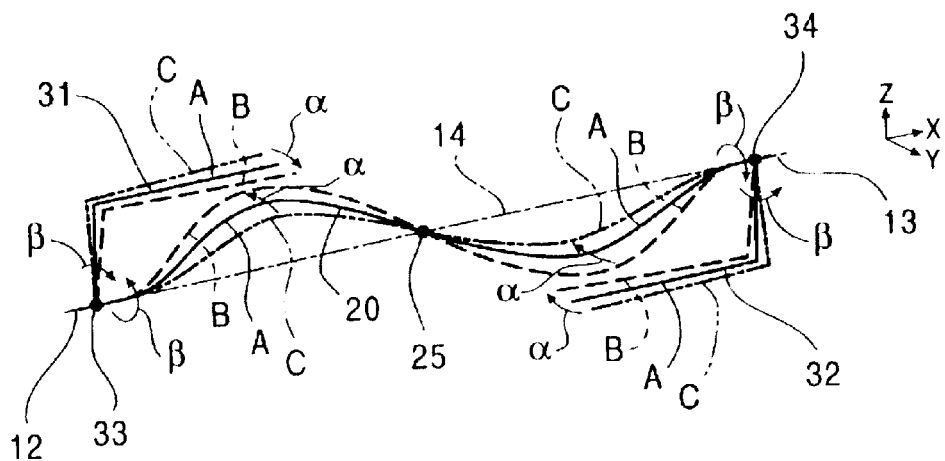
FIG. 7 is an illustration of operation of the embodiment shown in FIG. 6.

FIG. 6 is an illustration explanatory of the structure of a critical portion of another embodiment of the present invention, while FIG. 7 is an illustration explanatory of operation of the embodiment shown in FIG. 6.

This embodiment employs an upstream compensation vibrator 31 and a downstream compensation vibrator 32.

The upstream compensation vibrator 31 and the downstream compensation vibrator 32 are connected to the vibration tube 20 at connecting points 33 and 34 which are located near the upstream fixed end 12 and the downstream fixed end 13, respectively.

Free portions of the upstream compensation vibrator 31 and the downstream compensation vibrator 32 extend towards the longitudinal center of the flowmeter in parallel with the reference axis 14. Ocillators 21 and 22, as well as vibration sensors 23 and 24, are provided between the compensation vibrators 31, 32 and the vibration tube 20.

The upstream compensation vibrator 31, the ocillator 21 and the vibration sensor 23 are arranged in point symmetry with the downstream compensation vibrator 32, the ocillator 22 and the vibration sensor 24, respectively, with respect to the median point 25.

Each of the ocillators 21 and 22 has, for example, a solenoid coil and a permanent magnet, and is disposed between the vibration tube 20 and the compensation vibrator 31 or 32. Therefore, each of the compensation vibrators 31 and 32 and the vibration tube 20 vibrate in the Y-direction and in inverse phases to each other, due to the principle of action and reaction.

Thus, the upstream compensation vibrator 31 extends along the reference axis 14 and is fixed at its one end to the upstream ocillator 21, so as to receive from the upstream ocillator 21 a torsional force so as to vibrate about the reference axis 14 in the phase opposite to the phase of vibration of the vibration tube 20. The other end of the upstream compensation vibrator 31 is fixed to a portion of the vibration tube 20 near the upstream fixed end 12, so that the vibration of the upstream compensation vibrator 31 and the vibration of the vibration tube 20 which are in opposite phases cancel each other at the portion of the vibration tube 20 where the upstream compensation vibrator 31 is fixed.

Likewise, the downstream compensation vibrator 32 extends along the reference axis 14 and is fixed at its one end to the downstream ocillator 22, so as to receive from the downstream ocillator 22 a torsional force so as to vibrate about the reference axis 14 in the phase opposite to the phase of vibration of the vibration tube 20. The other end of the downstream compensation vibrator 32 is fixed to a portion of the vibration tube 20 near the downstream fixed end 12, so that the vibration of the downstream compensation vibrator 32 and the vibration of the vibration tube 20 which are in opposite phases cancel each other at the portion of the vibration tube 20 where the downstream compensation vibrator 32 is fixed.

The manner in which the above-described structure vibrate is schematically shown in FIG. 7. The vibration tube 20 and each of the compensation vibrators 31, 32 perform simple harmonic oscillation while changing their positions, from a position A to a position B, from the position B back to the position A, from the position A to a position C and back again therefrom to the position A, and so on.

Only a single stroke of oscillation, from a position B to a position A and then to a position C is shown in FIG. 7 and represented by the arrow α.

The behavior of the portion near the upstream connecting point 33 will be discussed below.

The portion of the vibration tube 20 between the connecting point 33 and the median point undergoes a counterclockwise torsion β about the X-axis, due to the vibration of the vibration tube 20.

On the other hand, the portion of the compensation vibrator 31 near the connection point 33 undergoes a clockwise torsion β about the X-axis. Consequently, the counterclockwise and clockwise torsions cancel each other at the connecting point 33, so that no rotational vibration takes place at the connecting point 33.

For this reason, no vibration is transmitted to the fixed end 12 which is on the outer side of the connecting point 33.

The same applies also to the downstream connection point 34.

The portion of the vibration tube 20 between the connecting point 34 and the median point undergoes a clockwise torsion β about the X axis, due to the vibration of the vibration tube 20.

On the other hand, the portion of the compensation vibrator 32 near the connection point 34 undergoes a counterclockwise torsion β about the X-axis. Consequently, the clockwise and counterclockwise torsions cancel each other at the connecting point 34, so that no rotational vibration takes place at the connecting point 34.

For this reason, no vibration is transmitted to the fixed end 13 which is on the outer side of the connecting point 34.

Thus, the vibration systems always maintain the point-symmetrical geometry with respect to the median point 25, even though the positions are changed due to the ocillated vibration.

In consequence, rotational components of vibrations of the vibration tube 20 at portions thereof near the fixed ends 12 and 13 about the reference axis 14 are almost nullified, thus achieving further enhancement of vibration isolating effect in the Coriolis mass flowmeter.

Figure 8:
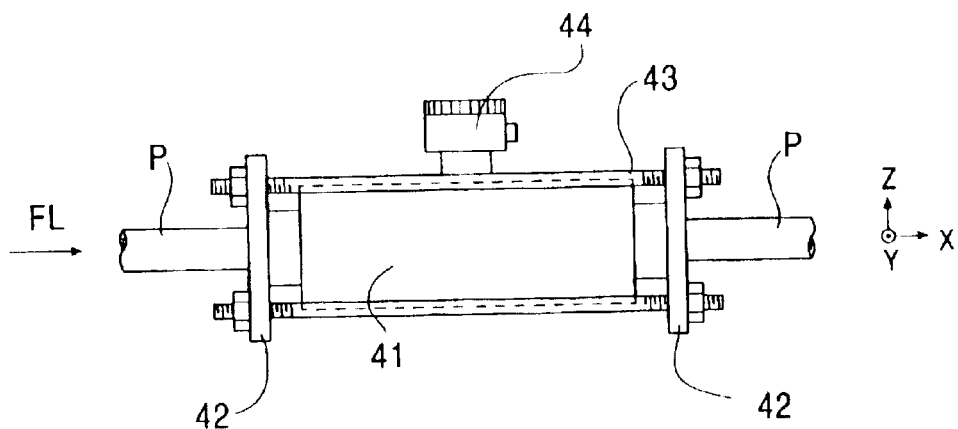
FIG. 8 is an illustration of a critical portion of still another embodiment of the present invention.
Figure 9:
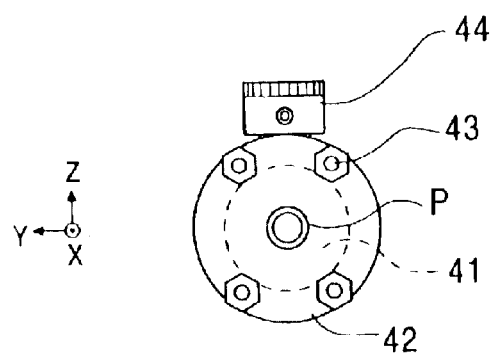
FIG. 9 is a side elevational view of the embodiment shown in FIG. 8.

FIG. 8 is an illustration of a critical part of still another embodiment of the present invention.

This embodiment features a wafer-type connecting structure instead of the conventional flange-type connecting structure.

Referring to this Figure, numeral 41 designates a main unit of a Coriolis mass flowmeter having a construction which is the same as that shown in FIG. 1 or FIG. 6. External piping is designated at P.

Numeral 42 denotes wafer plates that clamp the main unit 41 of the Coriolis mass flowmeter and the external pipes P. Numeral 43 denotes tie bolts for fastening the wafer plates 42 together.

Numeral 44 designates a transducer unit attached to the main part 41 of the Coriolis mass flowmeter.

The structure shown in FIG. 1 or 6 has improved vibration isolating performance and, therefore, permits greater versatility of the connecting arrangement.

It is thus possible to use the wafer-type connecting construction which affords more rigid connection than flanges.

Consequently, requirements concerning position of installation becomes less severe, thus implementing a Coriolis mass flowmeter which has enhanced versatility of installation and which reduces total costs.

A description will now be given of a second aspect of the present invention.

In the Coriolis mass flowmeter of the first aspect, when each of the ocillators and the vibration sensors is composed of a magnet and a coil, the magnet being fixed only to one side of the vibration tube, unbalance is caused in the mass distribution of the whole vibration system. Such mass unbalance causes a shift of the center of gravity of the whole vibration system, thus allowing external propagation of vibration. The second aspect of the present invention solves this problem.

Figure 10:
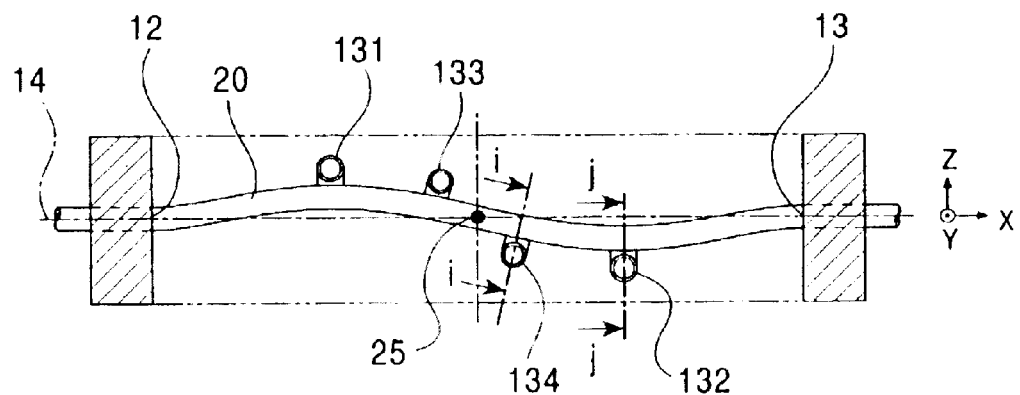
FIG. 10 shows the structure of a critical portion of an embodiment in the second aspect of the present invention.
Figure 11:
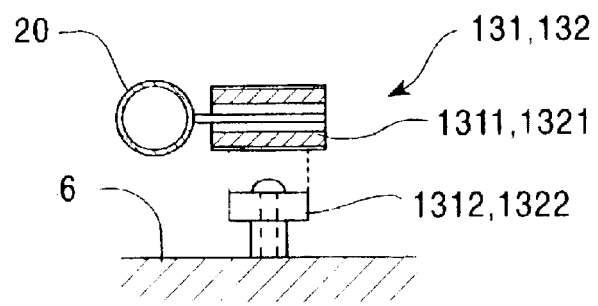
FIG. 11 is a sectional view taken along the line i—i of FIG. 10.
Figure 12:
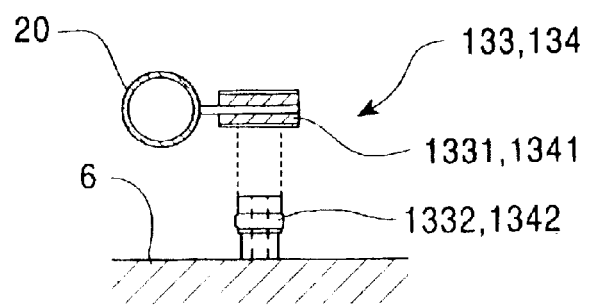
FIG. 12 is a sectional view taken along the line j—j of FIG. 10.

FIG. 10 is an illustration of a critical portion of an embodiment of a second aspect of the present invention. FIG. 11 is a cross-sectional view taken along the line i—i of FIG. 10. FIG. 12 is a cross-sectional view taken along the line j—j of FIG. 10.

The embodiment shown in FIGS. 10 to 12 employs ocillators 131, 132 and vibration sensors 133, 134.

The exciters 131 and 132 have coils 1311 and 1321 attached to the vibration tube 20. The vibration tube 20 and the coils 1311, 1321 have geometrical centers or centers of gravity on a common plane which is the plane defined by X and Z-axes in FIG. 10.

The coils 1311 and 1321 are associated with magnets 1312 and 1322 which are fixed to a stationary portion of the flowmeter such as the housing 6.

Vibration sensors 133 and 134 have coils 1331 and 1341 attached to the vibration tube 20. The vibration tube 20 and the coils 1331, 1341 have geometrical centers or centers of gravity on a common plane which is the plane defined by X and Z-axes in FIG. 10.

The coils 1331 and 1341 are associated with magnets 1332 and 1342 which are fixed to a stationary portion of the flowmeter such as the housing 6.

In a practical arrangement, the coils 1311, 1321, 1331 and 1341 have a cylindrical form and receive the associated magnets 1312, 1322, 1332 and 1342, respectively. In the drawings, however, the magnets and coils are illustrated as being spaced from each other for the purpose of clarification.

With this arrangement, it is possible to achieve a well-balanced mass distribution of not only the vibration tube 20 per se but also of the whole vibration system including the ocillators 131, 132 and the vibration sensors 133, 134. It is also possible to locate the center of gravity of the whole vibration system at the median point 25 between the upstream fixed end 12 and the downstream fixed end 13 and to achieve a point-symmetry mass distribution of the whole vibration system with respect to the median point 25.

The described arrangement further immobilize the center of gravity of the whole system and to achieve well-balanced mass distribution, thus improving vibration isolating performance to prevent internal vibration from being propagated externally of the mass flowmeter.

The improvement in the vibration isolating performance offers the following advantages.

The housing 6 of the mass flowmeter receives and accommodates any external vibration and stress transmitted from pipes connected to the mass flowmeter, so that the internal vibration is not influenced by such external vibration and stress, thereby suppressing undesirable effects on the Coriolis mass flowmeter such as fluctuation of the measuring output, shift of zero point, and so forth.

Prevention of external propagation from the internal vibration tube 20 produces the following advantageous effects (i) to (iii).

(i) The Q value is increased to stabilize the internal vibration, thus reducing influence of vibration noise on the Coriolis mass flowmeter.

(ii) Ocillatation is possible with smaller energy, so that the electrical power consumed by the Coriolis mass flowmeter can be reduced.

(iii) By virtue of the high Q value and the reduced transmission of vibration from the internal system, the vibration transmitted from the internal system does not vary significantly against changes in environmental conditions or factors such as the method of installation, stresses in the external pipes, temperature, and so forth. It is thus possible to obtain a Coriolis mass flowmeter which exhibits high stability of the zero point and the span against changes in such environmental conditions or factors.

Figure 13:
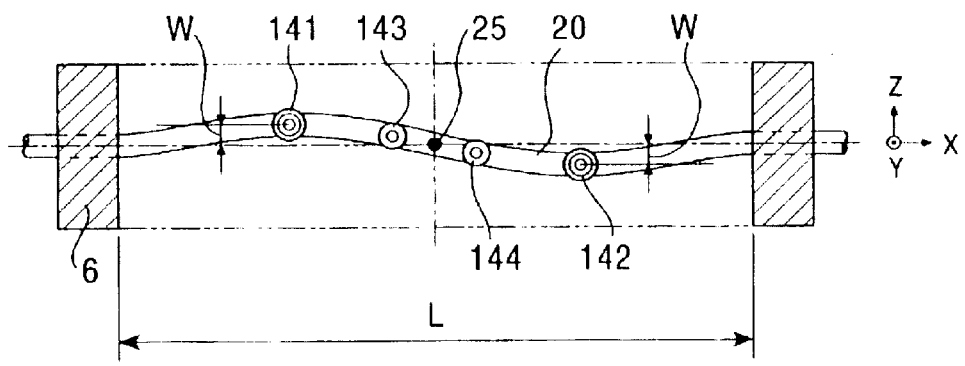
FIG. 13 shows the structure of a critical portion of another embodiment in the second aspect of the present invention.
Figure 14:
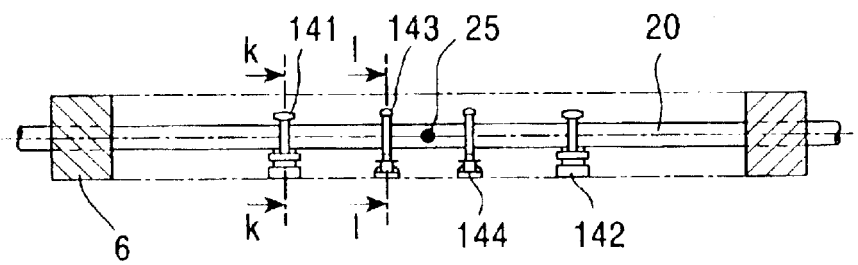
FIG. 14 is a side elevational view of the embodiment shown in FIG. 13.
Figure 15:
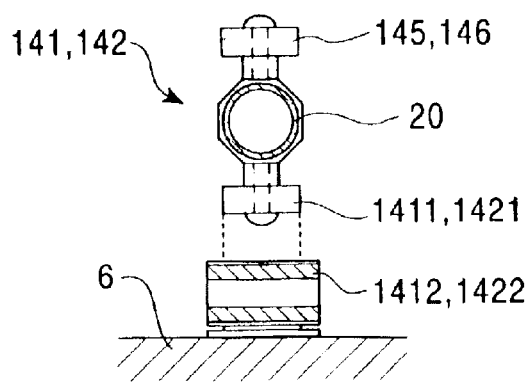
FIG. 15 is a sectional view taken along the line k—k of FIG. 14.
Figure 16:
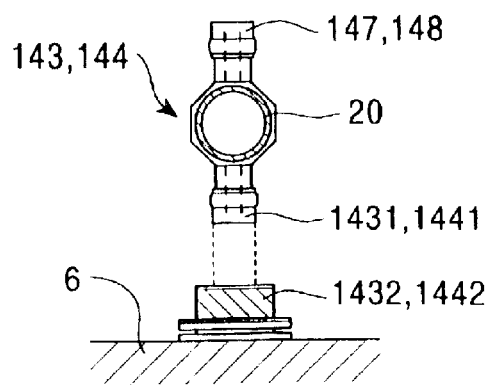
FIG. 16 is a sectional view taken along the line l—l of FIG. 14.

FIG. 13 shows a critical portion of another embodiment in the second aspect of the present invention. FIG. 14 is a side elevational view of the embodiment shown in FIG. 13. FIG. 15 is a cross-sectional view taken along the line k—k of FIG. 13. FIG. 16 is across-sectional view taken along the line l—l of FIG. 13.

This embodiment employs ocillators 141, 142 and vibration sensors 143, 144.

As shown in FIG. 15, the ocillator 141 has a magnet 1411 and a coil 1412, while the ocillator 142 has a magnet 1421 and a coil 1422. The magnets 1411 and 1421 are attached to the vibration tube 20. The coils 1412 and 1422 are fixed to a non-vibratory member such as the housing 6, so as to oppose the associated magnets 1411 and 1421.

As shown in FIG. 16, the vibration sensor 143 has a magnet 1431 and a coil 1432, while the vibration sensor 144 has a magnet 1441 and a coil 1442. The magnets 1431 and 1441 are attached to the vibration tube 20. The coils 1432 and 1442 are fixed to a non-vibratory member such as the housing 6, so as to oppose the associated magnets 1431 and 1441.

In a practical arrangement, the coils 1412, 1422, 1432 and 1442 have a cylindrical form and receive the associated magnets 1411, 1421, 1431 and 1441, respectively. In the drawings, however, the magnets and coils are illustrated as being spaced from each other, for the purpose of clarification.

This embodiment employs balancers 145, 146, 147 and 148 which are of the same mass and shape as the magnets 1411, 1421, 1431 and 1441.

These balancers 145, 146, 147 and 148 are attached to the vibration tube 20 at positions in the plane defined by the X and Z-axes in symmetry with corresponding magnets 1411, 1421, 1431 and 1441 with respect to the center of the vibration tube 20.

It will be seen that the balancers 145 and 146 balance with the magnets 1411 and 1421 of the ocillators 141 and 142, respectively. Likewise, the balancers 147 and 148 balance with the magnets 1431 and 1441 of the vibration sensors 143 and 144, respectively.

This embodiment offers the same advantages as those offered by the preceding embodiment described in connection with FIG. 10.

The ocillators 141, 142 and the vibration sensors 143, 144 can be disposed on the same X-Z coordinate position as the tube axis, so that the Coriolis mass flowmeter can have a compact structure which saves installation space.

In a practical example of the Coriolis mass flowmeter of this embodiment, the vibration tube 20 is made of a stainless steel and has an outside diameter of 14 mm, thickness of 1 mm, overall length L of 500 mm, and the distance W from the reference axis 14 at the point of the greatest curvature of 15 mm. The mass M of each of the ocillators 141 and 142 inclusive of the balancers is 21 g, and the mass M of each of the vibration sensors 143, 144 inclusive of the balancers is 11 g.

In this practical example, the resonance frequency of the circular vibration mode is 570 Hz (experimental value). The resonance frequency of the lower mode is 220 Hz and the resonance frequency of the higher mode is 1200 Hz.

Thus, the ratio W/L of the distance W from the reference axis at the point of the greatest curvature to the overall length L is 0.03 (15/500).

In this embodiment, superior total balance is obtainable when the ratio W/L falls within the range shown below, although the value of the ratio varies depending on physical properties and the curved configuration of the vibration tube 20, as well as the masses of the appended components.

$$\text{aprox. } \pm 0.01 \leq W/L \leq \text{approx. } \pm 0.1$$

A small value of the ratio W/L causes the resonance frequency of the torsional mode of vibration to increase to an excessively high value, and at too small value of the ratio W/L, resonance mode of circular vibration does not materially exist.

Conversely, a too large value of the ratio W/L causes the size of the vibration tube 20 and, hence, of the whole flowmeter to increase to raise the cost of production.

It will be seen also that a too large curvature of the vibration tube 20 correspondingly increases the resistance to the flow of the fluid in the vibration tube.

In the practical example described before in which the ratio W/L is 0.03, the vibration tube has a gently curved configuration with small curvature approximating a straight tube, thus achieving a compact structure with small pressure drop of the fluid.

When the resonance frequency of the ocillated vibration mode is as low as several tens of Hertz, the vibration system becomes more susceptible to the external noise introduced from the external pipes, and the size of the vibration system also is increased. Consequently, the mass flowmeter occupies a greater space to raise the total cost of equipment in which the flowmeter is used.

Conversely, if the resonance frequency of the ocillated vibration mode is as high as 1000 Hz or above, the amplitude of the vibration is so small and higher signal processing speed is required necessitating a circuit capable of performing such a high-speed signal processing.

The resonance frequency on the order of several hundreds of Hz as in the aforementioned practical example is preferred from the viewpoints of elimination of vibration noise and the specifications of the signal processing circuit.

It is also preferred that the vibration tube 20 be designed and constructed so as to eliminate any unnecessary resonance mode of a frequency near the frequency of the ocillated vibration. More preferably, the resonance frequencies of the lower and higher modes are largely spaced apart from the frequency of the ocillated vibration, as in the practical example described before.

Figure 17:
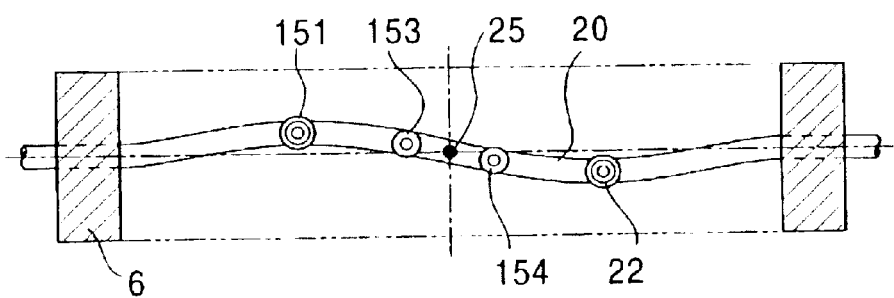
FIG. 17 shows the structure of a critical portion of still another embodiment in the second aspect of the present invention.
Figure 18:
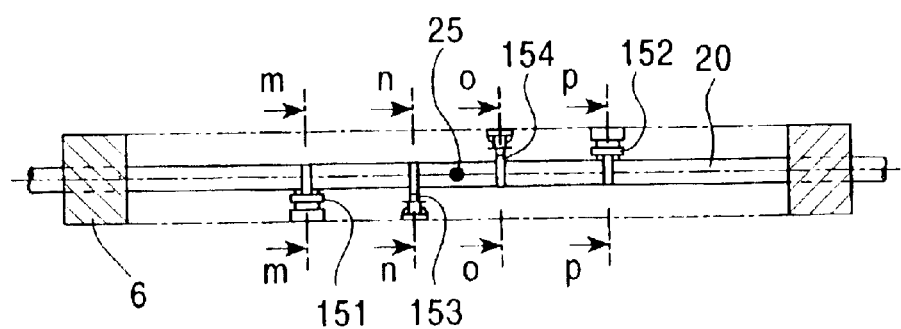
FIG. 18 is a side elevational view of the embodiment shown in FIG. 17.
Figure 19:
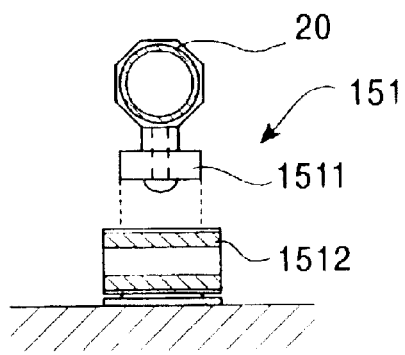
FIG. 19 is a sectional view taken along the line m—m of FIG. 17.
Figure 20:
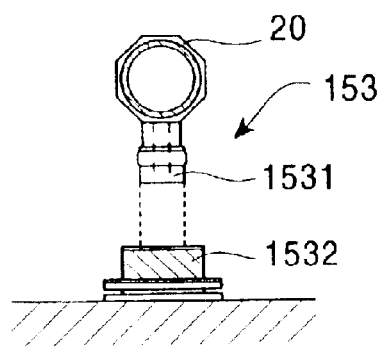
FIG. 20 is a sectional view taken along the line n—n of FIG. 17.
Figure 21:
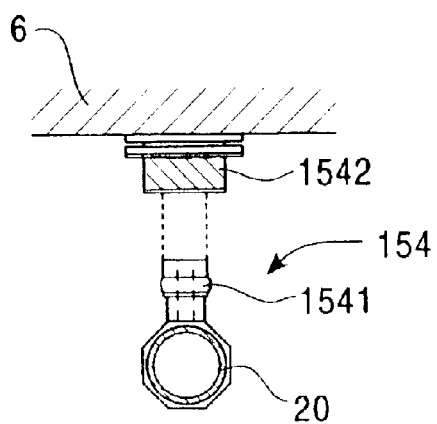
FIG. 21 is a sectional view taken along the line o—o of FIG. 17.
Figure 22:
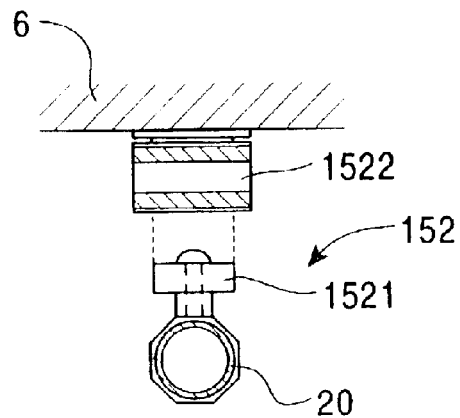
FIG. 22 is a sectional view taken along the line p—p of FIG. 17.

FIG. 17 shows a critical portion of still another embodiment in the second aspect of the present invention. FIG. 18 is a side elevational view of the embodiment shown in FIG. 17. FIG. 19 is a cross-sectional view taken along the line m—m of FIG. 13. FIG. 20 is a cross-sectional view taken along the line n—n of FIG. 18. FIG. 21 is a cross-sectional view taken along the line o—o of FIG. 18. FIG. 22 is a cross-sectional view taken along the line p—p of FIG. 18.

This embodiment employs ocillators 151, 152 and vibration sensors 153, 154.

As shown in FIGS. 19 and 22, the ocillator 151 has a magnet 1511 and a coil 1512, while the ocillator 152 has a magnet 1521 and a coil 1522. The magnets 1511 and 1521 are attached to the vibration tube 20. The coils 1512 and 1522 are fixed to a non-vibratory member such as the housing 6, so as to oppose the associated magnets 1511 and 1521.

As shown in FIGS. 20 and 21, the vibration sensor 153 has a magnet 1531 and a coil 1532, while the vibration sensor 154 has a magnet 1541 and a coil 1542. The magnets 1531 and 1541 are attached to the vibration tube 20. The coils 1532 and 1542 are fixed to a non-vibratory member such as the housing 6, so as to oppose the associated magnets 1531 and 1541.

In a practical arrangement, the coils 1512, 1522, 1532 and 1542 have a cylindrical form and receive the associated magnets 1511, 1521, 1531 and 1541, respectively. In the drawings, however, the magnets and coils are illustrated as being spaced from each other, for the purpose of clarification.

Thus, the components of the ocillator 151 and the vibration sensor 153 and the components of the ocillator 152 and the vibration sensor 154 are arranged in a point-symmetrical manner with respect to the median point 25, and the gravity center of the portions where the ocillators 151, 152 and the vibration sensors 153, 154 are attached to the vibration tube 20 is located on the median point 25. The gravity center is always held substantially on the median point 25 despite the ocillated vibration of the vibration tube 20.

Figure 23:
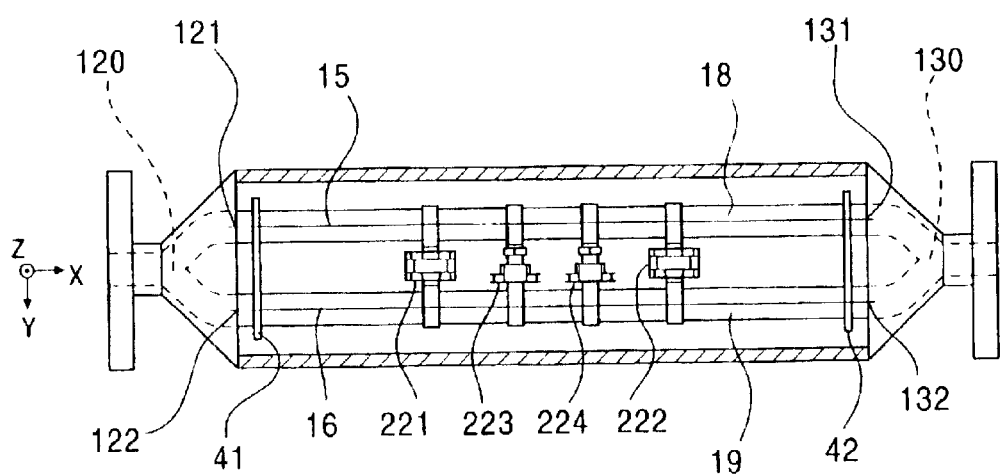
FIG. 23 shows the structure of a critical portion of an embodiment in the third aspect of the present invention.
Figure 24:
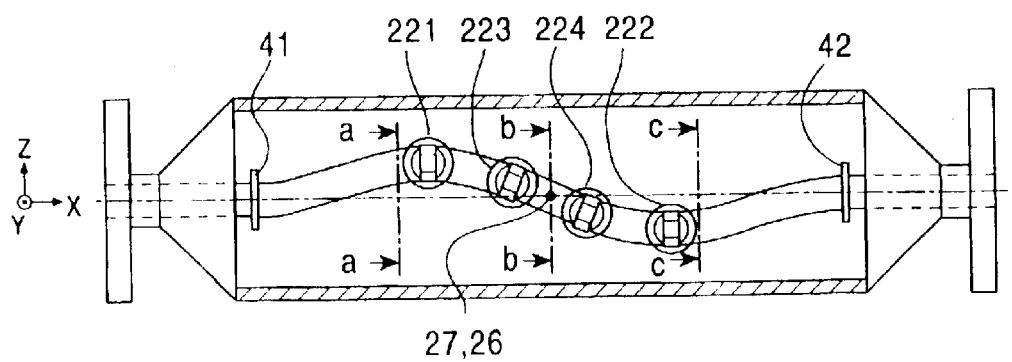
FIG. 24 is an end view of the embodiment shown in FIG. 23.
Figure 29:
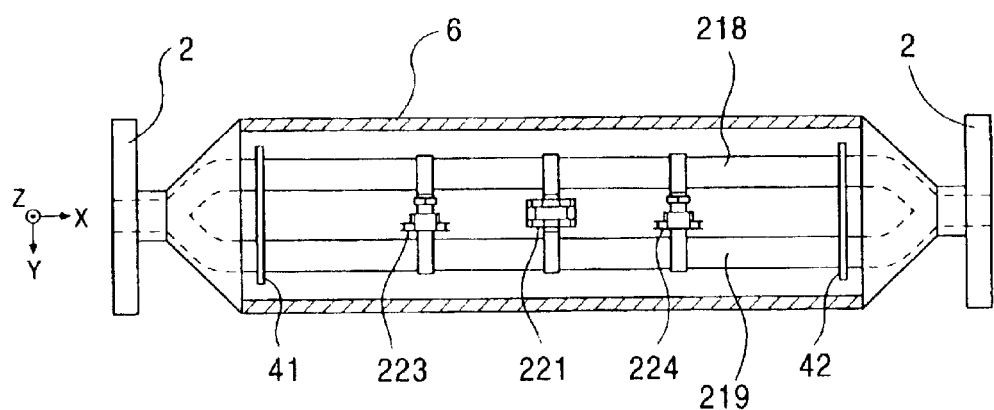
FIG. 29 is an illustration of a conventional structure.
Figure 30:
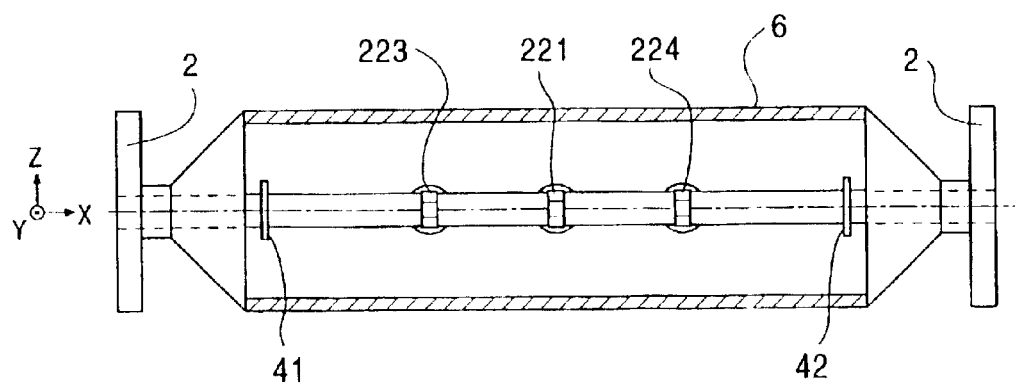
FIG. 30 is a side elevational view of the structure shown in FIG. 29.
Figure 31:
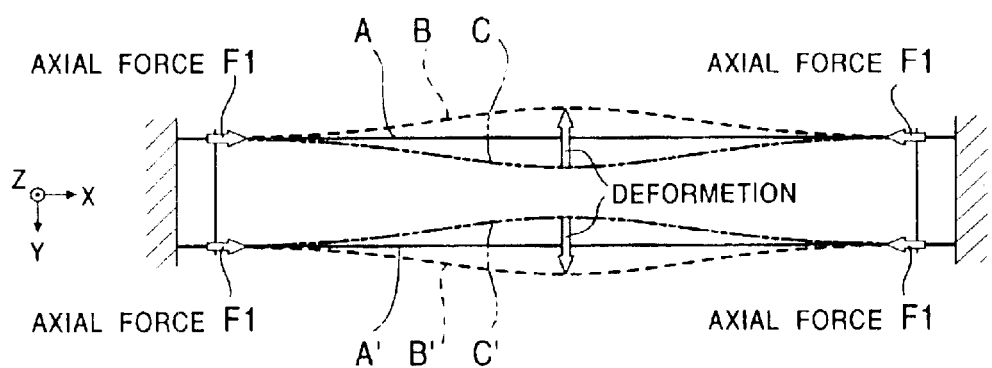
FIGS. 31 and 32 are illustrations of operation of the structure shown in FIG. 29.
Figure 32:
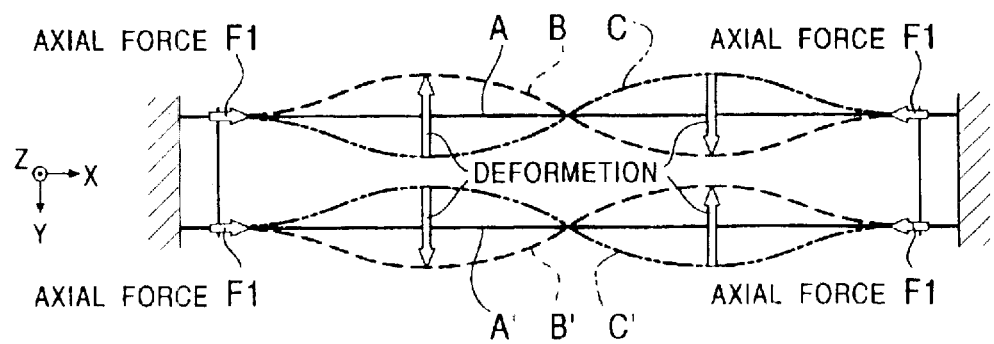

FIG. 23 is a plan view of a critical portion of an embodiment of a Coriolis mass flowmeter in a third aspect of the present invention. FIG. 24 is a front elevational view of the embodiment shown in FIG. 23. FIGS. 25 and 26A to 26C are illustrations of operation of the embodiment shown in FIG. 23. In these Figures, the same reference numerals are used to denote parts or components which are the same as those of the known structure shown in FIG. 29, and description is omitted for such parts or components.

The Coriolis mass flowmeter of this embodiment has a vibration tube through which flows a fluid to be measured. The vibration tube has a branching portion 120 downstream of a fluid inlet, where the vibration tube branches into a first branch tube 18 and a second branch tube 19 which define a first flow channel and a second flow channel, respectively. The first and second flow channels merge in each other at a merging portion 130 upstream of a fluid outlet, where the first and second branch tubes are joined together.

The first branch tube 18 and the second branch tube 19 have substantially identical configurations, and are arranged in plane-symmetry with each other with respect to the central plane of the mass flowmeter which is the plane containing the X-axis and the Y-axis.

Figure 25:
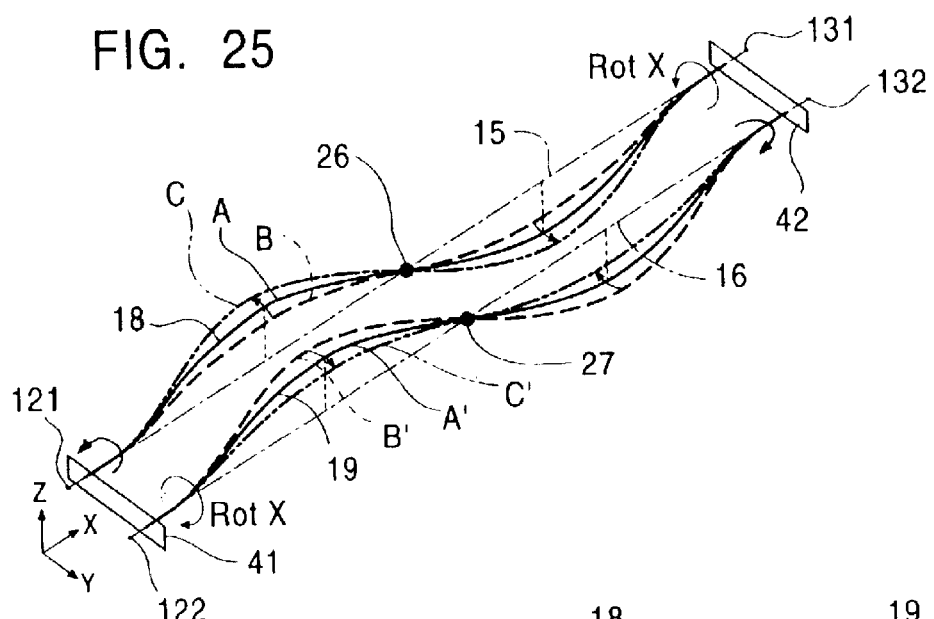
FIG. 25 and FIGS. 26A to 26C are illustrations of operation of the embodiment shown in FIG. 23.

As will be seen from FIG. 25, the branch tube 18 has an S-shaped configuration which has three inflection points and which is point symmetry with respect to a median point 26 between an upstream fixed end 121 and a downstream fixed end 131. Portions of the branch tube 18 near the fixed ends 121 and 131 are located on a reference axis 15.

Likewise, as shown in FIG. 25, the branch tube 19 has an S-shaped configuration which has three inflection points and which is point symmetry with respect to a median point 27 between an upstream fixed end 122 and a downstream fixed end 132. Portions of the branch tube 19 near the fixed ends 122 and 132 are located on a reference axis 16.

Ocillators 221 and 222 are arranged to apply forces of the same magnitude and in inverse phases to each other to the branch tubes 18 and 19 in the Y-direction.

Vibration sensors 223 and 224 are arranged to measure the velocities of vibration of the branch tubes 18 and 219 or the amounts of deformation of these branch tubes. Numerals 41 and 42 denotes support plates affixed to the vibration branch tubes.

As shown in FIG. 25, the branch tube 18 performs a vibratory motion so as to change its position along an arcuate path, from a position B to a position A, from the position A to a position C, from the position C back to the position A and again to the position B, and so forth. Similarly, the branch tube 19 performs a vibratory motion so as to change its position along an arcuate path, from a position B' to a position A', from the position A' to a position C', from the position C' back to the position A' and again to the position B', and so forth.

The amplitudes of vibrations of the branch tubes 18 and 19, i.e., the X-, Y- and Z-axes components of position, are greatest at the points of about L/4 and 3L/4 of the branch tubes, where L represents the overall length of each branch tube. The positions of the branch tubes 18 and 19 are not changed at the nodes of the vibrations which appear at the points on support plates 41 and 42 and at the median point L/2 of the branch tubes 18 and 19.

As shown in FIG. 25, a large torque or rotational force RotX about X-axes is applied to each of the branch tubes 18 and 19 at a point near each support plate 41 or 42.

The forces acting on the branch tubes 18 and 19 have the same magnitude and are in opposite phases, so that they cancel each other at the points on the support plates 41 and 42. Thus, these points on the support plates behave in the same manner as the node of a tuning fork where no linear force in X-, Y- or Z-direction and no rotational vibration take place.

Figure 26A:
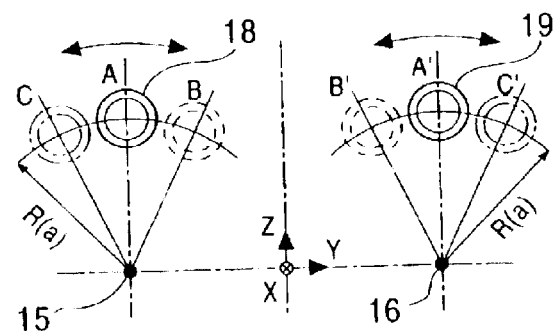
Figure 26B:
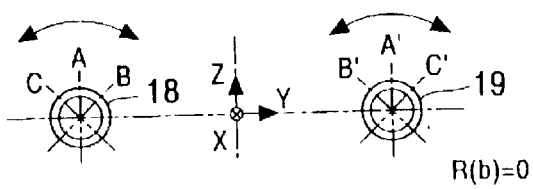
Figure 26C:
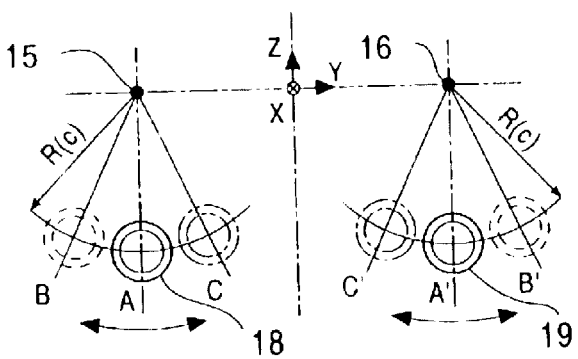

FIGS. 26A to 26C are cross-sectional views taken along the lines a—a, b—b and c—c of FIG. 24.

It will be seen that the branch tubes 18 vibrates along the arcuate path to vary its position from the position B to the position A, from the position A to the position C, from the position C back to the position A and again to the position B, and so forth. Likewise, the branch tube 19 vibrates to change its position from the position B' to the position A', from the position A' to the position C', from the position C' back to the position A' and again to the position B'. These two branch tubes 18 and 19 vibrate while maintaining such a positional relationship that they are always in plane-symmetry with respect to the plane defined by the X- and Z-axes.

At the cross-section b—b of the branch tube 18 which is midst between both fixed ends, the branch tube 18 performs only rotational vibration about the reference axis 15, without changing its position. Likewise, at the cross-section b—b of the branch tube 19 which is midst between both fixed ends, the branch tube 19 performs only rotational vibration about the reference axis 16, without changing its position.

As is apparent from FIG. 26A, at the cross-section a—a, each of the branch tubes 18 and 19 vibrates such that it is always located on or near an arc of a predetermined radius R(a) from the reference axis 15 (or 16). Similarly, as will be seen from FIG. 26C, each of the branch tubes 18 and 19 at the cross-section c—c vibrates such that it is always located on or near an arc of a predetermined radius R(c) from the reference axis 15 (or 16).

At the cross-section b—b which is midst between the fixed ends, the radius R(b) is zero, so that each of the branch tubes perform only rotational vibration without changing its position.

It will be seen also that the overall length of each of the branch tubes 18 and 19 do not change despite the vibration of the branch tube on the arcuate path, so that no axial force Fx acts on each branch tube at the fixed ends thereof.

In ideal mode of the arcuate vibratory motion of each branch tube along the arcuate path, no vibratory force Fy or Fz acts on each fixed end of each branch tube, and torsional component RotX of vibration about the X-axis alone acts on such fixed end.

Although in the drawings the vibration of each branch tube is illustrated in an exaggerated manner to have large amplitudes, the amplitudes of vibration are very small in most of actual Coriolis mass flowmeter.

The arcuate vibratory motion can be approximated by a simple harmonic oscillation having Y-direction component alone, when the vibration amplitude is very small.

From a strict point of view, the ocillators 221 and 222, as well as the vibration sensors 223 and 224, should deal with motion components in the directions of the Z-direction or the rotational component of the motion. Practically, however, it suffices only to use ocillators and sensors which are arranged only for the Y-direction components of the motion, for the reason stated above.

The actual vibration of each branch tube 18, 19 slightly deviate from the ideal mode of arcuate vibratory motion described before. In addition, the vibratory forces Fy and Fz acting in the directions of the Y-direction and Z-direction cannot be completely isolated. The vibration isolating performance exhibited by this embodiment, however, is absolutely superior to that obtainable with the use of straight tubes.

Thus, each of the branch tubes 18 and 19 performs simple harmonic oscillation in such a manner that each point on the branch tube oscillates substantially though not exactly follows an arcuate path. Therefore, each branch tube exhibits almost no change in its overall length. The vibration at each fixed end of each branch tube 18, 19 is composed mainly of the arcuate vibratory force component acting about the reference axis 15, 16, while the vibratory forces Fy and Fz acting in the directions of the Y-direction and Z-direction are greatly suppressed.

In addition, since two branch tubes 18 and 19 vibrate in symmetry with each other, the arcuate vibratory motion components of both branch tubes 18 and 19 cancel each other at the points on the support plates 41 and 42, thus presenting nodes of vibration at these points, whereby external propagation of vibration is effectively suppressed.

The force acting on each fixed end is decomposed into the following six directional components.

Linear Force Component in X-direction

This component acting in the axial direction of the branch tube is substantially zero, because only the arcuate vibratory component exists at the fixed end.

Linear Force Component in Y-direction

This component is inherently small and, in addition, the Y-direction force components on both branch tubes cancel each other to substantially nullify the linear force component acting in the Y-direction.

Linear Force Component in Z-direction

This component is inherently very small because the deformation in this direction is very small.

Rotational Force Component RotX

Rotational force components RotX on both branch tubes about the X-axes cancel each other, so that the total rotational force component RotX is substantially nullified.

Rotational Force Component RotY

This force component is inherently very small, because the deformation is very small.

Rotational Force Component RotZ

The rotational force components RotZ on both branch tubes are inherently small because the vibrations take place along arcuate paths, and these components cancel each other.

In addition, the point-symmetry configuration of each of the branch tubes 18 and 19 and the point-symmetry vibration mode of the same ensure that the center of gravity of the branch tubes 18, 19 tube is always held at the median point 25 between the median points 26 and 27 without shifting therefrom.

Fixing of the gravity center of the whole vibration system serves to prevent external propagation of vibration through the fixed ends 121, 122, 131, and 132, thus enhancing the vibration isolating performance.

The enhanced vibration isolation offers further advantages such as reduction in electrical power consumption and fluctuation of the measuring output, shift of zero point which are attributable to changes in the ambient conditions and external factors, thus offering higher measuring accuracy and stability of the Coriolis mass flowmeter.

The ocillators 221, 222 and the vibration sensors 223, 224 connected between two branch tubes 18 and 19 also serve to suppress noises, thus improving anti-noise performance of the Coriolis mass flowmeter.

More specifically, vibration of each of the branch tubes 18 and 19 at the positions where the upstream and downstream vibration sensors are connected can be expressed as follows.

Branch tube 18:
At position of the upstream vibration sensor $A \sin \omega t + C \cos \omega t + ①$ At position of the downstream vibration sensor $-A \sin \omega t + C \cos \omega t + ③$ Branch tube 19:
At position of the upstream vibration sensor $-A \sin \omega t - C \cos \omega t + ②$ At position of the downstream vibration sensor $A \sin \omega t + C \cos \omega t + ④$ The sensor outputs are expressed as follows.
Upstream sensor output $2A \sin \omega t + 2C \cos \omega t + ① - ②$ Downstream sensor output $-2A \sin \omega t - 2C \cos \omega t + ③ - ④$ In these formulae, the symbol "A" represents the amplitude of the vibration caused by the ocillatation, and "C" indicates the amplitude of vibration caused by the Coriolis force. Each of the symbols ①, ②, ③, and ④ indicates noise.

When both the noise ① and the noise ② at the two upstream points of the branch tubes 18, 19 are of the same, level N, the noise ① and the noise ② cancel each other: namely, ①-②=0.

When both the noise ③ and the noise ④ at the two downstream points of the branch tubes 18, 19 are of the same level M, the noise ③ and the noise ④ cancel each other: namely, ③-④=0.

Since the branch tubes 18 and 19 have the same configuration and arranged in close proximity of each other in a juxtaposed state, it is highly credible that the levels of the noise ① and the noise ② are equal or substantially equal to each other and that the noise ③ and the noise ④ are of the same or substantially the same level. Therefore, any noise transmitted from external pipe or the like can effectively be canceled.

The branch tubes 18 and 19 exhibit thermal expansion or contraction due to change in temperature. Such thermal expansion or contraction, however, can easily be absorbed by the branch tubes 18 and 19 and does not cause any excessive thermal stress in these branch tubes by virtue of the curved configuration of these branch tubes. The Coriolis mass flowmeter of this embodiment, therefore, can be used over a wide range of temperature.

Figure 27:
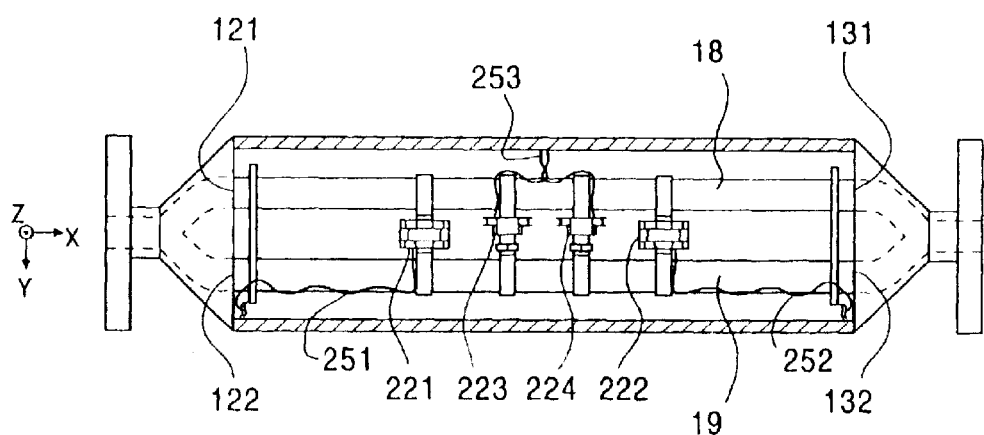
FIG. 27 shows the structure of a critical portion of another embodiment in the third aspect of the present invention.

FIG. 27 shows a critical portion of another embodiment in the third aspect of the present invention. In this embodiment, the lead lines of the ocillators 221, 222 or the lead lines of the vibration sensors 223, 224 are externally led through the median points 26, 27 or, alternatively, through the upstream fixed ends 121, 122 or through the downstream fixed ends 131, 132.

More specifically, in this embodiment, each of the ocillators 221 and 222, as well as each of the vibration sensors 223 and 224, has a coil and a magnet. Lead lines or cables 251, 252, 253 are led from the coils and are extended externally of the main part of the mass flowmeter so as to be connected to an external transducer.

The lead lines led from the coils are fixed to the associated branch tube 18 or 219 by means of an adhesive. The lead lines are then laid along the associated branch tube 18 or 19 to reach the upstream end or the downstream end of the branch tube, and are led external therefrom so as to be fixed to a stationary part such as the housing of the mass flowmeter.

Referring further to FIG. 27, another wiring pattern is such that lead lines 253 led from the coils of the vibration sensors 223, 224 are extended to a position near the median point of the associated branch tube 18 or 19 and are led therefrom so as to be fixed to a stationary part such as the housing of the mass flowmeter.

The lead lines 251, 252, 253 fixed to the branch tubes 18, 19 vibrate together with the branch tubes. If the lead lines fixed to the stationary part such as the housing leave the associated branch tube 18 or 19 at positions where the vibration amplitude are large, the large-amplitude vibration of the branch tube is transmitted to the housing through the lead lines. Thus, vibration isolation performance is deteriorated.

Vibrations of the branch tubes 18 and 19 have nodes at positions near the upstream and downstream fixed ends 121, 122, 131, and 132 and at positions near the median points 18, 19 of the branch tubes. At such positions, the vibration amplitudes are substantially nullified.

The lead lines led from such nodes do not transmit substantial vibration because the vibration amplitudes are negligibly small at these nodes, whereby external transmission of vibrations through the lead lines is nullified. Thus, the vibration isolating performance is improved to further enhance the measuring accuracy and stability of the Coriolis mass flowmeter.

In particular, at the portions near the upstream and downstream fixed ends of the branch tubes 18, 19, not only the linear vibration amplitude components in the X-, Y- and Z-direction but also torsional or rotational vibration components about these axes are very small, so that greater vibration isolating performance can be achieved, thus contributing to implementation of Coriolis mass flowmeter having further enhanced measuring accuracy and stability.

Figure 28:
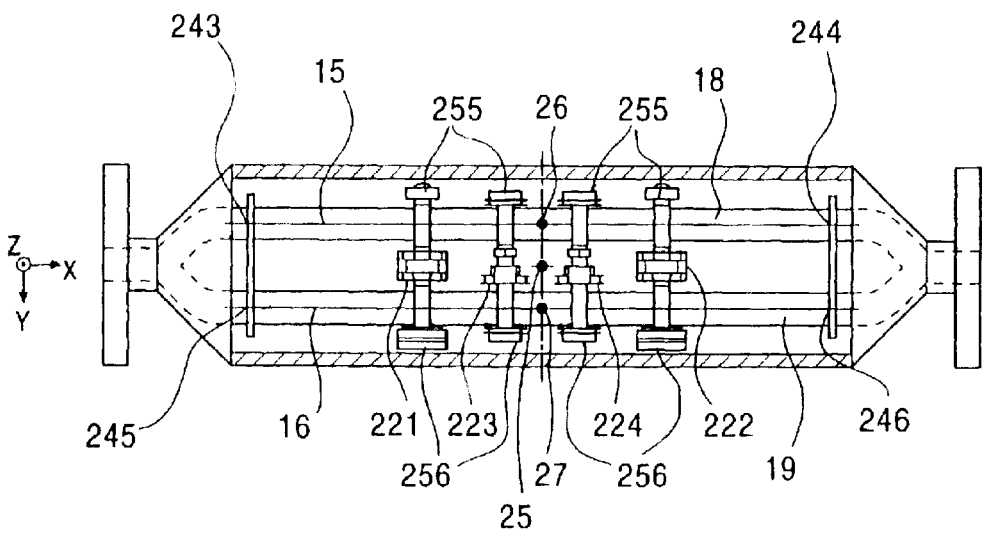
FIG. 28 shows the structure of a critical portion of still another embodiment in the third aspect of the present invention.

FIG. 28 shows a critical portion of still another embodiment in the third aspect of the present invention.

This embodiment employs balancers 255 which are provided on the first branch tube 18 in such a manner that the center of gravity of the whole vibration system, including the branch tube 18, portions of the ocillators 221, 222 or of the vibration sensors 223, 224 attached to the branch tube 18, and the balancers 255 themselves, is located at the median point 26 of the first branch tube 18.

Likewise, balancers 256 are provided on the second branch tube 19 in such a manner that the center of gravity of the whole vibration system, including the branch tube 219, portions of the ocillators 221, 222 or of the vibration sensors 223, 224 attached to the branch tube 19, and the balancers 256 themselves, is located at the median point 27 of the second branch tube 19.

In the embodiment shown in FIG. 23, the ocillators 221, 222 and the vibration sensors 223, 224 are disposed only on one side of the first branch tube 18 adjacent to the second branch tube 19, and only on one side of the second branch tube 19 adjacent to the first branch tube 18.

Therefore, although the gravity center of the entire system including two branch pipes, ocillators and vibration sensors is fixedly located at the median point 25, the gravity center of the vibration system composed of each branch tube and parts of the ocillators and vibration sensors is not located at the each median point, thus creating a mass imbalance which renders each vibration system unstable.

In this embodiment, the position of the gravity center and the balance are considered for individual vibration systems: one including the first branch tube 18 and the other including the second branch tube 19.

A discussion will be given first of the vibration system A which includes the portion of the first branch tube 18 between the supported ends 243 and 244 and components carried by this portion of the branch tube 18 As shown in FIG. 28, the balancers 255, having the same masses and moments as those of the coils or magnets of the ocillators 221, 222 and vibration sensors 223, 224 attached to the first branch tube 18, are fixed to the first branch tube 18 in symmetry with the coils or magnets with respect to the reference axis 15, such that the gravity center of the vibration system composed of the first branch tube 18, coils or magnets attached thereto and the balancers 255 is always held at the median point 26.

Likewise, the balancers 256 are disposed on the second branch tube 19 such that the vibration system B composed of the portion of the branch tube 19 between the supported ends 245 and 246, components attached thereto and the balancers 256 is always located at the median point 27.

Vibration isolating performance is improved appreciably if the composite vibration system including two branch tubes 18 and 19 is well balanced. However, further improved vibration isolating performance of the Coriolis mass flowmeter is obtainable if each of the vibration systems A and B itself is balanced, besides the balancing of the composite vibration system composed of the two vibration systems A and B.

It is quite difficult to construct the vibration system A including the first branch tube 18 and the vibration system B including the second branch tube 19 in a perfect symmetry and in a completely identical structure, due to difficulty encountered in the fabrication and due to the use of different components attached to the branch tubes, e.g., coils attached to one branch tube and magnets attached to the other branch tube.

If the individual vibration systems A and B are balanced by themselves, the vibration component transmitted from each vibration system is minimized, so that external transmission of vibration from the Coriolis mass flowmeter is satisfactorily suppressed even if a slight unbalance between these vibration systems A and B.

Thus, in this embodiment, each vibration system is balanced by itself, so that the vibration isolating performance is further enhanced to achieve further improvement in the measuring accuracy and stability of the Coriolis mass flowmeter.

It will be seen from the foregoing description that the third aspect of the present invention provides a Coriolis mass flowmeter which excels in the stability, measuring accuracy and anti-vibration performance.

Figure 33:
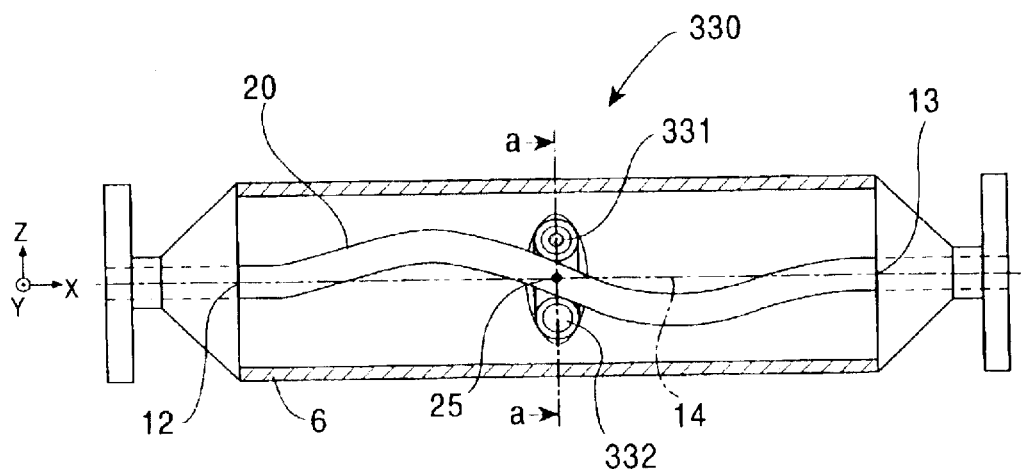
FIG. 33 shows the structure of a critical portion of an embodiment in the fourth aspect of the present invention.
Figure 34:
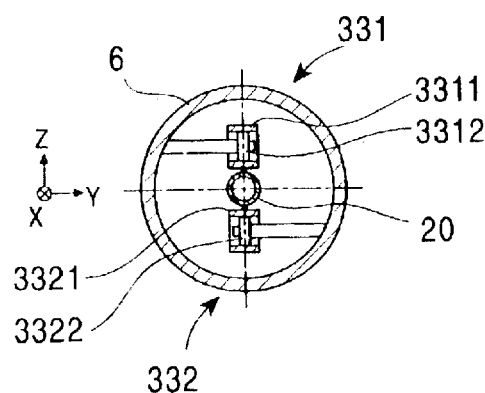
FIG. 34 is a sectional view taken along the line a—a of FIG. 33.
Figure 35:
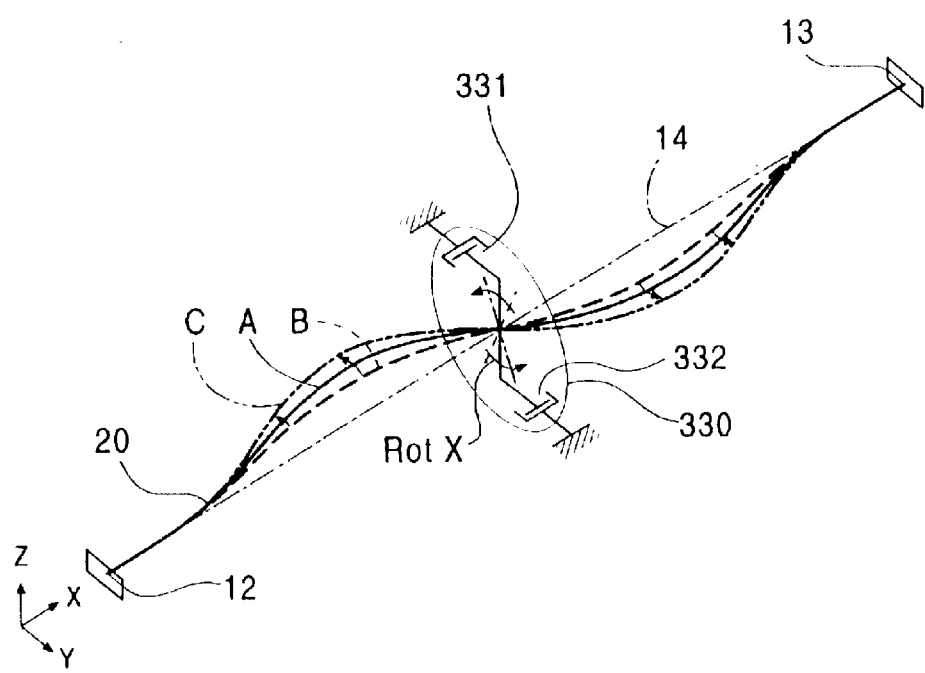
FIG. 35 is an illustration of operation of the embodiment shown in FIG. 33.

A description will now be given of a fourth aspect of the present invention. FIG. 33 shows a critical portion of an embodiment in a fourth aspect of the present invention. FIG. 34 is a cross-sectional view taken along the line a—a of FIG. 33. FIG. 35 is an illustration of the operation of the embodiment shown in FIG. 33.

As will be seen from FIG. 33, a vibration tube 20 has an S-shaped gently-curved configuration which has three inflection points and which is point-symmetry with respect to the median point 25 between upstream and downstream fixed ends 12 and 13.

An ocillator 330 is provided on the median point 25 of the vibration tube 20 so as to apply to the vibration tube 20 a torque which acts about the central axis of the vibration tube 20 or about a reference axis 14 which is a straight line interconnecting the upstream and downstream fixed ends 12 and 13.

As will be seen from FIGS. 33, 34 and 35, the ocillator 330 has ocillator units 331 and 332 which are arranged in symmetry with each other with respect to the reference axis 14.

The ocillator unit 331 has a coil 3311 and a magnet 3312, while the ocillator unit 332 has a coil 3321 and a magnet 3322.

These ocillator units 331 and 332 are arranged so as to produce vibratory forces acting in the Y-direction in opposite phases to each other.

When the vibration amplitude is very small, a torque RotX about the X-axis remains when forces +Y and −Y are applied to portions of the vibration tube which are at positions symmetrical to each other.

Although omitted from the Figures for clarification purpose, vibration sensors are disposed on the vibration tube 20 at suitable locations, so as to sense the vibration of the vibration tube 20, thereby measuring the mass flow rate or the density of the fluid flowing in the vibration tube 20.

In operation, the vibration tube 20 vibrates so as to change its position in the same manner as that described before, as shown in FIG. 35.

The ocillator 330 provided on a portion of the vibration tube 20 near the median point 25 serves to maintain this vibratory motion of the vibration tube 20, by applying a torque or moment RotX acting about the X-axis.

Therefore, the position of the median point 25 which is the center of the symmetrical configuration of the vibration tube 20 does not change, despite any change in the length and configuration of the vibration tube 20 due to thermal expansion. Consequently, the ocillator 330 disposed on the median point 25 also is immobilized.

When an ordinary ocillator employing the combinations of coil and magnet 3311, 3321; 3321, 3322 is used, one of the coil and the magnet of each combination is fixed to the vibration tube 20 while the other is fixed to a stationary part such as the housing 6. Therefore, a change in the position of the vibration tube 20 causes a change in the relative position between each coil and the associated magnet, failing to stably ocillate the vibration and, in the worst case, allowing mutual contact between the coil and the associated magnet, resulting in a breakage of the ocillator.

In the illustrated embodiment, the absolute position of the ocillator 30 disposed on the immobilized median point 25 is not changed, so that no change occurs in the relative position between each of the coils 3311, 3321 and the associated magnet 3311, 3211, whereby a Coriolis mass flowmeter is obtainable in which the vibration stably occurs against any thermal expansion or contraction of the vibration tube.

Figure 36:
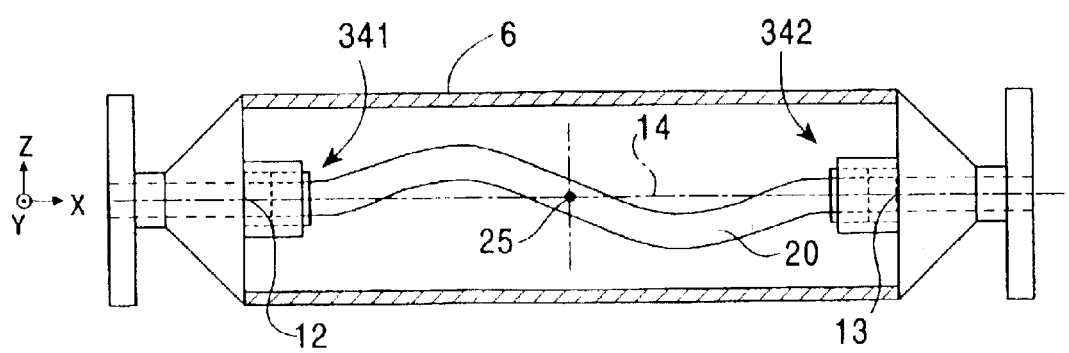
FIG. 36 shows the structure of a critical portion of another embodiment in the fourth aspect of the present invention.
Figure 37:
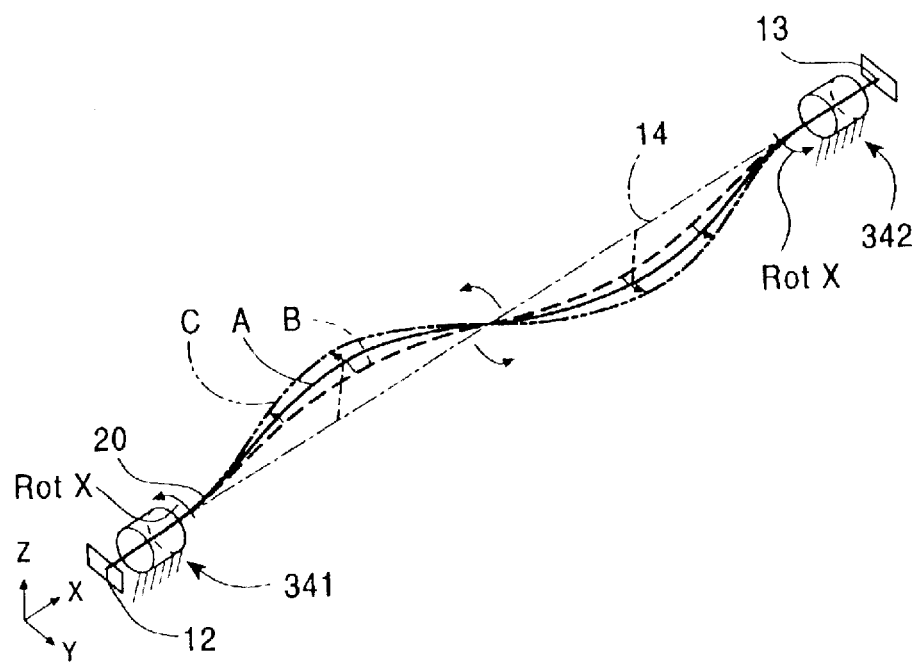
FIG. 37 is an illustration of operation of the embodiment shown in FIG. 36.

FIG. 36 shows a critical portion of another embodiment in the fourth aspect of the present invention, while FIG. 37 is an illustration of operation of the embodiment shown in FIG. 36.

This embodiment employs an ocillator 341 provided on a portion of the vibration tube 20 at a position near the upstream fixed end 12, so as to apply to the vibration tube 20 a torque which acts about the reference axis 14 or about the central axis of the vibration tube 20.

The embodiment also employs an ocillator 342 provided on a portion of the vibration tube 20 at a position near the downstream fixed end 13, so as to apply to the vibration tube 20 a torque which acts about the reference axis 14 or about the central axis of the vibration tube 20.

Thus, the configuration and the vibration mode of the vibration tube 20 are the same as those shown in FIGS. 33 to 35. In this embodiment, however, two separate ocillators, i.e., upstream and downstream ocillators 341 and 342, are provided on the portions of the vibration tube 20 near the upstream and downstream fixed ends 12 and 13, unlike the embodiment of FIGS. 33 to 35 which employs a single ocillator disposed on the median point 25 of the vibration tube 20.

The vibration tube 20 is fixed to a stationary portion such as the housing 6, at its upstream and downstream fixed ends 12 and 13 where the vibration tube 20 is not substantially vibrated. The upstream and downstream ocillators 341 and 342 are fixed to portions of the vibration tube 20 at positions slightly deviated from the upstream and downstream fixed ends 12 and 13, thereby stably ocillating the vibration tube 20.

Each of the ocillators 341 and 342 is fixed between the vibration tube 20 and a stationary part such as the housing 6, so as to impart to the vibration tube 20 a torque about the reference axis 14 or about the central axis of the vibration tube 20.

A device capable of generating vibratory motion such as a torque generator or a stepping motor can be used as the ocillator.

In this embodiment, the upstream ocillator 341 and the downstream ocillator 342 are symmetrically arranged so as to generate vibratory torques RotX of the same phase, so that the vibration tube 20 vibrates while changing its position in the same manner as described before, as shown in FIG. 35.

The amounts of change in the position of the vibration tube 20 due to thermal expansion are small at both fixed ends 12, 13 of the vibration tube 20.

Consequently, the ocillators disposed near these fixed ends are not significantly affected by thermal expansion, thus ensuring stable vibration of the vibration tube in the Coriolis mass flowmeter.

Figure 38:
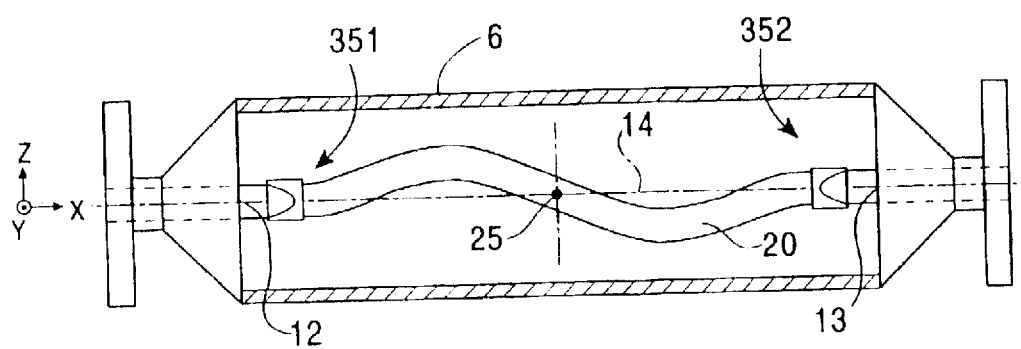
FIG. 38 shows the structure of a critical portion of still another embodiment in the fourth aspect of the present invention.
Figure 39:
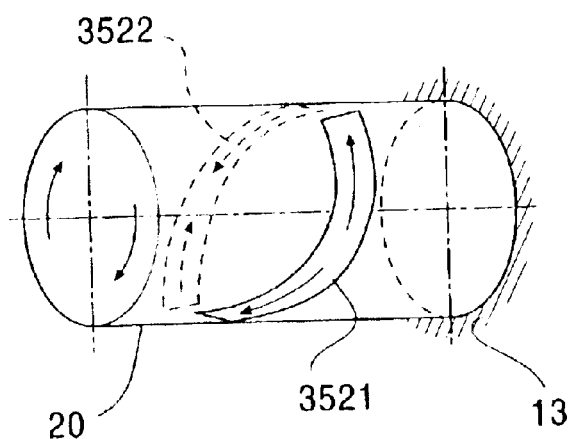
FIG. 39 is an illustration of a critical portion of the embodiment shown in FIG. 38.
Figure 40:
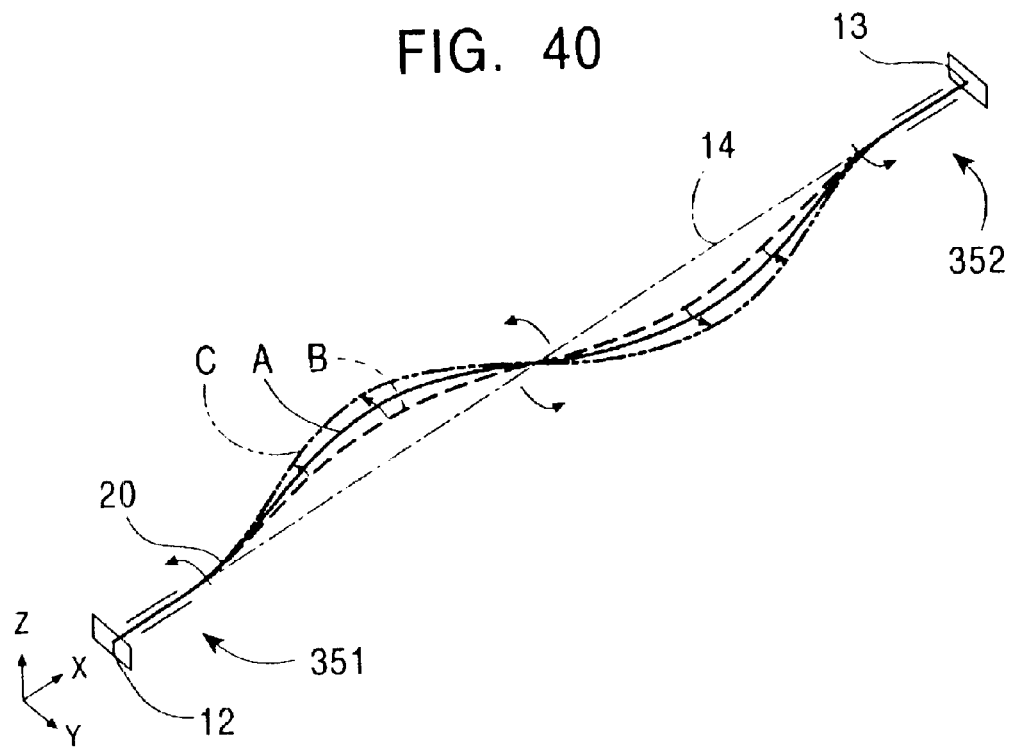
FIG. 40 is an illustration of operation of the embodiment shown in FIG. 38.

FIG. 38 shows the structure of a further embodiment of the fourth aspect of the present invention. FIG. 39 is an illustration of a critical portion of the embodiment shown in FIG. 38, while FIG. 40 shows the operation of the same embodiment.

This embodiment employs upstream and downstream ocillators 351 and 352 which are arranged in symmetry with each other. Since both ocillators have an identical structure, the description will proceed with reference-to FIG. 39 which shows the structure of the downstream ocillator 352. The downstream ocillator 352 has at least one pair of piezoelectric element 3521 and 3522 which are arranged along the outer peripheral surface of the vibration tube 20 in a plane-symmetrical relation to each other with respect to a plane containing the tube axis and obliquely to the tube axis. These piezoelectric elements 3521 and 3522 perform expanding and contracting actions in opposite phases to each other and in directions which are oblique to the tube axis, thereby applying torsional force to the vibration tube 20.

The configuration of the vibration tube 20, ocillatation mode and the operation of the ocillators in this embodiment are substantially the same as those in the preceding embodiment shown in FIGS. 36 and 37. This embodiment features the use of the pairs of piezoelectric elements 3511, 3512; 3521, 3522 which serve as the ocillators 351 and 352 for producing torques to vibrate the vibration tube 20.

The upstream ocillator 351 has the same structure as the downstream ocillator 352 shown in FIG. 39 in which the pair of expandable and contractable piezoelectric elements 3521 and 3522 are arranged in symmetry with each other and in opposite directions of inclination.

Two symmetrical piezoelectric elements 3521 and 3522 perform expanding and contracting actions in opposite phases to each other.

For instance, as indicated by arrows in FIG. 39, the piezoelectric element 3522 contracts when the piezoelectric element 3521 expands, with the result that the vibration tube 20 is twisted about its axis. As a consequence, the vibration tube 20 vibrates in the same manner as that described before, as shown in FIG. 40.

When a combination of a coil and a magnet, a motor, or the like which is composed of two components is used as the ocillator, such ocillator is connected between the vibration tube 20 and a stationary part such as the housing 6, such that one of the components is fixed to the vibration tube 20 while the other is fixed to the stationary part.

Such ocillators can apply large vibrating force to the vibration tube 20 but causes a large reaction force to be exerted on the stationary part such as the housing 6 with the same magnitude as and in the opposite phase to the vibrating force applied to the vibration tube 20.

Such unnecessary reaction force creates vibration noise which in turn impairs the measuring accuracy and stability of the Coriolis mass flowmeter.

The illustrated embodiment is free from this problem, because the ocillatation is performed by the piezoelectric elements which are arranged on the surface of the vibration tube 20 and which are not connected to any stationary part. With this advantageous feature, the illustrated embodiment implements a Coriolis mass flowmeter which excels in measuring accuracy and stability and which offers high efficiency of ocillatation.

Figure 41:
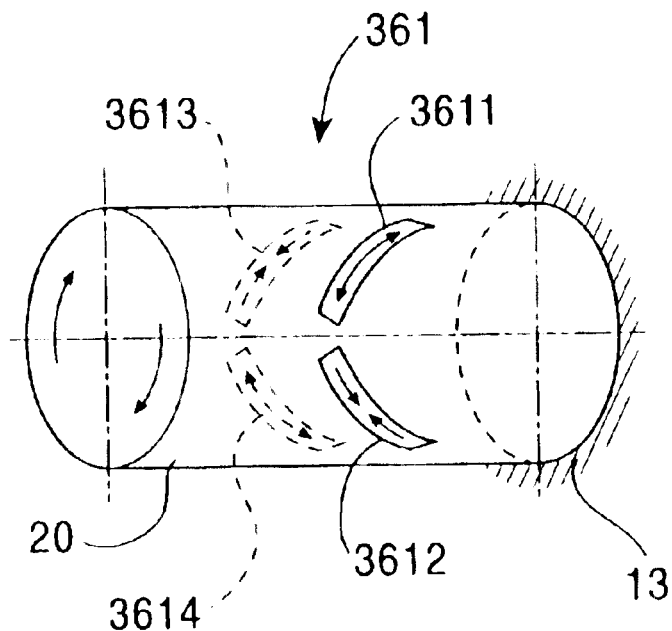
FIG. 41 shows the structure of a critical portion of still another embodiment in the fourth aspect of the present invention.
Figure 42:
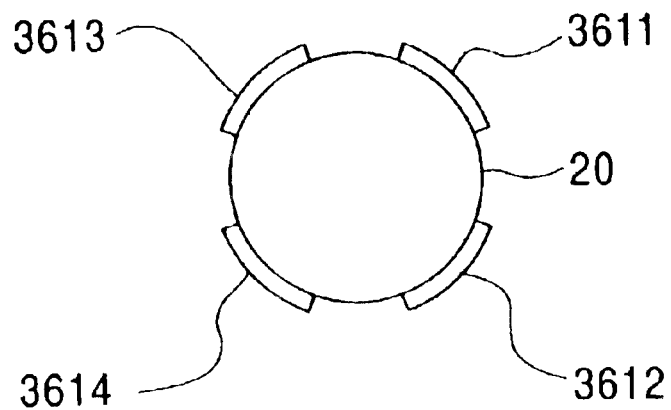
FIG. 42 is a side elevational view of the embodiment shown in FIG. 41.

FIG. 41 shows a critical portion of a further embodiment in the fourth aspect of the present invention, while FIG. 42 is an end view of the arrangement shown in FIG. 41.

This embodiment uses ocillators 361 and 362, each of which employs two pairs of piezoelectric elements. For instance, the ocillator 361 uses two pairs of piezoelectric elements 3611, 3612; 3613, 3614.

Obviously, it is possible to use more than two pairs of piezoelectric elements.

Figure 43:
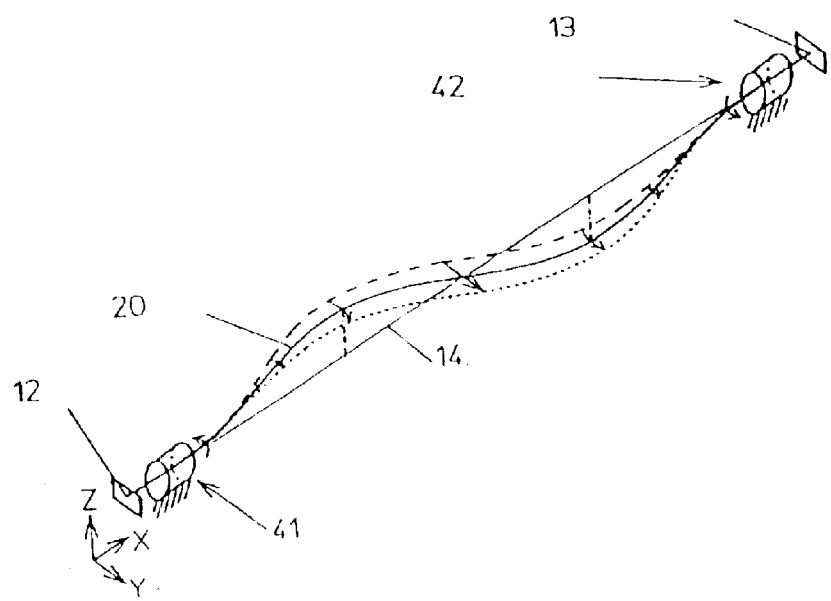
FIG. 43 shows the structure of a critical portion of a further embodiment in the fourth aspect of the present invention.

FIG. 43 shows a critical portion of a further embodiment in the fourth aspect of the present invention. This embodiment employs the same configuration of the vibration tube 20 and the same ocillators 341, 342 as those of the embodiment shown in FIG. 36. In this embodiment, however, a vibration mode shown in FIG. 43 is different from that shown in FIG. 37.

Figure 44:
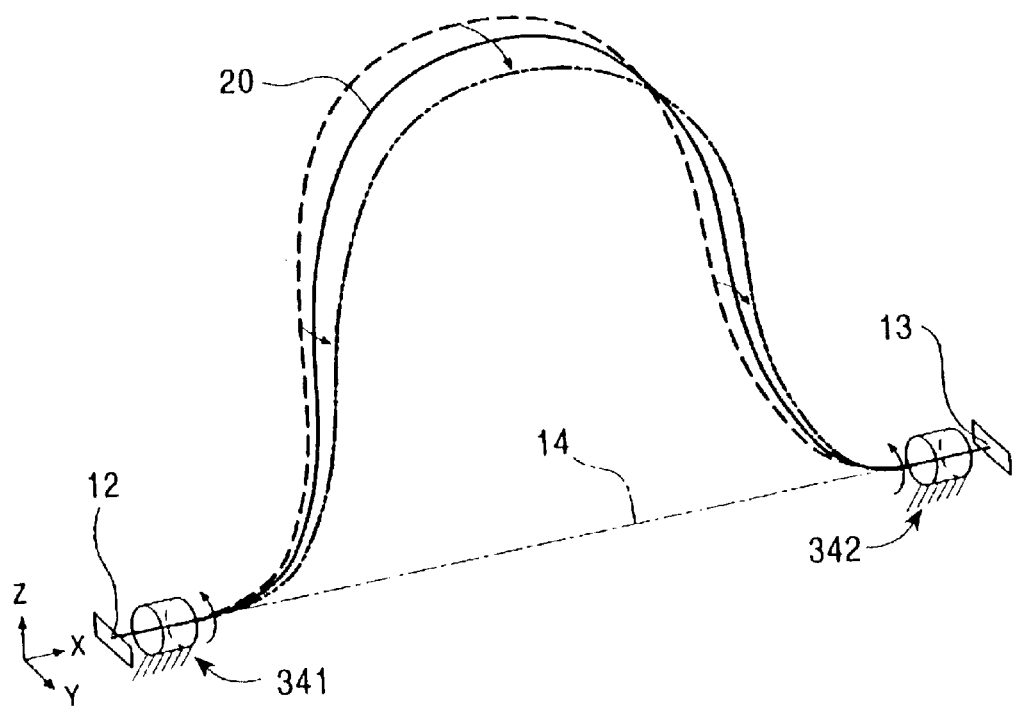
FIG. 44 shows the structure of a critical portion of a still further embodiment in the fourth aspect of the present invention.

FIG. 44 shows the construction of a critical portion of a still further embodiment in the fourth aspect of the present invention. This embodiment employs a U-shaped vibration tube 71 to which are attached the upstream and downstream ocillators 341 and 342.

Figure 45:
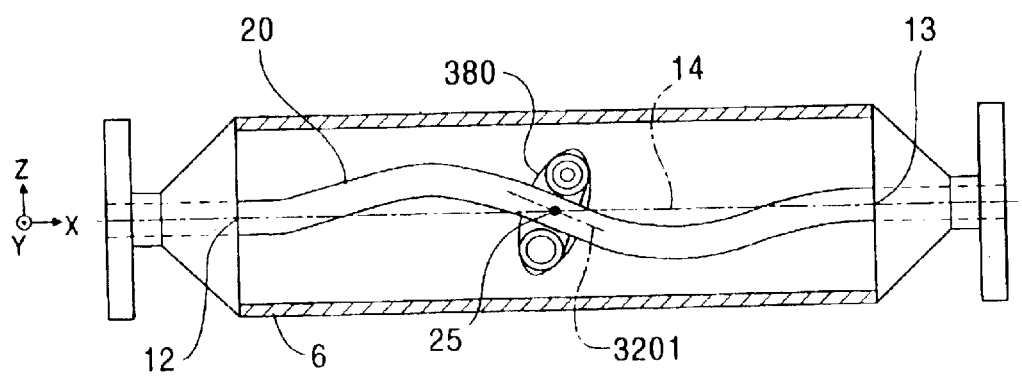
FIG. 45 shows the structure of a critical portion of a yet further embodiment in the fourth aspect of the present invention.
Figure 46:
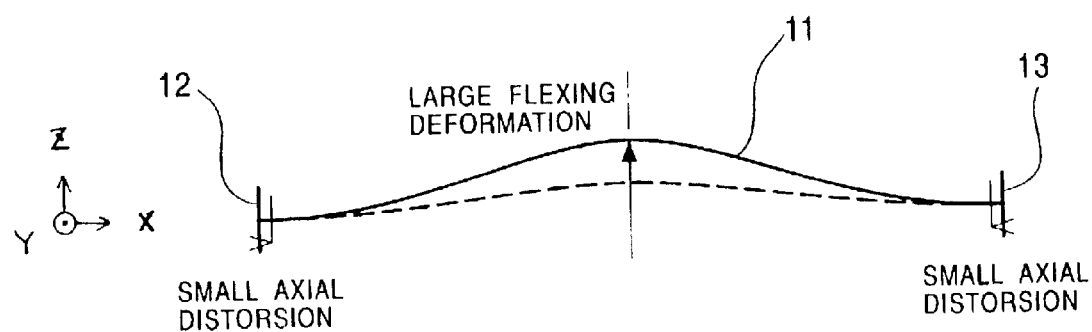
FIG. 46 is an illustration of operation of a known structure.

FIG. 45 shows the construction of a critical portion of a still further embodiment in the fourth aspect of the present invention. In this embodiment, an ocillator 380 is disposed on the median point 25 of the vibration tube 20 so as to apply to this portion of the vibration tube 20 a torque which acts about the central axis 3201 of the vibration tube 20.

From a strict point of view, the ocillated vibration of the vibration tube 20 requires vibratory torque acting about the reference axis 14, rather than the central axis 3201 of the vibration tube 20.

However, when the vibration tube 20 has a curvilinear configuration without any substantial curvature, the angular offset between the reference axis 14 and the central axis 3201 of the vibration tube 20 is negligibly small, so that the torque acting about the tube axis 3201 produces substantially the same effect as that produced when the torque acts about the reference axis 14.

From a viewpoint of fabrication, it is easier to apply torque acting about the tube axis 3201 than to apply torque acting about the reference axis 14. Therefore, when the angular offset between the tube axis 3201 and the reference axis 14 is small, it is possible to enjoy the advantage of ease of fabrication, while achieving an equivalent effect, by arranging such that the ocillator applies a torque acting on the tube axis 3201.

We can use a torque generator or a motor as the ocillator, without requiring any gap between the tube axis 3201 and the housing 6 for accommodating the vibratory stroking of the ocillator.

Practically, the gap may be substantially nullified if the vibratory rotational motion of the vibration tube 20 is achieved. This eliminates the necessity for any strict control of dimensions, as well as problems such as clogging with dust.

In addition, any non-linearity of configuration due to positional change is avoided, so that high stability of ocillatation is ensured in the Coriolis mass flowmeter.

Figure 47:
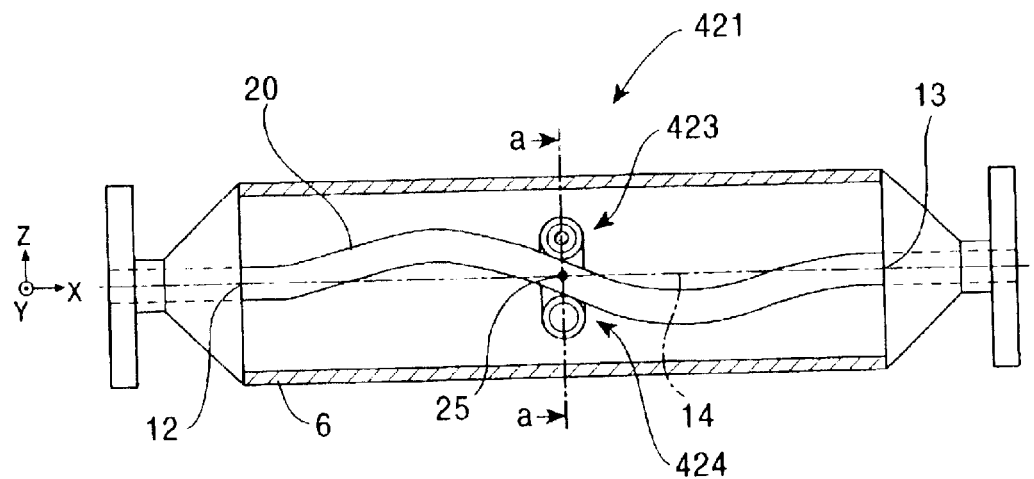
FIG. 47 shows the structure of a critical portion of an embodiment in the fifth aspect of the present invention.
Figure 48:
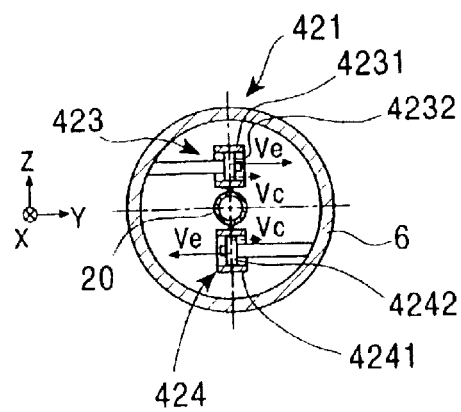
FIG. 48 is a sectional view taken along the line a—a of FIG. 47.

FIG. 47 shows a critical portion of an embodiment in the fifth aspect of the present invention. FIG. 48 is a sectional view taken along the line a—a of FIG. 48. FIGS. 49 to 55 are illustrations of operation of the embodiment shown in FIG. 47.

As shown in FIG. 47, the vibration tube 20 has an S-shaped gently-curved configuration which-is in point-symmetry with each other with respect to the median point 25 between an upstream fixed end 12 and a downstream fixed end 13 and which has three inflection points.

The vibration tube 20 is adapted to perform a simple harmonic oscillation such that each point on the vibration tube 20 vibrates along an arcuate path which is at a predetermined radius from a reference line 14 which is the straight line interconnecting the upstream and downstream fixed ends 12 and 13.

Figure 50:
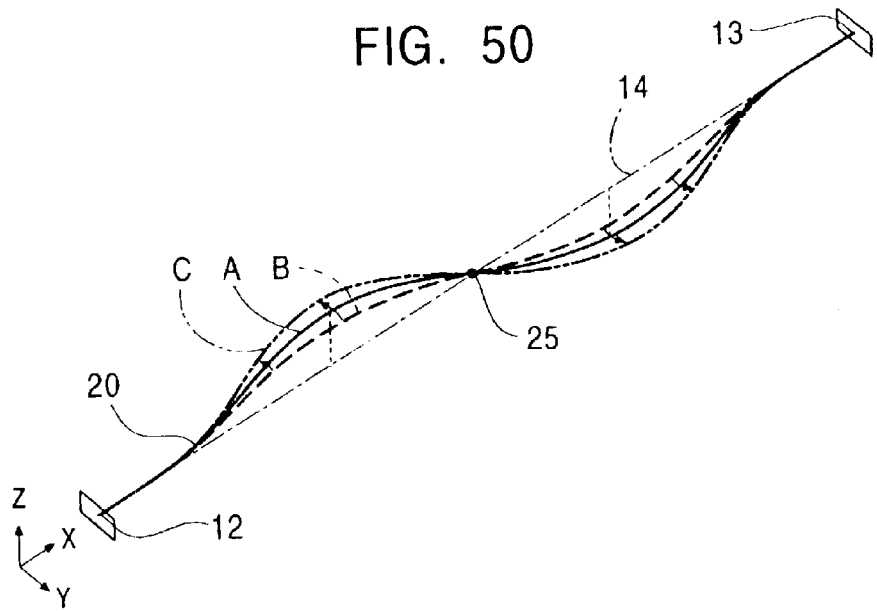

More specifically, the vibration tube 20 vibrates so as to change its position along an arc, from a position A to a position B, from the position B to a position C, from the position back to the position A and further to the position B, and so on, as shown in FIG. 50.

The vibratory action necessitates ocillators. In FIGS. 47 to 55, however, such ocillators are omitted for the purpose of clarification of the drawings. The following description also proceeds while neglecting the ocillators.

A vibration sensor device 421 includes a vibration sensor 423 and a vibration sensor 424 which are disposed on a plane that is equi-distant from the upstream and downstream fixed ends 12 and 13 and which oppose each other across or around 20. The above-mentioned plane will be referred to as a "reference plane", hereinafter.

FIG. 48 shows the positional relationship between the vibration sensors 423 and 424 on the reference plane.

The vibration sensors 423 and 424 are disposed on both sides of the vibration tube 20 so as to measure the vibration of the vibration tube 20.

The vibration sensor 423 has a coil 4231 and a magnet 4232, and the vibration sensor 424 has a coil 4241 and a magnet 4242. Either the coils 4231, 4241 or the magnets 4232, 4242 are fixed to the vibration tube 20, while the others are fixed to a housing 6.

In the illustrated embodiments, the magnets 4232 and 4242 are fixed to the housing 6.

The vibration sensors 423 and 424 are arranged to measure vibrations occurring in the Y-direction.

In FIG. 48, the angular vibration component caused by ocillatation is represented by Ve, while the vibration caused by Coriolis force is represented by Vc. It will be seen that the ocillated vibration component Ve acts in opposite directions on the vibration sensor 423 and the vibration sensor 424.

In ordinary signal processing, the mass flow rate is determined based on the phase difference between two output signals, as follows.

Output of Sensor 423

$$E \sin \omega t + C \cos \omega t = \sqrt{(E^2+C^2)} \cdot \sin(\omega t+\delta)$$

Output of Sensor 424

$$E \sin \omega t - C \cos \omega t / (E^2 + C^2) \cdot \sin(\omega t - \delta) \tan \delta = C/E$$

Figure 49:
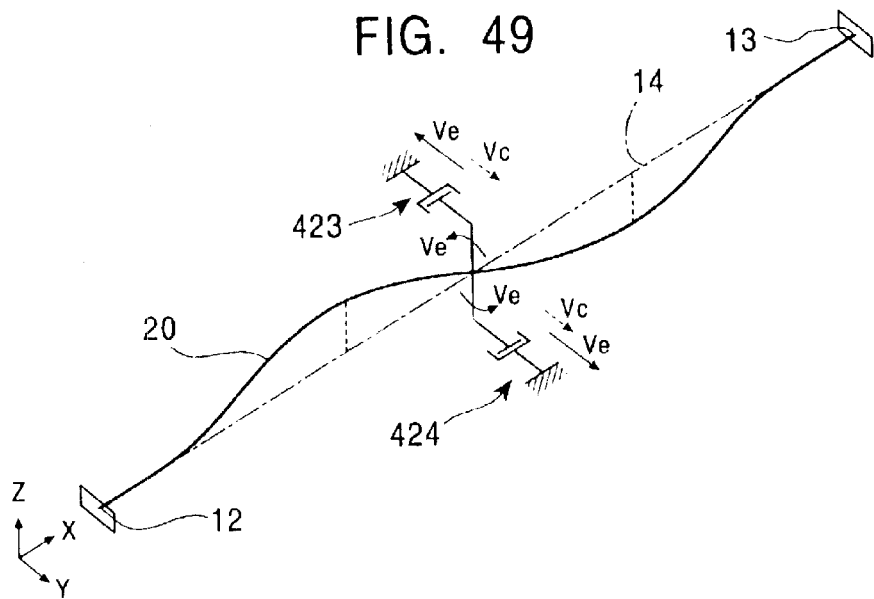
FIGS. 49 to 55 are illustrations of operation of the embodiment shown in FIG. 47.

FIG. 49 shows the behavior of the whole vibration system. The vibration tube 20 when ocillated vibrates as indicated by arrows Ve.

At the same time, the generated Coriolis force produces vibration as indicated by arrows Vc. The Y-direction components of these two types of vibration are sensed by the vibration sensors 423 and 424.

The Coriolis force is generated when a fluid as the measuring object flows through the vibration tube 20, in accordance with the mass flow rate of the fluid and the angular acceleration of the vibration tube.

Figure 51:
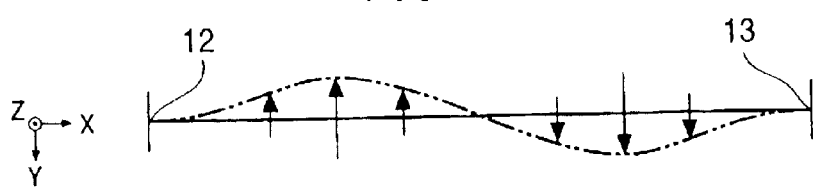
Figure 52:
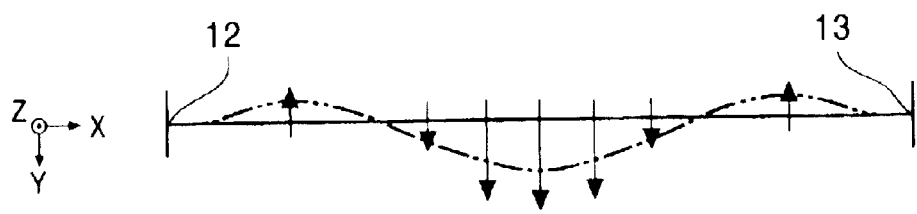

In the illustrated embodiment, Coriolis force vectors as shown in FIG. 52 are produced in response to the ocillated vibratory deformation of the vibration tube 20 as shown in FIG. 51. This Coriolis force vectors cause a deformation of the vibration tube 20 as shown in FIGS. 53 and 54.

In FIGS. 49 to 53, the deformation caused by the Coriolis force is shown as being on the same order of magnitude as the deformation caused by the ocillated vibration. Actually, however, the amplitude of deformation caused by the Coriolis force is two to three orders of magnitude smaller than that of the amplitude of deformation caused by the ocillated vibration.

Figure 53:
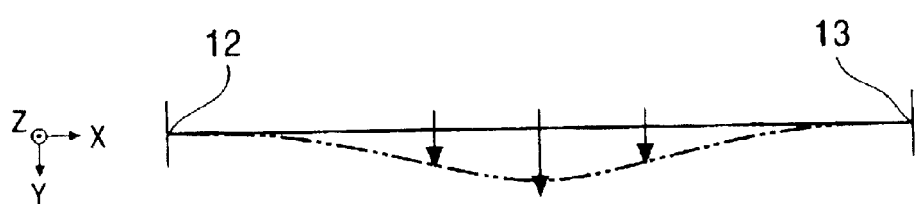
Figure 54:
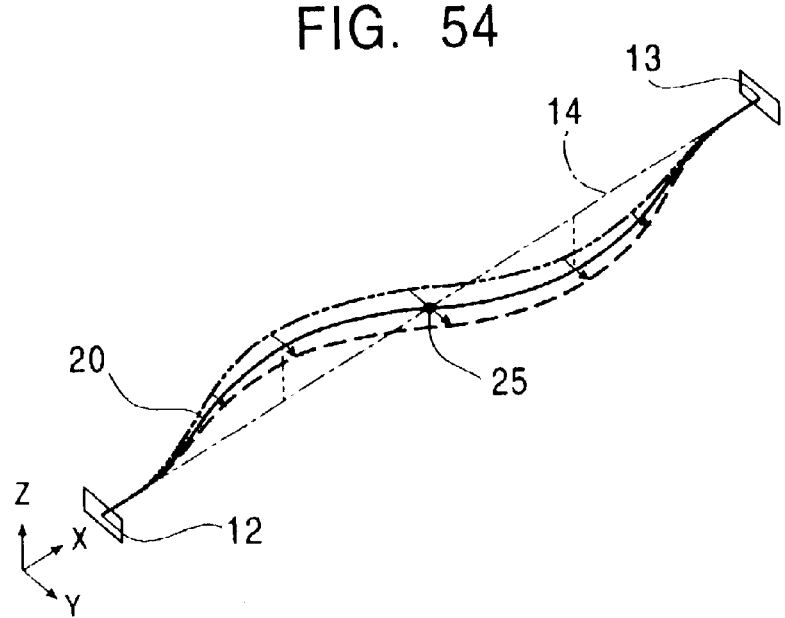

When the Coriolis mass flowmeter is in service, the Coriolis vibration component as shown in FIG. 54 or FIG. 53 is superposed to the ocillated vibration component shown in FIG. 50 or FIG. 51.

Figure 55:
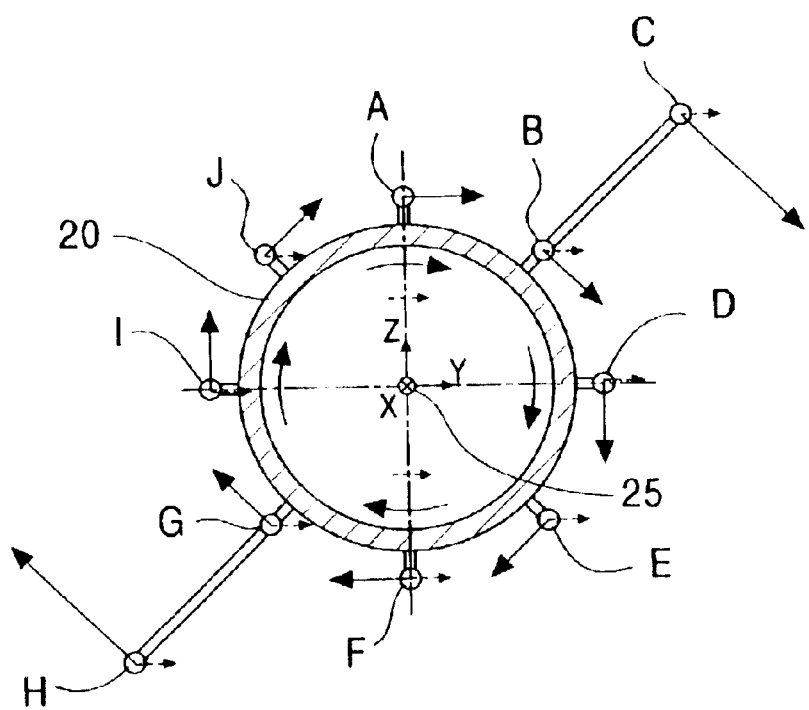

FIG. 55 shows the cross-section of the vibration tube 20 taken along a plane defined by the Y- and Z-axes at the median point 25. There are ten measuring points, from A to J, arranged along the vibration tube 20 which is hatched.

It is not always necessary that all of the ten measuring points are provided. It is to be understood that these ten measuring points are imaginary points which are used for the purpose of explanation. It is assumed that these measuring points are rigidly fixed to the vibration tube 20.

In FIG. 55, thick arrows show vectors indicative of the velocities of the arcuate vibratory motion. As will be understood from a comparison between the magnitudes of vectors at the measuring point B and the measuring point C, the magnitude of the velocity vector is proportional to the distance from the center of the vibration tube 20.

Broken-line arrows in FIG. 55 show the vibration velocity in the Y-direction caused by the Coriolis force. It will be seen that the direction and magnitude of the vectors indicating the vibration velocity caused by the Coriolis force are constant regardless of the position on the cross-section.

At the measuring points A and F, the thick vectors indicating the velocity of the ocillated vibration are aligned in the Y-direction, i.e., in the same direction as the vibration velocity caused by the Coriolis force. At the measuring points B, C, G and H, however, the vectors indicating the velocity of the ocillated vibration are inclined with respect to the Y-direction, thus having a component in the Z-direction.

The vibration velocity component caused by the ocillated vibration is greater at the measuring point C than at the measuring point B. From this fact, it is understood that the vibration component in the Y-direction is measured preferably at a position B closer to the reference axis, in order to efficiently measure the Coriolis vibration component.

Vibration component caused by the ocillated vibration (referred to also as "ocillated vibration component") appears only in the Z-direction at the measuring points D and I. In other words, the direction of the ocillated vibration component sensed at these measuring points is orthogonal to and easily discriminatable from the Y-direction vibration component caused by the Coriolis force (referred to also as "Coriolis vibration component").

For instance, Coriolis vibration component alone is sensed when a sensor sensitive to vibration only in the Y-direction is mounted at the measuring point D. Conversely, a sensor sensitive to the vibration only in the Z-direction and mounted at the same measuring point D senses only the ocillated vibration component.

In operation, the vibration tube 20 vibrates to change its position from A to B, from B to A, from A to C and back again to A and then again to B and so on in FIG. 50.

The use of an ordinary vibration sensor having a coil and a magnet, one of which being fixed to the vibration tube 20 while the other to the housing 6, encounters the following problem. Namely, the change in the position of the vibration tube 20 causes a mis-alignment between the coil and the magnet, resulting in unstable oscillation and, in the worst case, breakage of the vibration sensor due to mechanical interference between the coil and the magnet.

The position of the median point 25 as the center of the point-symmetry of the curved configuration of the vibration tube 20 is not changed despite any change in the length and shape due to distortion caused in the course of fabrication or due to thermal expansion.

In the illustrated embodiment, the absolute positions of the vibration sensors 423 and 424 are constant or, changed only slightly, because these sensors are disposed on or in the vicinity of the median point 25. Consequently, the relative position between the coil and the magnet is not changed or, if changed, the amount of change is very small.

Since the positional deviation is null or very small, stable and steady vibration is ensured against any thermal expansion, thus enabling highly stable and accurate detection of vibration.

It is thus possible to obtain a Coriolis mass flowmeter capable of performing highly stable and highly accurate measurement of flow rate or density, against any temperature change, i.e., over a wide range of temperature.

Figure 56:
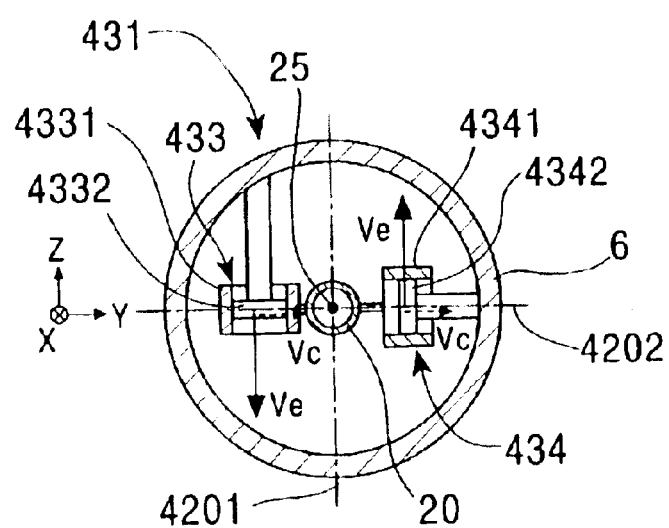
FIG. 56 shows the structure of a critical portion of another embodiment in the fifth aspect of the present invention.
Figure 57:
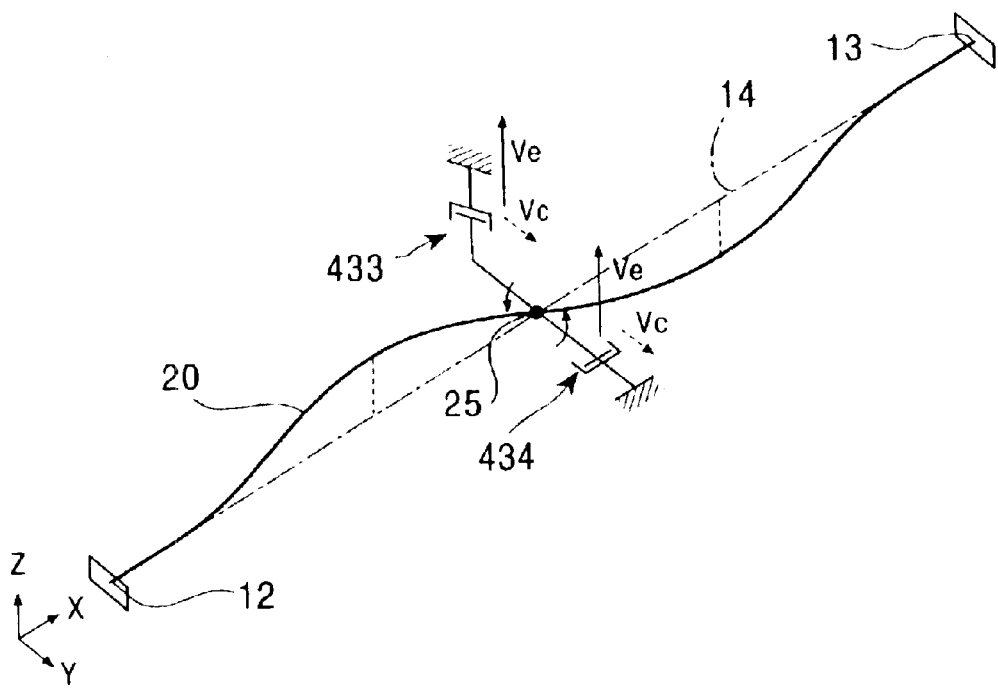
FIG. 57 is an illustration of operation of the embodiment shown in FIG. 56.

FIG. 56 shows a critical portion of another embodiment in the fifth aspect of the present invention, while FIG. 57 is an illustration of operation of the embodiment shown in FIG. 56.

In this embodiment, a vibration sensor device 431 has two vibration sensors 434 and 433 which are disposed on a straight line 4202 which contains the median point 25 and which is perpendicular to a vibration tube plane 4201 containing the curve of the vibration tube 20.

The vibration sensor 434 has sensitivity to vibration only in the direction perpendicular to the vibration tube plane 4201, while the vibration sensor 433 has sensitivity only in the direction parallel to the vibration tube plane 4201 and perpendicular to the reference axis 14.

Thus, the vibration sensor 433 is capable of detecting only the vibration components along the Z-direction and is insensitive to the Y-direction Vibration component Vc which is caused by the Coriolis force. Namely, the vibration sensor 433 measures only the angular vibration Ve which is caused by ocillatation.

In contrast, the vibration sensor 434 detects only the Y-direction vibration component Vc caused by the Coriolis force, without responding to the angular vibration component Ve caused by the ocillatation.

Thus, the vibration sensor 433 and the vibration sensor 434 produce as their outputs the vibration component attributed to the ocillatation and the Coriolis vibration component, respectively.

Output of the vibration sensor 433

$E \sin \omega t$

Output of the vibration sensor 434

$C \cos \omega t$

The amplitude of the Coriolis vibration component is proportional to the mass flow rate of the fluid.

It is necessary to measure also the amplitude and frequency of the vibration component caused by the ocillatation for the purpose of measurement of the density and correction, because the ocillatation is a self-ocillatation at the resonance frequency.

In consequence, the vibration sensor 433 produces an output which is fully composed of the ocillated vibration component, and the vibration sensor 434 produces an output which is fully composed of the Coriolis vibration component.

It is to be understood that the described embodiment offers a simple and less-expensive Coriolis mass flowmeter because of elimination of the necessity for any complicated signal processing circuit, by virtue of the fact that the sensor outputs indicative of independent vibration components are easily obtainable.

Figure 58:
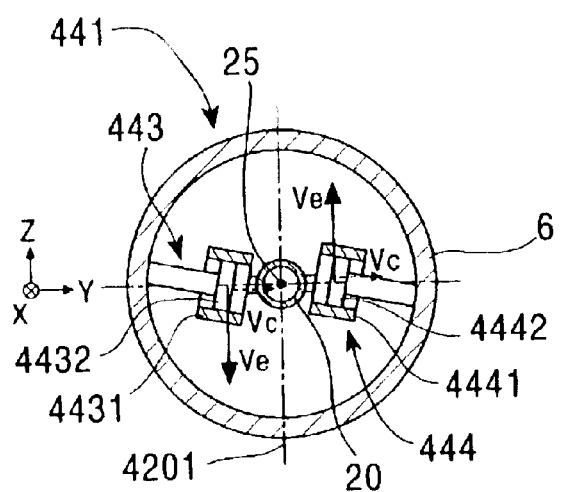
FIG. 58 shows the structure of a critical portion of still another embodiment in the fifth aspect of the present invention.
Figure 59:
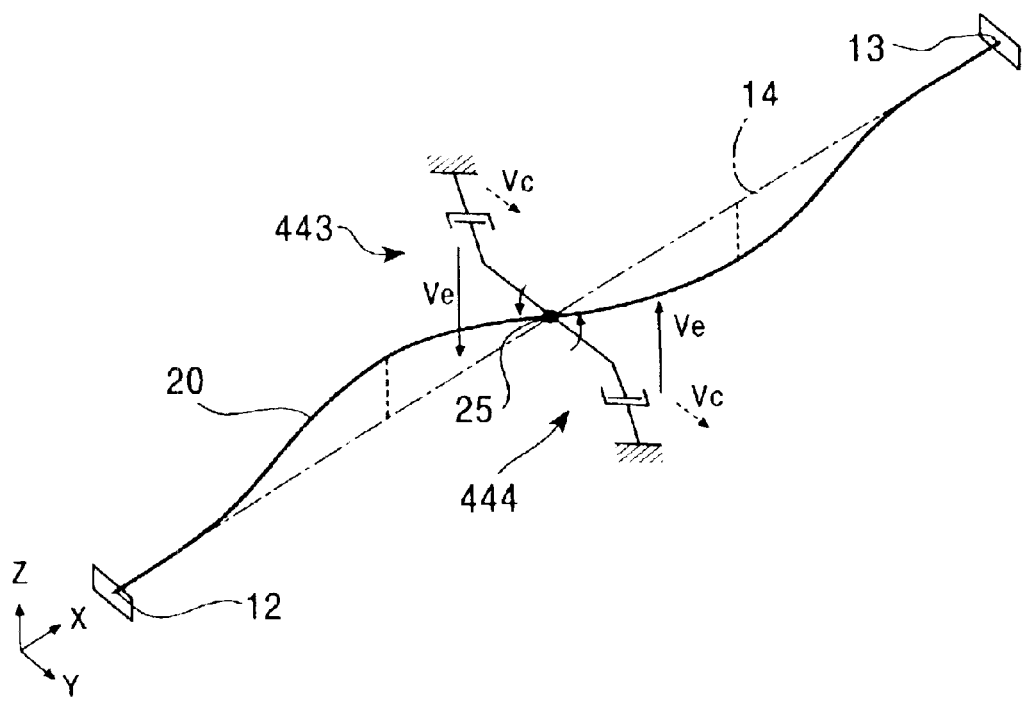
FIG. 59 is an illustration of operation of the embodiment shown in FIG. 58.

FIG. 58 is an illustration of a critical portion of still another embodiment in the fifth aspect of the present invention, while FIG. 59 is an illustration of operation of the embodiment shown in FIG. 58.

This embodiment employs a vibration sensor device 441 which includes vibration sensors 443 and 444 arranged on a straight line which contains the median point 25 and which is perpendicular to a vibration tube plane 4201 containing the curve of the vibration tube 20, such that the vibration sensors 443, 444 are highly sensitive to the vibration components in the direction perpendicular to the vibration tube plane 4201 and have small sensitivity to the vibration component in the direction parallel to the vibration tube plane 4201 and perpendicular to the reference axis 14, thereby increasing the ratio of the amplitude of vibration caused by Coriolis force to the amplitude of the vibration caused by ocillated vibration.

More specifically, the vibration sensors 443 and 444 are disposed on the straight line which passes the median point 25 and which is perpendicular to the vibration tube plane 4201 containing the curve of the vibration tube 20, such that these vibration sensors 443 and 444 oppose each other across or around the vibration tube 20.

At the positions where these vibration sensors 443 and 444 are located, the angular vibration component Ve attributed to the ocillatation is directed in the Z-direction, while the Coriolis vibration component is directed in the Y-direction.

The vibration sensors 443 and 444 have high sensitivity for the vibration component in the Y-direction and are also sensitive, although the sensitivity is low, to the vibration component in the Z-direction.

Such vibration sensing characteristics are obtainable by slightly inclining the magnets 4432, 4442 and the coils 4431, 4441 with respect to the Y-direction, as shown in FIG. 58. By using the vibration sensors having the described characteristics, it is possible to sense the Y-direction vibration component Vc caused by the Coriolis force with high sensitivity, while sensing also the Z-direction ocillated vibration component although the sensitivity is not high for this vibration component.

It is to be noted that the amplitude of the ocillated vibration is two to three orders of magnitude greater than that of the vibration caused by Coriolis force.

By lowering the sensitivity to the ocillated vibration component, it is possible to increase the ratio of the Coriolis vibration component to the ocillated vibration component. This in turn increases the phase difference between the outputs of the two sensors, thus facilitating the signal processing which is to be executed on these outputs.

Thus, in this embodiment, the Coriolis vibration component can be detected with high sensitivity, while the ocillated vibration component is detected but with low sensitivity. The Coriolis vibration component is two to three orders of magnitude smaller than that of the ocillated vibration component, even when the fluid flows at the full-scale flow rate.

It is therefore extremely difficult to separate and detect the small Coriolis vibration component superposed to the ocillated vibration component. In the illustrated embodiment using the vibration sensors having the described characteristics, it is possible to suppress the ocillated vibration component while making full use of the Coriolis vibration component. In consequence, the ratio of the Coriolis vibration component to the ocillated vibration component is increased to facilitate the separation and detection of the Coriolis vibration component.

The phase difference between the outputs of the vibration sensors 443 and 444 will now be considered. The phase difference is very small and is usually on the order of $\mu$rad, if ordinary sensors are used. In the illustrated embodiment, however, the phase difference between the outputs of the vibration sensors 443 and 444 is as large as several tens of $\mu$rad to several mrad. Such a large phase difference appreciably facilitates the signal processing which is executed on the outputs from the vibration sensors.

The preceding embodiment described in connection with FIG. 56 can separate two vibration components from each other solely by means of the sensors. This method, however, requires a rather laborious work for adjustment.

In contrast, in the embodiment shown in FIGS. 58 and 59, the vibration sensors provide both of the Coriolis vibration component and the ocillated vibration component at a suitable ratio and these two components are suitably processed by a transducer. This method does not require laborious adjusting work and, therefore, makes it easy to fabricate a Coriolis mass flowmeter which excels both in stability and measuring accuracy.

It is also to be noted that the embodiment shown in FIGS. 58 and 59 permits the ratio between the Coriolis vibration component and the ocillated vibration component, i.e., the phase difference between the outputs of the two sensors, to be freely adjusted by suitably selecting the sensing directivity of the two vibration sensors. It is therefore possible to freely set the component ratio, i.e., the phase difference, in accordance with the specifications of the transducer.

Figure 60:
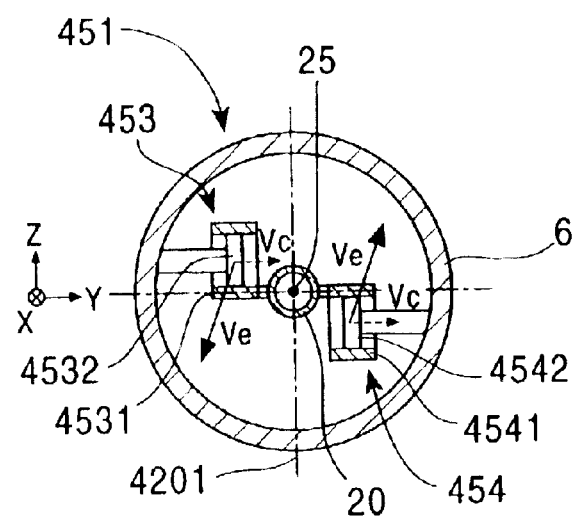
FIG. 60 shows the structure of a critical portion of a further embodiment in the fifth aspect of the present invention.
Figure 61:
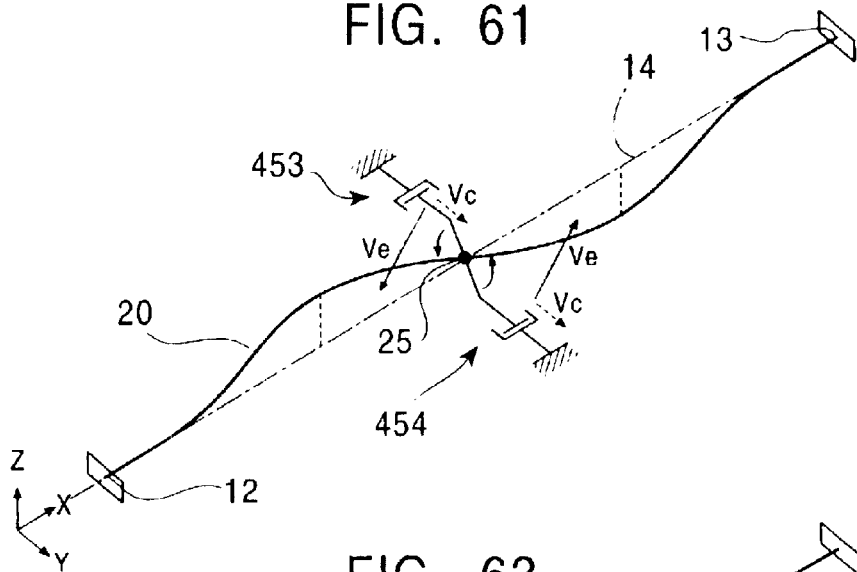
FIG. 61 is an illustration of the embodiment shown in FIG. 60.

FIG. 60 sows a critical portion of a further embodiment in the fifth aspect of the present invention, while FIG. 61 is an illustration of operation of the embodiment shown in FIG. 60.

This embodiment employs a vibration sensor device 451 which includes vibration sensors 453 and 454. The vibration sensors 453 and 454 are arranged in point-symmetry with each other with respect to the median point and are sensitive only to vibration components perpendicular to the vibration tube plane so as to increase the ratio of the Coriolis vibration component to the ocillated vibration component.

Referring to FIG. 61, the vibration sensors 453 and 454 are arranged to oppose each other in the Y-direction and are sensitive only to vibration components in the Y-directions.

More specifically, the vibration sensors 453 and 454 are located on the aforesaid reference plane, at positions rotated about the reference axis 14, i.e., the X-direction, by an angle not greater than 45° (but not 0°) about from the plane defined by the X- and Y-axes, so as to oppose each other across or around the vibration tube 20.

At the positions where the vibration sensors 453, 454 are located, the angular vibration component Ve caused by the ocillatation appears in the direction which is slightly deviated from the Z-direction towards the Y-direction direction, while the linear vibration component caused by the Coriolis force is directed in the Y-direction.

By virtue of the described characteristics and arrangement of the vibration sensors 453, 454, it is possible to detect the Y-direction Coriolis vibration component Vc at a high sensitivity, but the ocillated vibration component Ve can be detected only with small sensitivity because the Y-direction component of the ocillated vibration component Ve is very small.

It will be seen that the embodiment shown in FIGS. 60 and 61 produces advantages which are basically the same as those offered by the preceding embodiment shown in FIGS. 58 and 59. The angular positions of the vibration sensors 453 and 454 about the reference axis can be varied within the range of not greater than 45°, thus enabling free selection of the ratio between the Coriolis vibration component and the ocillated vibration component, i.e., the phase difference between the outputs of the two vibration sensors 453, 454.

Figure 63:
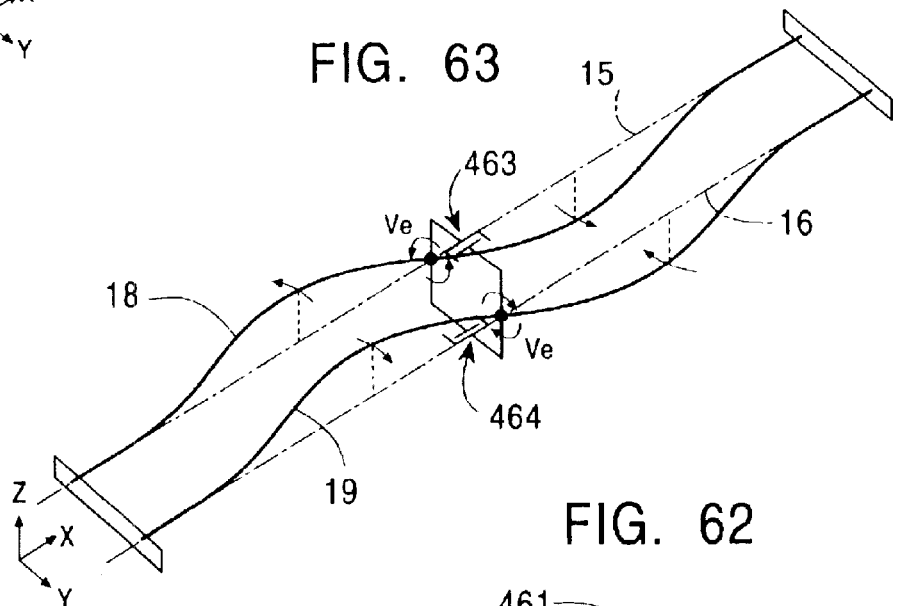
FIG. 63 is an illustration of operation of the embodiment shown in FIG. 62.
Figure 62:
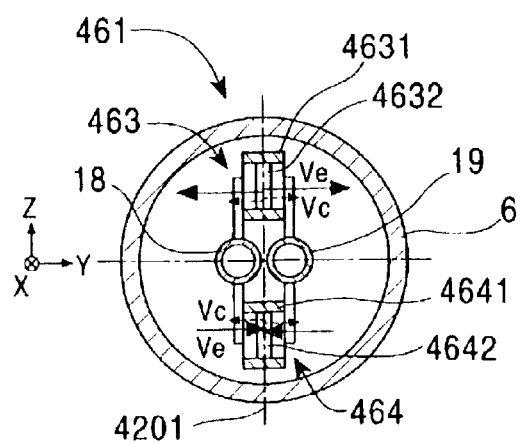
FIG. 62 shows the structure of a critical portion of a still further embodiment in the fifth aspect of the present invention.

FIG. 62 shows a critical portion of a further embodiment in the fifth aspect of the present invention, while FIG. 63 is an illustration of the embodiment shown in FIG. 62.

Unlike the preceding embodiments which employ a single vibration tube, this embodiment employs a pair of vibration tubes 18 and 19.

Two vibration tubes 18 and 19 vibrate in a symmetrical manner. A vibration sensor device 461 includes vibration sensors 463 and 464 which measure the relative vibration between these two vibration tubes 18 and 19.

In the embodiments described heretofore, the vibration sensors have a coil-and-magnet structure. This, however, is not exclusive and the present invention does not exclude the use of other types of vibration sensors such as optical or laser reflection type sensors, eddy current sensors, or accelerometer-type sensors, provided that such sensors are capable of measuring the vibrations of the vibration tubes.

In the embodiment heretofore described, it is not always necessary that two vibration sensors are symmetrically arranged. Thus, the term "across or around the vibration tube" I used to cover also the case where, for example, the vibration sensors are located at the measuring points B and E in the embodiment shown in FIG. 55.

A description will now be given of a sixth aspect of the present invention, with reference to FIGS. 64 to 73

Figure 64:
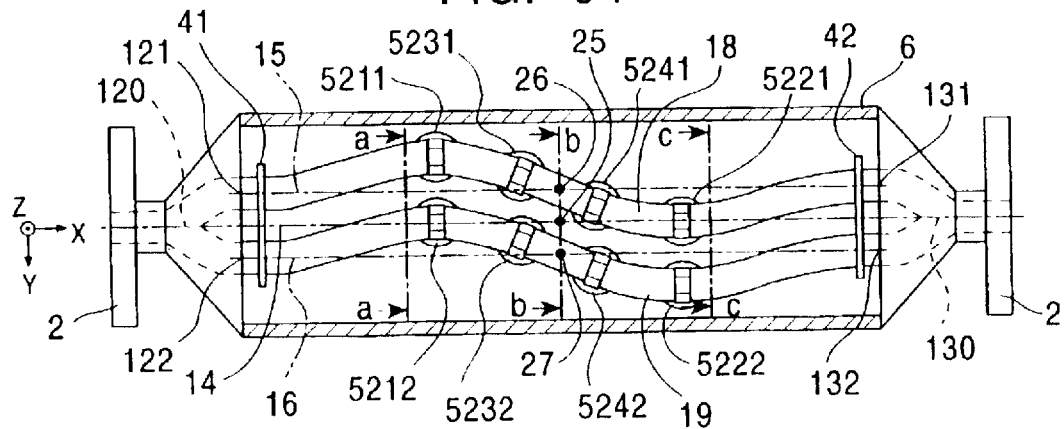
FIG. 64 shows the structure of a critical portion of an embodiment in the sixth aspect of the present invention.
Figure 65:
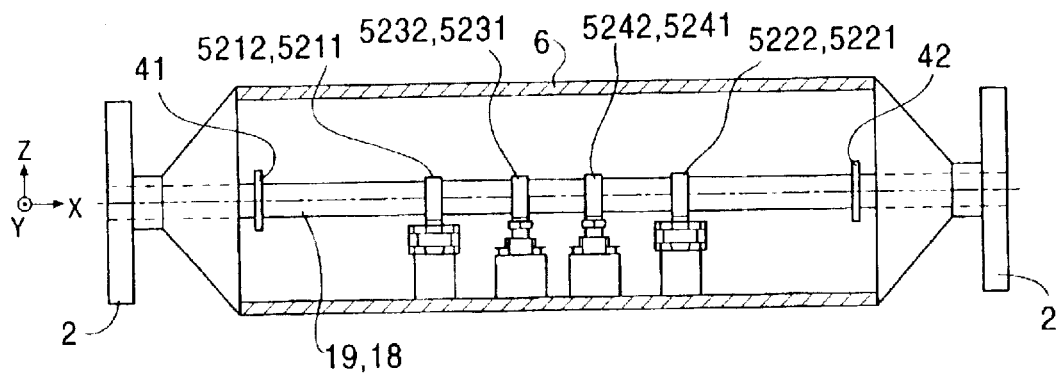
FIG. 65 is an end view of the embodiment shown in FIG. 64.

FIG. 64 is a plan view of a critical portion of an embodiment of a Coriolis mass flowmeter in the sixth aspect of the present invention. FIG. 65 is a front elevational view of the embodiment shown in FIG. 64. FIGS. 66 and 67A to 67C are illustrations of operation of the embodiment shown in FIG. 64.

The Coriolis mass flowmeter of this embodiment has a vibration tube through which flows a fluid to be measured. The vibration tube has a branching portion 120 downstream of a fluid inlet, where the vibration tube branches into a first branch tube 18 and a second branch tube 19 which define a first flow channel and a second flow channel, respectively. The first and second flow channels merge in each other at a merging portion 5130 upstream of a fluid outlet, where the first and second branch tubes are joined together.

The first branch tube 18 and the second branch tube 19 have basically the same configuration, and are arranged in an identical plane, such that the position of the second branch tube 19 is determined by translationally moving the position of the first branch tube 18 in the Y-direction.

Each of the branch tubes 18, 19 has a gently-curved S-like configuration with three inflection points, in point symmetry with respect to the median point 26, 27 of each branch tube.

Therefore, the center of gravity of the first branch tube 18 is located on the median point 26 of the first branch tube 18. Likewise, the center of gravity of the second branch tube 19 is located on the median point 27 of the second branch tube 19. Thus, the gravity center of the composite vibration system including both, branch tubes 18, 19 is located on a median point 25 of the whole vibration system.

Since the gravity center is located at the geometrical center of the whole composite vibration system, and since the branch tubes 18, 19 have an identical configuration, any vibratory noise transmitted from the exterior of the flowmeter tends to uniformly spread over the entire composite vibration system. This, however, does not cause any critical problem, because the measurement of flow rate by ordinary Coriolis-type mass flowmeter relies upon the difference between the phase of vibration measured at an upstream portion and the phase of vibration measured at a downstream portion.

It is thus possible to obtain a Coriolis mass flowmeter which operates with high stability against external vibratory noise and, hence, with a high degree of measuring accuracy.

The branch tubes 18 and 19 exhibit thermal expansion and contraction in response to change in temperature. Such expansion or contraction can easily be absorbed by the curvature of the branch tubes, so that the branch tubes need not sustain any excessive thermal stress. It is thus possible to obtain a Coriolis mass flowmeter which operates over a wide range of temperature.

The ocillators 5211, 5212, 5221, and 5222 are arranged to apply forces to the branch tubes 18 and 19 in the Z-direction.

The ocillator 5211 and the ocillator 5212 are arranged to apply forces of the same magnitude and direction with opposite phases to each other. Likewise, the ocillator 5221 and the ocillator 5222 are arranged to apply forces of the same magnitude and direction with opposite phases to each other. In addition, the ocillator 5211 and the ocillator 5221 apply forces in opposite phases to each other. Likewise, the ocillator 5212 and the ocillator 5222 apply forces in opposite phases to each other.

The Coriolis mass flowmeter of the illustrated embodiment has vibration sensors 5231, 5232, 5241, and 5242 for measuring vibration velocities or amounts of deformation in the Z-direction.

Numerals 41 and 42 indicate support plates to which the branch tubes are fixed.

It will be seen that the branch tubes 18 and 19 perform arcuate vibratory motions while changing their positions as shown in FIGS. 66 and 67A–67C.

The amplitudes of vibrations of the branch tubes 18 and 19, i.e., the X-, Y- and Z-axes components of positional change, are greatest at the points of about L/4 and 3L/4 of the branch tubes, where L represents the overall length of each branch tube. The positions of the branch tubes 18 and 19 are not changed at the nodes of the vibrations which appear at the points on support plates 41 and 42 and at the median point L/2 of the branch tubes 18 and 19.

Figure 66:
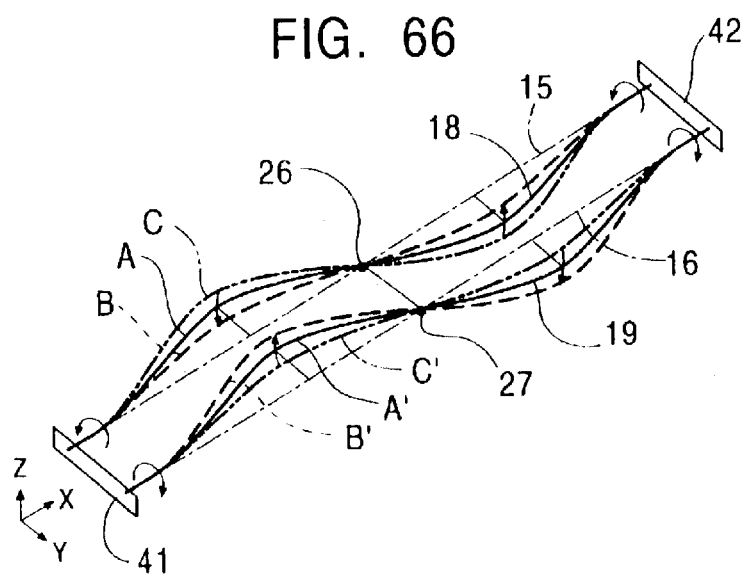
FIGS. 66 and 67A to 67C are illustrations of operation of the embodiment shown in FIG. 64.

As shown in FIG. 66, a large torque or rotational force RotX about X-axes is applied to each of the branch tubes 18 and 19 at a point near each support plate 41 or 42.

The forces acting on the branch tubes 18 and 19 have the same magnitude and act in opposite direction, so that they cancel each other at the points on the support plates 41 and 42.

Figure 67A:
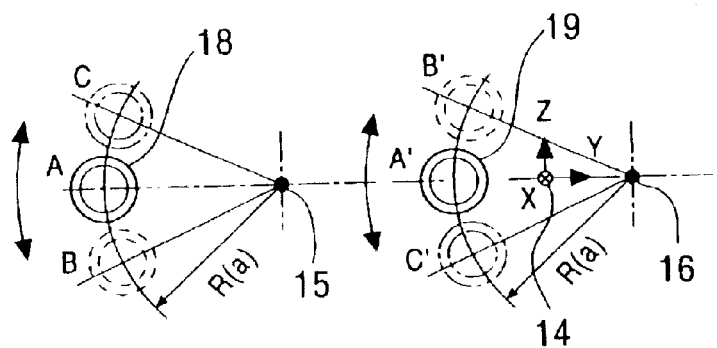
Figure 67B:
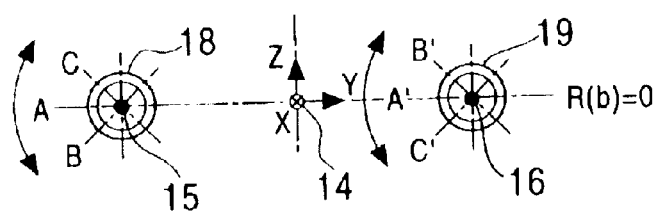
Figure 67C:
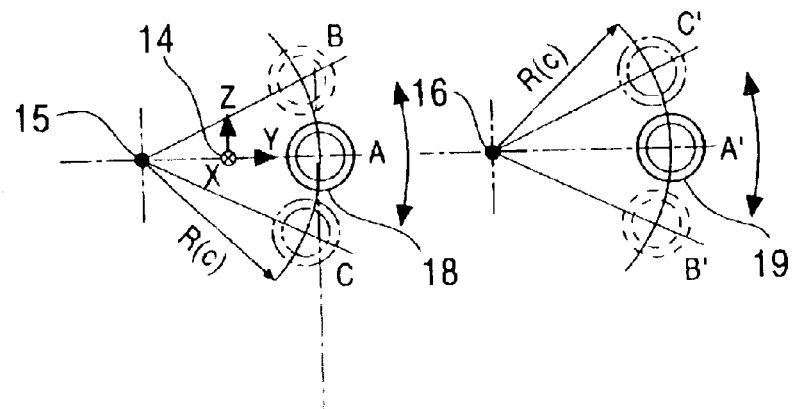

FIGS. 67A to 67C are cross-sectional views taken along the lines a—a, b—b and c—c of FIG. 64.

It will be seen that the branch tubes 18 vibrates along the arcuate path to vary its position from the position B to the position A, from the position A to the position C, from the position C back to the position A and again to the position B, and so forth. Likewise, the branch tube 19 vibrates to change its position from the position B' to the position A', from the position A' to the position C', from the position C' back to the position A' and again to the position B'. These two branch tubes 18 and 19 vibrate while maintaining such a positional relationship that the displacements in the Z-direction of the points corresponded to these two branch tubes are the same in the absolute value but are in opposite direction.

At the cross-section b—b of the branch tube 18 which is midst between both fixed ends, the branch tube 18 performs only rotational vibration about the reference axis 15, without changing its position. Likewise, at the cross-section b—b of the branch tube 19 which is midst between both fixed ends, the branch tube 19 performs only rotational vibration about the reference axis 16, without changing its position.

As is apparent from FIG. 67A, at the cross-section a—a, each of the branch tubes 18 and 19 vibrates such that it is always located on or near an arc of a predetermined radius R(a) from the reference axis 15 (or 16). Similarly, as will be seen from FIG. 67C, each of the branch tubes 18 and 19 at the cross-section c—c vibrates such that it is always located on or near an arc of a predetermined radius R(c) from the reference axis 15 (or 16).

At the cross-section b—b which is midst between the fixed ends, the radius R(b) is zero, so that each of the branch tubes perform only rotational vibration without changing its position.

It will be seen also that the overall length of each of the branch tubes 18 and 19 do not change despite the vibration of the branch tube on the arcuate path, so that no axial force Fx acts on each branch tube at the fixed ends thereof.

In ideal mode of the arcuate vibratory motion of each branch tube along the arcuate path, no co-lateral vibratory force Fy or Fz acts on each fixed end of each branch tube, and torsional component RotX of vibration about the X-direction alone acts on such fixed end.

Although in the drawings the vibration of each branch tube is illustrated in an exaggerated manner to have large amplitudes, the amplitudes of vibration are very small in most of actual Coriolis mass flowmeter.

The arcuate vibratory motion can be approximated by a simple harmonic oscillation having Z-direction component alone, when the vibration amplitude is very small.

From a strict point of view, the ocillators 5211, 5212, 5221, 5222, as well as the vibration sensors 5231, 5232, 5241, 5242, should deal with motion components not only in the Z-direction but also in the Y-direction or the rotational component of the motion. Practically, however, it suffices only to use ocillators and sensors which are arranged only for the Z-direction components of the motion, for the reason stated above.

At both fixed ends of each branch tube 18, 19, the major vibration components of vibration are rotational vibratory forces acting about the reference axis 15, 16, and generation of the forces acting in the X-, Y- and Z-directions is greatly suppressed.

Two vibration branch tubes 18 and 19 vibrate in the same vibration mode and at the same frequency but in opposite phases. Consequently, the rotational vibration components of the branch tubes 18 and 19 about their reference axes 15 and 16 are of the same magnitude but in opposite directions. These rotational vibration components cancel each other at each of the support plates 41 and 42, thus realizing nodes of vibrations at these support plates, whereby a Coriolis mass flowmeter preventive of external propagation of vibration can be implemented.

The force acting on each fixed end is decomposed into the following six directional components.

Linear Force Component in X-direction

This component acting in the axial direction of the branch tube is substantially zero, because only the arcuate vibratory component exists at the fixed end.

Linear Force Component in Y-direction

This component is inherently very small because the vibration amplitude in this direction is very small.

Linear Force Component in Z-direction

This component is inherently small and, in addition, the Z-direction force components on both branch tubes cancel each other to substantially nullify the linear force component acting in the Z-direction.

Rotational Force Component RotX

Rotational force components RotX on both branch tubes about the X-axes cancel each other, so that the total rotational force component RotX is very small.

Rotational Force Component RotY

The rotational force components RotY on both branch tubes are inherently small because the vibrations take place along arcuate paths, and the components RotY on both branch tubes cancel each other.

Rotational Force Component RotZ

This force component is inherently very small, because the deformation is small.

It is thus possible to nullify or minimize force components in all directions, thus offering high vibration isolating performance of the Coriolis mass flowmeter.

Each branch tube of the vibration tube has a configuration and a vibration mode which are point-symmetrical with respect to the corresponding median point 26, 27. Therefore, the gravity center of the branch tube 18, 19 is immobilized at the median point 26, 27. For this reason, the gravity center of the whole vibration system including both branch tubes 18, 19 also is immobilized at the median point 25 which is the geometrical center of the whole system.

Thus, the gravity centers are fixed against the vibration, so that external propagation of vibration through the fixed ends 5121, 5122, 5131, 5132 is minimized, contributing to further improvement in the vibration isolating performance.

The improved vibration isolating performance provides advantages such as reduction in the electrical power consumption, as well as prevention of shifting of zero point and change of the span caused by changes in ambient conditions and external factors, thus offering high measuring accuracy and stability of the Coriolis mass flowmeter.

The four vibration sensors 5231, 5232, 5241, 5242 connected to two branch tubes 18 and 19 also serve to suppress noises, improving anti-noise performance of the Coriolis mass flowmeter.

More specifically, vibration of each of the branch tubes 18 and 19 at the positions where the upstream and downstream vibration sensors are connected can be expressed as follows.

Branch tube 18:
At position of the upstream vibration sensor 5231

$-A \sin \omega t - C \cos \omega t + N1$

At position of the downstream vibration sensor 5241

$+A \sin \omega t - C \cos \omega t + N3$

Branch tube 19:
At position of the upstream vibration sensor 5232

$+A \sin \omega t + C \cos \omega t + N2$

At position of the downstream vibration sensor 5242

$-A \sin \omega t + C \cos \omega t + N4$

The difference between the upstream sensors is expressed as follows.

$-2A \sin \omega t - 2C \cos \omega t + N1 - N2$

The difference between the downstream sensors is expressed as follows.

$+2A \sin \omega t - 2C \cos \omega t + N3 - N4$

In these formulae, the symbol "A" represents the amplitude of the vibration caused by the ocillatation, and "C" indicates the amplitude of vibration caused by the Coriolis force. Each of the symbols N1, N2, N3, and N4 indicates noise.

When both the noise N1 and the noise N2 at the two upstream points of the branch tubes 18, 19 are of the same level N, the noise N1 and the noise N2 cancel each other: namely, N1−N2=0.

When both the noise N3 and the noise N4 at the two downstream points of the branch tubes 18, 19 are of the same level M, the noise N3 and the noise N4 cancel each other: namely, N3−N4=0.

Since the branch tubes 18 and 19 have the same configuration and arranged in close proximity of each other in a juxtaposed state, it is highly credible that the levels of the noise N1 and the noise N2 are equal or substantially equal to each other and that the noise N3 and the noise N4 are of the same or substantially the same level. Therefore, any noise transmitted from external pipe or the like can effectively be canceled.

Figure 68:
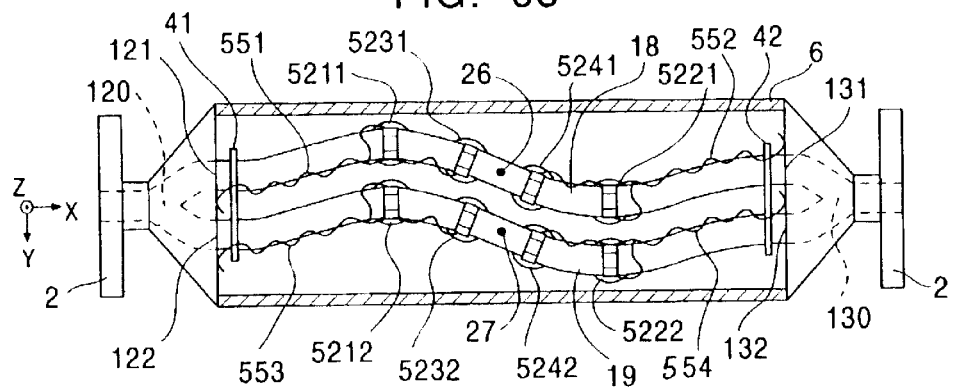
FIG. 68 shows the structure of a critical portion of another embodiment in the sixth aspect of the present invention.

FIG. 68 shows a critical portion of another embodiment in the sixth aspect of the present invention. In this embodiment, the lead lines of the ocillators 5211, 5212, 5221 and 5222 or the lead lines of the vibration sensors 5231, 5232, 5241, 5242 are externally led through the upstream fixed ends 121, 122 or through the downstream fixed ends 131, 132.

More specifically, in this embodiment, each of the ocillators 5211, 5212, 5221 and 5222, as well as each of the vibration sensors 5231, 5232, 5241, 5242, has a coil and a magnet. Two lead lines or cables are led from each coil. The lead lines 551, 552, 553 and 554 are extended externally of the main part of the mass flowmeter so as to be connected to an external transducer.

The lead lines led from the coils are fixed to the associated branch tube 18 or 19 by means of an adhesive. The lead lines are then laid along the associated branch tube 18 or 19 to reach the upstream fixed end 121, 122 or the downstream end 131, 132 of the branch tube, and are led external therefrom so as to be fixed to a stationary part such as the housing 6 of the mass flowmeter.

Figure 69:
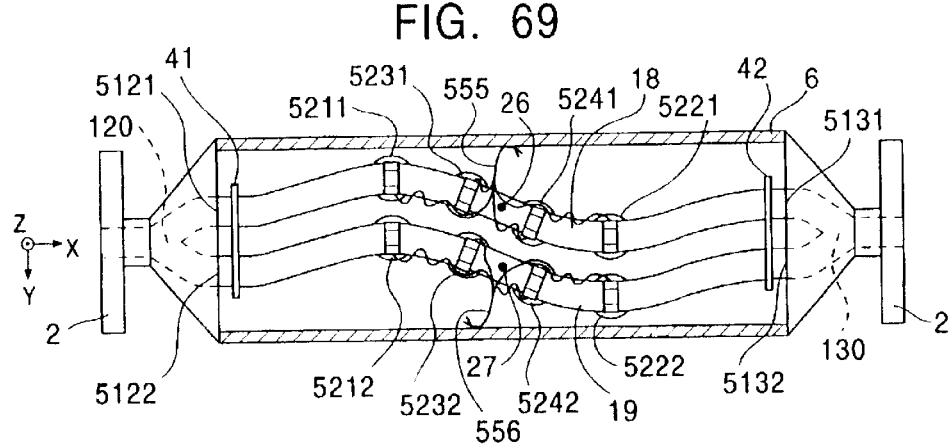
FIG. 69 shows the structure of a critical portion of still another embodiment in the sixth aspect of the present invention.

FIG. 69 shows still another embodiment in the sixth aspect of the present invention. In this embodiment, lead lines from the ocillators 5211, 5212, 5221 and 5222, or lead lines from the vibration sensors 5231, 5232, 5241, 5242, are externally led through the median points 26, 27 of the branch tubes.

For instance, lead lines 555, 556 are led to the positions near the median points 26, 27 of the branch tubes 18, 19 and are led therefrom so as to be fixed to a stationary part such as the housing 6 of the mass flowmeter.

The embodiments shown in FIGS. 68 and 69 offer substantially the same advantages as those produced by the embodiment described before in connection with FIG. 27.

Figure 70:
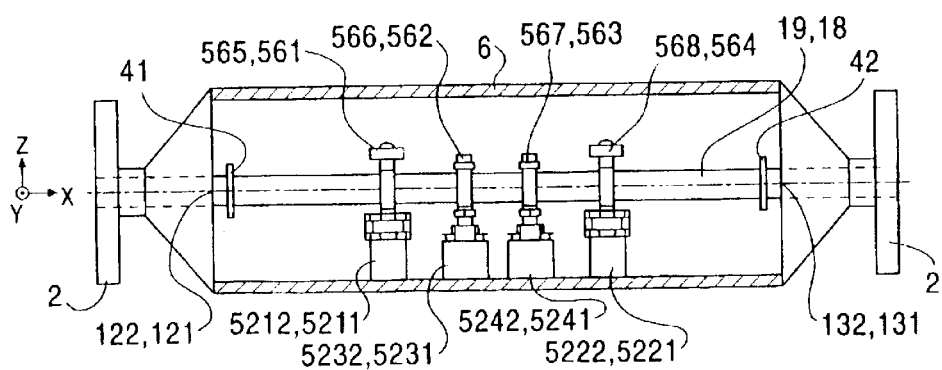
FIG. 70 shows the structure of a critical portion of a further embodiment in the sixth aspect of the present invention.

FIG. 70 shows a critical portion of a further embodiment in the sixth aspect of the present invention. In this Figure, the branch tubes are viewed in the Y-direction, so that only the second branch tube 19 and associated parts are shown, while the first branch tube 18 and associated parts are hidden behind the second branch tube 19 and, therefore, not visible. However, reference numerals assigned to the first branch tube 18 and associated parts are written together with those for the second branch tube 19.

In this embodiment, balancers 565, 566, 567 and 568 are fixed to the second branch tube 19, such that the center of the gravity of the vibration system, including the branch tube 19, ocillators 5212, 5222, the vibration sensors 5232, 5242 attached to the second branch tube 19, and the balancers 565, 566, 567, 568 themselves, is located at the median point 27 of the branch tube 19.

Likewise, balancers 561, 562, 563 and 564 are fixed to the first branch tube 18, such that the center of the gravity of the vibration system, including the branch tube 18, ocillators 5211, 5221, the vibration sensors 5231, 5241 attached to the first branch tube 18, and the balancers 561, 562, 563, 564 themselves, is located at the median point 26 of the first branch tube 18.

In the embodiments shown in FIGS. 64 and 65, although the branch tubes themselves are point-symmetrical and have their gravity centers at their median points, the associated parts such as the vibration sensors and ocillators are disposed only on one side of the branch tubes, i.e., in the −Z direction. Thus, the gravity center of the whole vibration system is deviated from the median point, thus impairing vibration isolating performance.

Assuming that the vibration sensors 5211, 5221 and the ocillators 5231, 5241 associated with the first branch tube 18 are located at one side of the branch tube 18 indicated by −Z, and that the vibration sensors 5212, 5222 and the ocillators 5232, 5242 associated with the second branch tube 19 are located at one side of the branch tube 19 indicated by +Z, the gravity center of each of the vibration systems, one including the first branch tube 18 and the other including the second branch tube 19, is deviated from the median point of the vibration system, although the center of gravity of the composite vibration system including the two branch tubes is located fixedly on the median point 25. Thus, the vibration stability is not so perfect.

In this embodiment, the position of the gravity center and the balance are considered for individual vibration systems: one including the first branch tube 18 and the other including the second branch tube 19.

A discussion will be given first of the vibration system B which includes the portion of the second branch tube 19 between the upstream and downstream ends 122 and 132 and components carried by this portion of the branch tube 19

As shown in FIG. 70, the balancers 565, 566, 567, 568, having the same masses and moments as those of the coils or magnets of the ocillators 5212, 5222 and vibration sensors 5232, 5242 attached to the second branch tube 19, are fixed to the second branch tube 19 in symmetry with the coils or magnets with respect to the reference axis 16, such that the gravity center of the vibration system composed of the second branch tube 19, coils or magnets attached thereto and the balancers 565, 566, 567, 568 is always held at the median point 27.

Likewise, the balancers 561, 562, 563, 564 are disposed on the first branch tube 18 such that the vibration system A composed of the portion of the first branch tube 18 between the supported ends 121 and 131, components attached thereto and the balancers 561, 562, 563, 564 is always located at the median point 26.

It will be clear to those skilled in the art that the embodiment described with reference to FIG. 70 offers substantially the same advantages as those offered by the embodiment shown in FIG. 28.

Figure 71:
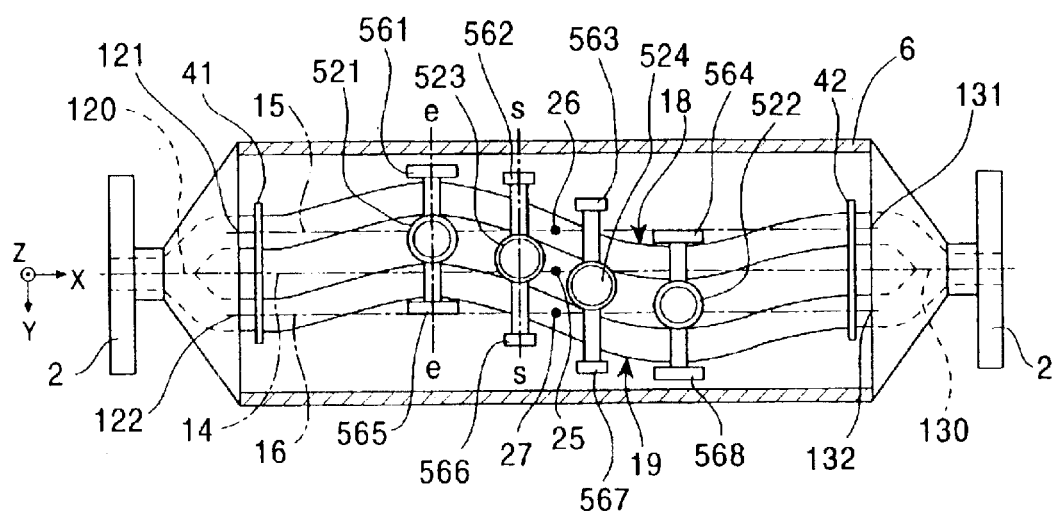
FIG. 71 shows the structure of a critical portion of a still further embodiment in the sixth aspect of the present invention.
Figure 72:
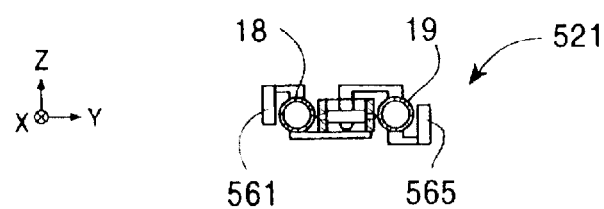
FIG. 72 is a sectional view taken along the line e—e of FIG. 71.
Figure 73:
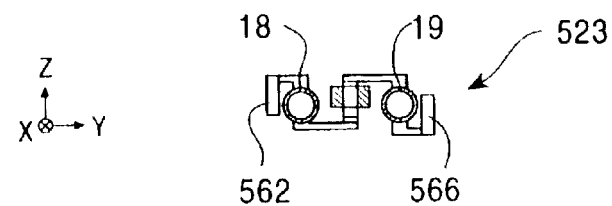
FIG. 73 is a sectional view taken along the line s—s of FIG. 71.

FIG. 71 shows a critical portion of a further embodiment in the sixth aspect of the present invention. FIG. 72 is a sectional view taken along the line e—e of FIG. 71. FIG. 73 is a sectional view taken along the line s—s of FIG. 71.

In this embodiment, ocillators 521, 522 and vibration sensors 523, 524 are connected between two branch tubes 18 and 19.

The ocillators 521 and 522 produce forces in the Z-direction and apply such forces to the branch tubes 18 and 19 in opposite phases to each other.

The vibration sensors 523 and 524 sense the Z-direction components of relative vibrations between the branch tubes 18 and 19.

Balancers 561, 562, 563, 564, 565, 566, 567 and 568 are provided such that the center of gravity of the vibration system A including the first branch tube 18 and its associated components and the balancers and the center of gravity of the vibration system B including the second branch tube 19 and its associated components and the balancers are located on the median points 26 and 27, respectively.

Provision of the ocillators between the stationary part such as the housing 6 and the branch tubes 18, 19 undesirably allows application of reaction force to the housing 6 with the same magnitude with and in opposite phase to the vibration imparted to the branch tubes 18, 19.

The force applied to the housing 6 produces vibratory noise which impairs the stability and measuring accuracy of the Coriolis mass flowmeter.

In the embodiment shown in FIG. 71, no such reaction force is applied to the housing 6, because the ocillators 521 and 522 are connected between two branch tubes 18 and 19, thus avoiding impairment of the stability and measuring accuracy which otherwise may occur.

In the Coriolis mass flowmeter of this embodiment, the branch tubes 18 and 19 receive vibratory forces of the same magnitude and the same frequency in opposite directions to each other, due to the principle of action and reaction.

Similarly, provision of the vibration sensors between the stationary part such as the housing 6 and the branch tubes 18, 19 undesirably allows the vibration noise acting on the housing 6 to be measured, thus deteriorating the measuring accuracy and stability of the Coriolis mass flowmeter.

In this embodiment, the vibration sensors 523 and 524 are less liable to be affected by the vibration noise on the housing 6, because these vibration sensors are fixed between the branch tubes 18 and 19, without being connected to the housing 6.

It will be seen that the measuring accuracy and stability of the Coriolis mass flowmeter are further enhanced when the ocillators 521, 522 and the vibration sensors 523, 524 are fixed between the two branch tubes 18 and 19 as in the illustrated embodiment.

Although several aspects of the invention and preferred embodiments have been described, it will be understood that these embodiments are only illustrative and various changes and modifications may be imparted thereto without departing from the scope of the present invention which is limited solely by the appended claims.

What is claimed is:

1. A Coriolis mass flowmeter, comprising:
   a vibration tube through which a fluid to be measured flows so that the flow of the fluid in cooperation with angular vibration of said vibration tube generates Coriolis force which causes vibratory deformation of said vibration tube;
   wherein said vibration tube has a curved configuration which is point symmetry with respect to the median point between an upstream fixed end and a downstream fixed end of said vibration tube and which has three inflection points, and performs, while maintaining the point symmetrical curved configuration, simple harmonic oscillation such that each point on said vibration tube oscillates on an arc of a predetermined radius from a reference axis which is a straight line interconnecting said upstream fixed end and said downstream fixed end of said vibration tube; and further comprising:
   an upstream oscillator and a downstream oscillator which are provided on said vibration tube;
   an upstream compensation vibrator extending along said reference axis, said upstream compensation vibrator having one end fixed to said upstream oscillator so as to receive from said upstream oscillator a torsional force which acts around said reference axis in the phase inverse to that of the torsional force acting on said vibration tube, the other end of said upstream compensation vibrator being fixed to a portion of said vibration tube near said upstream fixed end so that the torsional force of the inverse phase and the torsional force on said vibration tube cancel each other at the fixed other end of said upstream compensation vibrator; and
   a downstream compensation vibrator extending along said reference axis, said down stream compensation vibrator having one end fixed to said downstream oscillator so as to receive from said downstream oscillator a torsional force which acts around said reference axis in the phase inverse to that of the torsional force acting on said vibration tube, the other end of said downstream compensation vibrator being fixed to a portion of said vibration tube near said downstream fixed end so that the torsional force of the inverse phase and the torsional force on said vibration tube cancel each other at the fixed other end of said downstream compensation vibrator.

2. The flowmeter of claim 1, further comprising:
   vibration sensors for sensing deformative vibration of said vibration tube caused by Coriolis force generated through cooperation between the flow of said fluid and angular vibration of said vibration tube; and
   wherein said oscillators and said vibration sensors are arranged on said vibration tube such that the locations and masses of said oscillators and said vibration sensors are point symmetrical with respect to said median point, and such that the center of gravity is located on said median point.

3. The flowmeter of claim 2, wherein
   each of said oscillators has a magnet attached to said vibration tube and a coil disposed to oppose said magnet; and wherein each of said vibration sensors has a magnet attached to said vibration tube and a coil disposed to oppose said magnet; and further comprising:

balancers attached to said vibration tube so as to cancel mass unbalance caused by vibration of said magnets;

wherein said magnets and said balancers are arranged on said vibration tube such that the locations and masses of said magnets and said balancers are point symmetrical with respect to said median point, and such that the center of gravity is located on said median point.

4. The flowmeter of claim 2 or 3, wherein said vibration tube is gently curved with small curvatures so as to be small in size and so as to reduce pressure loss of the fluid flowing therethrough.

5. The flowmeter of claim 2, wherein the distance W of a point on said vibration tube where the curvature is greatest from said reference axis substantially falls within the range of $\pm 0.01 \leq W/L \leq \pm 0.01$, wherein L indicates the overall length of said vibration tube.

6. A Coriolis mass flowmeter, comprising:

a vibration tube through which a fluid to be measured flows so that the flow of the fluid in cooperation with angular vibration of said vibration tube generates Coriolis force which causes vibratory deformation of said vibration tube;

wherein said vibration tube includes:

a branching portion where the flow of said fluid branches into first and second channels;

a merging portion where said first and second channels merge in each other;

a first branch tube defining said first channel, said first branch tube having a curved configuration with three inflection points and point symmetrical with respect to a first median point which is between a first upstream fixed end near said branching portion and leading to said first channel and a first downstream fixed end near said merging portion and leading from said first channel;

a second branch tube defining said second channel having one end connected to said branching portion and the other end connected to said merging portion, and having the same configuration as said first branch tube, said second branch tube extending in parallel with said first branch tube;

said Coriolis mass flowmeter further comprising:

oscillators fixed to said first and second branch tubes for oscillating said first and second branch tubes in such a manner that each point on said first branch tube performs simple harmonic oscillation on an arc of a predetermined radius from a first reference axis which is the straight line which interconnects said first upstream fixed end and said first downstream fixed end, while each point on said second branch tube performs simple harmonic oscillation on an arc of a predetermined radius from a second reference axis which is the straight line which interconnects a second upstream fixed end and a second downstream fixed end, and that said first and second branch tubes are in plane symmetry with respect to a reference plane which is at an equal distance from a first plane containing said first branch tube and a second plane which is parallel to said first plane and contains said second branch tube; and vibration sensors fixed to said first and second branch tubes, for sensing vibration of said first and second branch tube; wherein lead lines from said oscillators or from said vibration sensors are led externally of said mass flowmeter through said median points, through said upstream fixed ends, or through said downstream fixed ends; and further comprising:

a first balancer attached to said first branch tube and a second balancer attached to said second branch tube;

wherein said first balancer is provided such that the center of gravity of a system including said first branch tube, said oscillator or said vibration sensor attached to said first branch tube and said first balancer coincides with the median point of said first branch tube, and said second balancer is provided such that the center of gravity of a system including said second branch tube, said oscillator or said vibration sensor attached to said second branch tube and said second balancer coincides with the median point of said second branch tube.

7. A Coriolis mass flowmeter, comprising:

a vibration tube through which a fluid to be measured flows so that the flow of the fluid is cooperation with angular vibration of said vibration tube generates Coriolis force which causes vibratory deformation of said vibration tube;

wherein said vibration tube has a curved configuration which is point symmetrical with respect to the median point between an upstream fixed end and a downstream fixed end of said vibration tube and which has three inflection points, and performs, while maintaining the curved configuration, simple harmonic oscillation such that each point on said vibration tube oscillates on an arc of predetermined radius from a reference axis which is a straight line interconnecting said upstream fixed end and said downstream fixed end of said vibration tube;

said Coriolis mass flowmeter further comprising:

vibration sensors arranged to oppose each other across said vibration tube at a plane which is equally spaced from said upstream fixed end and said downstream fixed end of said vibration tube; and wherein said vibration sensors include:

a first vibration sensor disposed on a straight line which contains said median point and which is perpendicular to a vibration tube plane containing the curve of said vibration tube, said first vibration sensor being sensitive only to the vibration component that is perpendicular to said vibration tube plane; and a second vibration sensor disposed on a straight line which contains said median point and which is sensitive only to the vibration component that is parallel to said vibration tube plane and perpendicular to said reference axis.

8. A Coriolis mass flowmeter, comprising:

a vibration tube through which a fluid to be measured flows so that the flow of the fluid in cooperation with angular vibration of said vibration tube generates Coriolis force which causes vibratory deformation of said vibration tube;

wherein said vibration tube has a curved configuration which is point symmetrical with respect to the median point between an upstream fixed end and a downstream fixed end of said vibration tube and which has three inflection points, and performs, while maintaining the curved configuration, simple harmonic oscillation such that each point on said vibration tube oscillates on an arc of a predetermined radius from a reference axis which is a straight line interconnecting said upstream fixed end and said downstream fixed end of said vibration tube;

said Coriolis mass flowmeter further comprising:

vibration sensors arranged to oppose each other across said vibration tube at a plane which is equally spaced from said upstream fixed end and said downstream fixed end of said vibration tube;

wherein said vibration sensors are arranged on a straight line which contains said median point and which is perpendicular to a vibration tube plane containing the curve of said vibration tube, such that said vibration sensors are highly sensitive to the vibration component in the direction perpendicular to said vibration tube plane and has small sensitivity to the vibration component in the direction parallel to said vibration tube plane and perpendicular to said reference axis, thereby increasing the ratio of the amplitude of Coriolis vibration to the amplitude of the oscillated vibration.

9. A Coriolis mass flowmeter, comprising:

a vibration tube through which a fluid to be measured flows so that the flow of the fluid in cooperation with angular vibration of said vibration tube generates Coriolis force which causes vibratory deformation of said vibration tube;

wherein said vibration tube has a curved configuration which is point symmetrical with respect to the median point between an upstream fixed end and a downstream fixed end of said vibration tube and which has three inflection points, and performs, while maintaining the curved configuration, simple harmonic oscillation such that each point on said vibration tube oscillates on an arc of a predetermined radius from a reference axis which is a straight line interconnecting said upstream fixed end and said downstream fixed end of said vibration tube;

said Coriolis mass flowmeter further comprising:

vibration sensors arranged to oppose each other across said vibration tube at a plane which is equally spaced from said upstream fixed end and said downstream fixed end of said vibration tube; wherein said vibration sensors are arranged in point symmetry with respect to said median point and have sensitivity only to vibration components in the direction perpendicular to the vibration tube plane which contains the curve of said vibration tube, thereby increasing the ratio of the amplitude of Coriolis vibration to the amplitude of the oscillated vibration.

10. A Coriolis mass flowmeter, comprising:

a vibration tube through which a fluid to be measured flos so that the flow of the fluid in cooperation with angular vibration of said vibration tube generates Coriolis force which causes vibratory deformation of said vibration tube;

a branching portion where the flow of said fluid branches into first and second channels;

a merging portion where said first and second channels merge into each other;

a first branch tube defining said first channel, said first branch tube having a curved configuration with three inflection points and point symmetry with respect to a first median poit which is between a first upstream fixed end near said branching portion and leading to said first channel and first downstream fixed end near said merging portion and leading from said channel;

a second branch tube defining said second channel having one end connected to said branching portion and the other end connected to said merging portion, and having the same configuration as said first branch tube and contained in the same plane as said first branch tube, the position of said second branch tube being determined by translationally moving the position of said first branch tube;

said Coriolis mass flowmeter further comprising:

oscillators for oscillating said first and second branch tube; and vibration sensors for sensing vibration of said first and second branch tubes; wherein said oscillators are arranged for oscillating said first and second branch tubes while maintaining the point symmetry configuration of said first and second branch tubes, in such a manner that each point on said first branch tube performs simple harmonic oscillation on an arc of a predetermined radius from a first reference axis which is the straight line which interconnects said first upstream fixed end and said first downstream fixed end, while each point on said second branch tube performs simple harmonic oscillation on an arc of a predetermined radius from a second reference axis which is the straight line which interconnects a second upstream fixed end and a second downstream fixed end, and that said first and second branch tubes vibrate in the same vibration mode and at the same frequency in opposite phases to each other.

11. The flowmeter of claim 10, wherein lead lines from said oscillators or from said vibration sensors are led externally of said mass flowmeter through said median points, through said upstream fixed ends, or through said downstream fixed ends.

12. The flowmeter of claim 10 or 11, further comprising:

a first balancer attached to said first branch tube and a second balancer attached to said second branch tube; wherein said first balancer is provided such that the center of gravity of a system including said first branch tube, said oscillator or said vibration sensor attached to said first branch tube and said first balancer coincides with the median point of said first branch tube; and wherein said second balancer is provided such that the center of gravity of a system including said second branch tube, said oscillator or said vibration sensor attached to said second branch tube and said second balancer coincides with the median point of said second branch tube.

13. A Coriolis mass flowmeter, comprising:

a vibration tube through which a fluid to be measured flows so that the flow of the fluid in cooperation with angular vibration of said vibration tube generates Coriolis force which causes vibratory deformation of said vibration tube;

wherein said vibration tube has a curved configuration which is point symmetrical with respect to the median point between an upstream fixed end and a downstream fixed end of said vibration tube and which has three inflection points, and performs, while maintaining the curved configuration, simple harmonic oscillation such that each point on said vibration tube oscillates on an arc of a predetermined radius from a reference axis which is a straight line interconnecting said upstream fixed end and said downstream fixed end of said vibration tube;

at least one oscillator provided on said median point and arranged to apply to said vibration tube a torque about said reference axis or the central axis of said vibration tube; and vibration sensors arranged to oppose each other across said vibration tube at a plane which is equally spaced from said upstream fixed end and said downstream fixed end of said vibration tube.

14. The flowmeter of claim 13, further comprising:
a plurality of oscillators provided on portions of said vibration tube near an upstream fixed end and near a downstream fixed end of said vibration tube, so as to apply to said vibration tube a torque about the central axis of said vibration tube or about a reference axis which is a straight line interconnecting said upstream fixed end and said downstream fixed end of said vibration tube.

15. The flowmeter of claim 14, wherein said plurality of oscillators comprise at least one pair of oscillators, two oscillators of said at least one pair being arranged along the outer peripheral surface of said vibration tube in symmetry with each other with respect to a plane containing the central axis of said vibration tube, said at least one pair of oscillators being secured to said vibration tube obliquely to said central axis so as to perform expansion and contraction obliquely to said central axis in opposite phases to each other, thereby applying torsional force to said vibration tube.

16. A Coriolis mass flowmeter, comprising:
a vibration tube through which a fluid to be measured flows so that the flow of the fluid in cooperation with angular vibration of said vibration tube generates Coriolis force which causes vibratory deformation of said vibration tube; said vibration tube including:
a branching portion where the flow of said fluid branches into first and second channels;
a merging portion where said first and second channels merge into each other;
a first branch tube defining said first channel, said first branch tube having a curved configuration with three inflection points and point symmetric with respect to a first median point which is between a first upstream fixed end near said branching portion and leading to said first channel and a first downstream fixed end near said merging portion and leading from said first channel; and
a plurality of oscillators fixed to said first and second branch tubes for oscillating said first and second branch tubes in such a manner that each point on said first branch performs simple harmonic oscillation on an arc of a predetermined radius from a first reference axis which is the straight line which interconnects said first upstream fixed end and said first downstream fixed end, while each point on said second branch tube performs a simple harmonic oscillation on an arc of a predetermined radius from a second reference axis which is the straight line which interconnects a second upstream fixed end and a second downstream fixed end, and that said first and second branch tubes are in plane symmetry with respect to a reference plane which is at an equal distance from a first plane containing said first branch tube and a second plane which is parallel to said first plane and contains said second branch tube;
a plurality of vibration sensors fixed to said first and second branch tubes, for sensing vibration of said first and second branch tubes; and
means attached to at least one of said first and second branch tubes for balancing undesired forces.

17. The flowmeter of claim 16, wherein lead lines from said plurality of oscillators or from said plurality of vibration sensors are led externally of said mass flowmeter through said median points, through said upstream fixed ends, or through said downstream fixed ends.

* * * * *